United States Patent
Straus

(10) Patent No.: US 12,480,944 B2
(45) Date of Patent: *Nov. 25, 2025

(54) DETECTION AND ANALYSIS OF CELLS

(71) Applicant: First Light Diagnostics, Inc., Chelmsford, MA (US)

(72) Inventor: Don Straus, Cambridge, MA (US)

(73) Assignee: First Light Diagnostics, Inc., Chelmsford, MA (US)

(*) Notice: Subject to any disclaimer, the term of this patent is extended or adjusted under 35 U.S.C. 154(b) by 1053 days.

This patent is subject to a terminal disclaimer.

(21) Appl. No.: 17/282,630

(22) PCT Filed: Oct. 4, 2019

(86) PCT No.: PCT/US2019/054888
§ 371 (c)(1),
(2) Date: Apr. 2, 2021

(87) PCT Pub. No.: WO2020/073019
PCT Pub. Date: Apr. 9, 2020

(65) Prior Publication Data
US 2022/0033889 A1    Feb. 3, 2022

Related U.S. Application Data

(60) Provisional application No. 62/741,253, filed on Oct. 4, 2018.

(51) Int. Cl.
*G01N 33/543* (2006.01)
*C12Q 1/6841* (2018.01)
*C12Q 1/689* (2018.01)

(52) U.S. Cl.
CPC ..... *G01N 33/54333* (2013.01); *C12Q 1/6841* (2013.01); *C12Q 1/689* (2013.01)

(58) Field of Classification Search
CPC .. G01N 33/5433; C12Q 1/6841; C12Q 1/689; C12Q 1/18; B01L 3/502715; B01L 3/502761
See application file for complete search history.

(56) References Cited

U.S. PATENT DOCUMENTS

| | | |
|---|---|---|
| 2,672,431 A | 3/1954 | Goetz |
| 2,761,813 A | 9/1956 | Goetz |
| 3,694,317 A | 9/1972 | Scher |
| 3,981,776 A | 9/1976 | Saxholm |
| 4,097,586 A | 6/1978 | Gross |
| 4,098,876 A | 7/1978 | Piasio et al. |
| 4,115,535 A | 9/1978 | Giaever |
| 4,125,375 A | 11/1978 | Hunter |
| 4,129,419 A | 12/1978 | Hermann, Jr. |
| 4,141,687 A | 2/1979 | Forrest et al. |
| 4,157,323 A | 6/1979 | Yen et al. |
| 4,177,253 A | 12/1979 | Davies et al. |
| 4,222,744 A | 9/1980 | McConnell |
| 4,436,826 A | 3/1984 | Wang |
| 4,438,068 A | 3/1984 | Forrest |
| 4,454,233 A | 6/1984 | Wang |
| 4,455,370 A | 6/1984 | Bartelsman et al. |
| 4,477,578 A | 10/1984 | Miles et al. |
| 4,537,861 A | 8/1985 | Elings et al. |
| 4,562,157 A | 12/1985 | Lowe et al. |
| 4,565,783 A | 1/1986 | Hansen et al. |
| 4,582,810 A | 4/1986 | Rosenstein |
| 4,587,213 A | 5/1986 | Malecki |
| 4,614,585 A | 9/1986 | Mehra et al. |
| 4,693,972 A | 9/1987 | Mansour et al. |
| 4,731,337 A | 3/1988 | Luotola et al. |
| 4,745,077 A | 5/1988 | Holian et al. |
| 4,750,820 A | 6/1988 | Pareigat |
| 4,777,137 A | 10/1988 | Lemonnier |
| 4,777,145 A | 10/1988 | Luotola et al. |
| 4,912,037 A | 3/1990 | Lemonnier |

(Continued)

FOREIGN PATENT DOCUMENTS

| | | |
|---|---|---|
| AU | 760425 B2 | 5/2003 |
| CN | 2486557 Y | 4/2002 |

(Continued)

OTHER PUBLICATIONS

Chantell, C. (2015). Multiplexed automated digital microscopy for rapid identification and antimicrobial susceptibility testing of bacteria and yeast directly from clinical samples. Clinical Microbiology Newsletter, 37(20), 161-167.

De Cardenas et al. Evaluation of rapid phenotypic identification and antimicrobial susceptibility testing in a pediatric oncology center. Diagnostic Microbiology and Infectious Disease, vol. 89, Issue 1, Sep. 2017, pp. 52-57.

Office Action mailed Oct. 3, 2023 in JP Application No. 2021-518615 filed Oct. 4, 2019 (19 pages—Translation).

Al-Hakiem, 1982, Development of Fluoroimmunoassays for the Determination of Individual or Combined Levels of Procainamide and N-Acetylprocainamide in Serum, J Immunoassay 3(1):91-110.

Allman, 1981, Fluoroimmunoassay of Progesterone in Human Serum of Plasma, Clin Chem 27:1176-1176.

Batchelor, 2012, Light and Optics, Machine Vision Handbook, Springer-Verlag, 157-258.

(Continued)

*Primary Examiner* — Sarae L Bausch
(74) *Attorney, Agent, or Firm* — FLENER IP & BUSINESS LAW

(57) ABSTRACT

The invention provides a version of fluorescent in situ hybridization (FISH) in which all the steps are performed at physiological temperatures, i.e., body temperature, to detect and identify pathogenic bacteria in clinical samples. Methods of the invention use species-specific fluorescent probes to label clinically important infectious bacteria. A sample such as a urine sample is loaded into a cartridge, fluorescently labeled, and imaged with a microscope. Labelled bacteria are pulled down onto an imaging surface and a dye cushion is used to keep unbound probes off of the imaging surface. A microscopic image of the surface shows whether and in what quantities the infectious bacteria are present in the clinical sample.

20 Claims, 58 Drawing Sheets

(56) References Cited

U.S. PATENT DOCUMENTS

| | | |
|---|---|---|
| 4,922,092 A | 5/1990 | Rushbrooke et al. |
| 4,959,301 A | 9/1990 | Weaver et al. |
| 4,981,783 A | 1/1991 | Augenlicht |
| 4,988,302 A | 1/1991 | Smith et al. |
| 4,988,618 A | 1/1991 | Li et al. |
| 5,073,497 A | 12/1991 | Schwartz |
| 5,089,413 A | 2/1992 | Nelson et al. |
| 5,130,733 A | 7/1992 | Taniguchi et al. |
| 5,137,812 A | 8/1992 | Matner |
| 5,190,666 A | 3/1993 | Bisconte |
| 5,232,838 A | 8/1993 | Nelson et al. |
| 5,238,810 A | 8/1993 | Fujiwara et al. |
| 5,258,284 A | 11/1993 | Morris, Jr. et al. |
| 5,262,526 A | 11/1993 | Sasamoto et al. |
| 5,292,644 A | 3/1994 | Berg |
| 5,306,420 A | 4/1994 | Bisconte |
| 5,321,545 A | 6/1994 | Bisconte |
| 5,348,885 A | 9/1994 | Labarthe |
| 5,355,215 A | 10/1994 | Schroeder et al. |
| 5,366,867 A | 11/1994 | Kawakami et al. |
| 5,464,749 A | 11/1995 | Schwarzberg et al. |
| 5,474,910 A | 12/1995 | Alfano |
| 5,510,246 A | 4/1996 | Morgan |
| 5,538,857 A | 7/1996 | Rosenthal et al. |
| 5,541,069 A | 7/1996 | Mortensen et al. |
| 5,552,272 A | 9/1996 | Bogart |
| 5,558,839 A | 9/1996 | Matte et al. |
| 5,582,982 A | 12/1996 | Cubbage et al. |
| 5,585,241 A | 12/1996 | Lindmo |
| 5,604,351 A | 2/1997 | Bisconte |
| 5,606,413 A | 2/1997 | Bellus et al. |
| 5,624,850 A | 4/1997 | Kumar et al. |
| 5,648,274 A | 7/1997 | Chandler |
| 5,652,939 A | 7/1997 | Verlinden et al. |
| 5,653,939 A | 8/1997 | Hollis et al. |
| 5,663,057 A | 9/1997 | Drocourt et al. |
| 5,672,880 A | 9/1997 | Kain |
| 5,681,530 A | 10/1997 | Kuster et al. |
| 5,681,712 A | 10/1997 | Nelson |
| 5,694,478 A | 12/1997 | Braier et al. |
| 5,705,402 A | 1/1998 | Leland et al. |
| 5,736,405 A | 4/1998 | Alfano et al. |
| 5,744,322 A | 4/1998 | Krejcarek et al. |
| 5,766,868 A | 6/1998 | Seto |
| 5,792,617 A | 8/1998 | Rotman |
| 5,814,454 A | 9/1998 | Ju |
| 5,821,066 A | 10/1998 | Pyle et al. |
| 5,828,716 A | 10/1998 | Bisconte de Saint Julien |
| 5,852,498 A | 12/1998 | Youvan et al. |
| 5,861,251 A | 1/1999 | Park et al. |
| 5,861,270 A | 1/1999 | Nelis |
| 5,861,306 A | 1/1999 | Pugh et al. |
| 5,891,394 A | 4/1999 | Drocourt et al. |
| 5,914,245 A | 6/1999 | Bylina et al. |
| 5,958,790 A | 9/1999 | Cerny |
| 5,968,766 A | 10/1999 | Powers |
| 5,976,892 A | 11/1999 | Bisconte |
| 5,981,180 A | 11/1999 | Chandler et al. |
| 5,985,675 A | 11/1999 | Charm et al. |
| 5,989,835 A | 11/1999 | Dunlay et al. |
| 5,993,740 A | 11/1999 | Niiyama et al. |
| 6,048,723 A | 4/2000 | Banes |
| 6,051,393 A | 4/2000 | Jones et al. |
| 6,051,395 A | 4/2000 | Rocco |
| 6,121,055 A | 9/2000 | Hargreaves |
| 6,122,396 A | 9/2000 | King et al. |
| 6,130,931 A | 10/2000 | Laurila et al. |
| 6,140,653 A | 10/2000 | Che |
| 6,165,742 A | 12/2000 | .O slashed.fjord et al. |
| 6,171,780 B1 | 1/2001 | Pham et al. |
| 6,200,762 B1 | 3/2001 | Zlokamnik et al. |
| 6,214,560 B1 | 4/2001 | Yguerabide et al. |
| 6,258,326 B1 | 7/2001 | Modlin |
| 6,259,807 B1 | 7/2001 | Ravkin |
| 6,268,222 B1 | 7/2001 | Chandler et al. |
| 6,274,384 B1 | 8/2001 | Starzl et al. |
| 6,287,849 B1 | 9/2001 | McNerney et al. |
| 6,306,589 B1 | 10/2001 | Muller et al. |
| 6,309,822 B1 | 10/2001 | Fodor et al. |
| 6,345,115 B1 | 2/2002 | Ramm et al. |
| 6,358,730 B1 | 3/2002 | Kane |
| 6,472,166 B1 | 10/2002 | Wardlaw et al. |
| 6,582,912 B1 | 6/2003 | Rousseau et al. |
| 6,602,704 B1 | 8/2003 | Maxwell et al. |
| 6,623,983 B1 | 9/2003 | Terstappen et al. |
| 6,649,418 B1 | 11/2003 | Geisberg |
| 6,664,528 B1 | 12/2003 | Cartlidge et al. |
| 6,710,879 B1 | 3/2004 | Hansen et al. |
| 6,727,071 B1 | 4/2004 | Dunlay et al. |
| 6,764,648 B1 | 7/2004 | Roach et al. |
| 6,790,655 B2 | 9/2004 | Lyman et al. |
| 6,792,132 B1 | 9/2004 | Hara et al. |
| 6,852,527 B2 | 2/2005 | Chan et al. |
| 6,919,960 B2 | 7/2005 | Hansen et al. |
| 6,969,607 B2 | 11/2005 | Minton |
| 7,068,365 B2 | 6/2006 | Hansen et al. |
| 7,110,585 B2 | 9/2006 | Cork et al. |
| 7,160,687 B1 | 1/2007 | Kapur et al. |
| 7,582,415 B2 | 9/2009 | Straus |
| 7,763,405 B2 | 7/2010 | Wu et al. |
| 7,763,455 B2 | 7/2010 | Cima et al. |
| 7,820,430 B2 | 10/2010 | Weng et al. |
| 8,021,848 B2 | 9/2011 | Straus |
| 9,090,462 B2 | 7/2015 | Straus |
| 9,290,382 B2 | 3/2016 | Straus |
| 9,632,085 B2 | 4/2017 | Super et al. |
| 9,643,180 B2 | 5/2017 | Abrams et al. |
| 2001/0039032 A1 | 11/2001 | Matsumura et al. |
| 2001/0039060 A1 | 11/2001 | Siiman et al. |
| 2002/0028471 A1 | 3/2002 | Oberhardt |
| 2002/0055092 A1 | 5/2002 | Hochman |
| 2002/0137106 A1 | 9/2002 | Leung et al. |
| 2003/0036058 A1 | 2/2003 | Becker et al. |
| 2003/0068638 A1 | 4/2003 | Cork et al. |
| 2003/0082516 A1 | 5/2003 | Straus |
| 2003/0143580 A1 | 7/2003 | Straus |
| 2003/0170613 A1 | 9/2003 | Straus |
| 2004/0048395 A1 | 3/2004 | Lee et al. |
| 2004/0171121 A1 | 9/2004 | Leppla et al. |
| 2004/0172000 A1 | 9/2004 | Roe et al. |
| 2004/0246483 A1 | 12/2004 | Hansen et al. |
| 2005/0013737 A1 | 1/2005 | Chow et al. |
| 2005/0053942 A1 | 3/2005 | Kauppinen et al. |
| 2005/0136446 A1 | 6/2005 | Snaidr et al. |
| 2005/0148085 A1 | 7/2005 | Larsen |
| 2005/0152955 A1 | 7/2005 | Akhave et al. |
| 2005/0153430 A1 | 7/2005 | Ohtaka |
| 2005/0191687 A1 | 9/2005 | Wang et al. |
| 2005/0220670 A1 | 10/2005 | Palmieri et al. |
| 2005/0221403 A1 | 10/2005 | Gazenko |
| 2005/0225766 A1 | 10/2005 | Hansen et al. |
| 2005/0226779 A1 | 10/2005 | Oldham et al. |
| 2006/0006067 A1 | 1/2006 | Unger |
| 2006/0046246 A1 | 3/2006 | Zeng et al. |
| 2006/0051816 A1 | 3/2006 | Hsieh et al. |
| 2006/0121055 A1 | 6/2006 | Campbell et al. |
| 2006/0129327 A1 | 6/2006 | Kim et al. |
| 2006/0188967 A1 | 8/2006 | Nalin et al. |
| 2006/0210435 A1 | 9/2006 | Alavie et al. |
| 2006/0216696 A1 | 9/2006 | Goguen |
| 2006/0256340 A1 | 11/2006 | Hansen et al. |
| 2006/0292552 A1 | 12/2006 | Haquette et al. |
| 2007/0014695 A1 | 1/2007 | Yue et al. |
| 2007/0172899 A1 | 7/2007 | Graham et al. |
| 2007/0184546 A1 | 8/2007 | Farrelly et al. |
| 2007/0202681 A1 | 8/2007 | Wang |
| 2007/0212681 A1 | 9/2007 | Shapiro et al. |
| 2007/0212747 A1 | 9/2007 | Browne et al. |
| 2008/0003571 A1 | 1/2008 | McKernan et al. |
| 2008/0014576 A1 | 1/2008 | Jovanovich et al. |
| 2008/0032328 A1 | 2/2008 | Cline et al. |
| 2008/0038738 A1 | 2/2008 | Weigum et al. |
| 2008/0200343 A1 | 8/2008 | Clemens et al. |
| 2008/0206099 A1 | 8/2008 | Aruga et al. |

(56) References Cited

U.S. PATENT DOCUMENTS

| | | |
|---|---|---|
| 2009/0075274 A1 | 3/2009 | Slepnev et al. |
| 2009/0137029 A1 | 5/2009 | Breidenthal et al. |
| 2009/0311687 A1 | 12/2009 | Baudart et al. |
| 2009/0315987 A1 | 12/2009 | Straus |
| 2010/0028986 A1 | 2/2010 | Hanafusa |
| 2010/0248281 A1 | 9/2010 | Straus |
| 2011/0028563 A1 | 2/2011 | Found |
| 2012/0045826 A1 | 2/2012 | Yantz et al. |
| 2012/0046203 A1 | 2/2012 | Walsh et al. |
| 2012/0149007 A1 | 6/2012 | Abrams et al. |
| 2012/0172245 A1 | 7/2012 | Stroot et al. |
| 2013/0011566 A1 | 1/2013 | Colin et al. |
| 2013/0216454 A1 | 8/2013 | Blecka et al. |
| 2015/0064703 A1* | 3/2015 | Super .............. G01N 33/56938 435/6.12 |
| 2015/0152467 A1 | 6/2015 | Ingber et al. |
| 2016/0152694 A1 | 6/2016 | Ambrosino et al. |
| 2016/0289729 A1 | 10/2016 | Richards et al. |
| 2017/0029864 A1 | 2/2017 | Straus |
| 2018/0088141 A1 | 3/2018 | Vacic et al. |
| 2019/0324034 A1 | 10/2019 | Bowers et al. |
| 2019/0366338 A1 | 12/2019 | Yantz et al. |

FOREIGN PATENT DOCUMENTS

| | | |
|---|---|---|
| CN | 101254482 A | 9/2008 |
| DE | 19608320 A1 | 8/1997 |
| DE | 19631997 A1 | 2/1998 |
| DE | 19940810 A1 | 5/2000 |
| EP | 0171174 A2 | 2/1986 |
| EP | 0574977 A1 | 12/1993 |
| EP | 0753732 A2 | 1/1997 |
| EP | 1207394 A2 | 5/2002 |
| EP | 1508374 A2 | 2/2005 |
| JP | S62-501647 A | 7/1987 |
| JP | H02-502405 A | 8/1990 |
| JP | H02-278155 A | 11/1990 |
| JP | H3-83598 | 4/1991 |
| JP | H08-201391 A | 8/1996 |
| JP | 10295362 | 11/1998 |
| JP | H11-148901 A | 6/1999 |
| JP | H11-346795 A | 12/1999 |
| JP | 2000-508778 A | 7/2000 |
| JP | 2000-509827 A | 8/2000 |
| JP | 2000-275258 A | 10/2000 |
| JP | 3102240 B2 | 10/2000 |
| JP | 2001-224355 A | 8/2001 |
| JP | 2001-512875 A | 8/2001 |
| JP | 2002-125656 A | 5/2002 |
| JP | 2003-294596 A | 10/2003 |
| JP | 2004-070039 A | 3/2004 |
| JP | 2004-125799 A | 4/2004 |
| JP | 2005-502354 A | 1/2005 |
| JP | 2006-087336 A | 4/2006 |
| JP | 2006-162466 A | 6/2006 |
| JP | 2007-526807 A | 9/2007 |
| JP | 2008-96223 A | 4/2008 |
| JP | 2008-513022 A | 5/2008 |
| JP | 2009-513111 A | 4/2009 |
| WO | 83/01581 A1 | 5/1983 |
| WO | 86/04684 A1 | 8/1986 |
| WO | 89/05456 A1 | 6/1989 |
| WO | 92/05448 A2 | 4/1992 |
| WO | 97/40181 A1 | 10/1997 |
| WO | 9744664 A1 | 11/1997 |
| WO | 98/38490 A1 | 9/1998 |
| WO | 98/50577 A1 | 11/1998 |
| WO | 99/08233 A1 | 2/1999 |
| WO | 9920789 A1 | 4/1999 |
| WO | 99/35483 A1 | 7/1999 |
| WO | 99/36577 A1 | 7/1999 |
| WO | 99/40176 A1 | 8/1999 |
| WO | 9958948 A2 | 11/1999 |
| WO | 0004382 A1 | 1/2000 |
| WO | 0047766 A1 | 8/2000 |
| WO | 01/57522 A2 | 8/2001 |
| WO | 01/61348 A1 | 8/2001 |
| WO | 03/022999 A2 | 3/2003 |
| WO | 03/036290 A1 | 5/2003 |
| WO | 03/073817 A2 | 9/2003 |
| WO | 2005/082254 A2 | 9/2005 |
| WO | 2006/032044 A2 | 3/2006 |
| WO | 2006/106962 A1 | 10/2006 |
| WO | WO 2007/035814 A2 | 3/2007 |
| WO | 2007/038478 A2 | 4/2007 |
| WO | WO 2007/129182 A2 | 11/2007 |
| WO | 2007/145091 A1 | 12/2007 |
| WO | 2008/005998 A2 | 1/2008 |
| WO | 2008108027 A1 | 9/2008 |
| WO | 2010/036808 A1 | 4/2010 |
| WO | 2010/036829 A1 | 4/2010 |
| WO | WO 2010/036827 A1 | 4/2010 |
| WO | 2011/117545 A1 | 9/2011 |
| WO | 2012/035302 A1 | 3/2012 |
| WO | 2013/070730 A2 | 5/2013 |
| WO | 2013/158666 A1 | 10/2013 |
| WO | 2020/073015 A1 | 4/2020 |
| WO | 2020/073018 A2 | 4/2020 |

OTHER PUBLICATIONS

Catalogue of Becton, 2003, Dickinson and Company, p. 28, 29, 32-35, 150 and 151, Japan.

CCD detectors (http://www.astrosurf.com/re/chip.html) published online Feb. 22, 2001, from web archive http://web.archive.org/web/20010222014106/http://astrosurf.com/re/chip.html, retrieved Apr. 12, 2012, 5 pages.

Clean Technology, 1995, 5(8):60-61 (no english translation provided).

Colony Counter (http://www.topac.com/acolyte.html), retrieved Apr. 12, 2005, 3 pages.

Colony Counter Models and Specifications (http://biologics-inc.com/cc-models.htm), retrieved Apr. 15, 2005, 3 pages.

Corkidi, 1998, COVASIAM: An Image Analysis Method That Allows Detection of Confluent Microbial Colonies and Colonies of Various Sizes for Automated Counting, Appl Environ Microbiol 64(4):1400-1404.

Crowther, 2000, Methods in Molecular Biology, The ELISA Guidebook, Humana Press, 425 pages.

Definition and Procedure for the Determination of the Method Detection Limit, Appendix B to 40 C.F.R. § 136, available at http://access.gpo.gov, retreived Nov. 20, 2007, pp. 343-346.

Digital Multi-Purpose High Resolution Colony and Plaque Counter, http://www.loats.com/mla.html, retreived Apr. 12, 2005, 3 pages.

Esteban, 1992, Improved Direct Epifluorescent Filter Technique for Rapid Bioburden Control in Intravenous Solutions, J. Parenter. Sci. Technol. 46146-149.

Findlay, 1993, Automated closed-vessel sstem for in vitro diagnostics based on polymerase chain reation, Clin Chem, 39(9):1927-1933.

Freydiere, 1991, Detection of Salmonellae by using Rambach agar and by a C8 esterase spot test, J. Clin Microbiol. 29(10):2357-2360.

Frost, 1921, Improved Technic for the Micro or Little Plate Method of Counting Bacteria in Milk, J. Infect. Dis. 28 (2):176-187.

Gite, 2018, A Rapid, Accurate, Single Molecule Counting Method Detects Clostridium difficile Toxin B in Stool Samples, Scientific Reports, 8:1-8.

Gray, 2011, Identification of micro-organisms after milliflex rapid detection—a possibility to Identify nonsterile findings in the milliflex rapid sterility test, PDA J Pharm Sci Technol. 65(1):42-54.

Graziani-Bowering, 1997, A quick, easy and inexpensive method for the isolation of human peripheral blood monocytes, J of Immunol Methods, 207(2):157-168.

Innovative Plate Holder for ProtoCOL, http://www.synbiosis.com retrieved Oct. 16, 2002, 2 pages.

Int Search Report and Written Op mailed Feb. 19, 2020, for Int Application No. PCT/US2019/054885, filed Oct. 4, 2019 (12 pages).

(56) References Cited

OTHER PUBLICATIONS

Int Search Report and Written Op mailed Jan. 13, 2010, for Int Application No. PCT/US2009/58237, filed Sep. 24, 2009, (10 pages).
Int Search Report and Written Op mailed Jan. 16, 2020, for Int Application No. PCT/US2019/054884, filed Oct. 4, 2019 (7 pages).
Int Search Report and Written Op mailed Jan. 17, 2020, for Int Application No. PCT/US2019/054887, filed Oct. 4, 2019 (12 pages).
Int Search Report and Written Op mailed Jan. 17, 2020, for Int Application No. PCT/US2019/054888, filed Oct. 4, 2019 (12 pages).
Int Search Report and Written Op mailed Jul. 10, 2019, for Int Application No. PCT/US2019/028397, filed Apr. 19, 2019 (11 pages).
Int Search Report and Written Op mailed Nov. 20, 2009, for Int Application No. PCT/US2009/058274, filed Sep. 24, 2009 (10 pages).
Kamentsky, 2001, Laser Scanning Cytometry, Methods Cell Biol. 63:51-87.
Kepner, 1994, Use of fluorochromes fo direct enumeration of total bacteria in environmental samples: past and present, Microbiol Rev. 58(4):603-615.
Kroll, 1989, A Laser-Light Pulse Counting Method for Automatic and Sensitive Counting Of Bacteria Stained with Acridine Orange, J. Appl. Bacteriol. 66:161-167.
Lamture, 1994, Direct Detection of Nucleic Acid Hybridization on the Surface of a Charge Coupled Device, Nucleic Acids Res. 22(11):2121-2125.
Loates Associates Inc., 1999, System Specifications http://www.loats.com/order_info.html, retrieved Apr. 12, 2005, 7 pages.
Loats, 1990, LAI High-Resolution Automated Colony Counting System—Mouse Lymphoma Assay: Performance Analysis, http://loats.com/docs/HRCCval/HRCCval.htm, pp. 1-11.
Logtenberg, 1985, Enumeration of (Auto) Antibody Producing Cells in Human Using the "Spot-ELISA," Immunol. Lett. 9:343-347.
London, 2010, An Automated System for Rapid Non-Destructive Enumeration of Growing Microbes, PLoS One 5(1):e8609, 16 pages.
Masuko, 1991, A Novel Method for Detection and Counting of Single Bacteria in a Wide Field Using an Ultra-High-Sensitivity TV Camera Without a Microscope, FEMS Microbiol. Lett. 81:287-290.
Masuko, 1991, Rapid Detection and Counting of Single Bacteria in a Wide Field Using a Photon-Counting TV Camera, FEMS Microbiol. Lett. 83:231-238.
Mignon-Godefroy, 1997, Solid Phase Cytometry for Detection of Rare Events, Cytometry 27, pp. 336-344.
Miraglia, 1999, Homogeneous Cell-and Bead-Based Assays for High Throughput Screening Using Fluorometric Microvolume Assay Technology, J. Biomol. Screen. 4:193-204.
Moore, 1998, Lymphocyte fractionation using immunomagnetic colloid and a dipole magnet flow sorter, J Biochem Biophys Methods, 37:11-33.
Nargessi, 1980, Magnetizable Sold-Phase Fluoroimmunoassay of Thyroxines by a Sequential Addition Technique. Clin Chem 26(12):1701-1703.
Nargessi, 1984, Immunoassays for Serum C-Reactive Protein Employing Fluorophore-Labelled Reactants, J. Immunol. Methods 71:17-24.
Nealson, 1978, Isolation, identification, and manipulation of luminous bacteria, Methods Enzymol. 57:153-166.
Nebe-von-Caron, 2000, Analysis of bacterial function by multicolour fluorescence flow cytometry and single cell sorting, J. Microbiol Methods, 42(1):97-114.
Nelis, 2000, Enzymatic Detection of Coliforms and *Escherichia coli* Within 4 Hours, Water Air and Soil Pollut. 123:43-52.
Patterson, 1966, A wide angle camera for photographic search of the ocean bottom, SPIE, C-XII-1-8.
PerkinElmer, Inc., 2007, GeneScreenTM Hybridization Transfer Membranes: transfer and detection protocols, Application Notes, available at http://las.perkinelmer.com, retrieved Feb. 27, 2007.
Porter, 1980, The use of DAPI for identifying and counting aqquatic microflora, Limnol Oceanogr. 25(5):943-948.
Rousseau, 1999, New Miniaturized Highly Sensitive Immunassay Device for Quantitative Measurement of Soluble or Particular Antigen or Antibodies in a Liquid Sample, Clin. Chem. 45(9):1685-1687.
Schultz, 2000, Single Target Molecule Detection with Nonbleaching Multicolor Optical Immunolabels, Proc. Natl. Acad. Sci. USA 97(3):996-1001.
EP Search Report and Supplementary Search Report issued on Dec. 7, 2022 by the EPO for application 19868682.6, filed on Apr. 9, 2020 and published as EP3861345 (Inventor—Straus, et al.; Applicant—First Light) (7 pages).
Brazelton de Cardenas et al. "Evaluation of rapid phenotypic identification and antimicrobial susceptibility testing in a pediatric oncology center" Diagnostic microbiology and infectious disease, vol. 89, No. 1, Jun. 23, 2017, pp. 52-57.
Wright et al. "Automated design of Proves for rRNA-Targeted Fluorescence in situ hybridization reveals the advantages of using dual probes for accurate identification" Applied and Environmental Microbiology, vol. 80, No. 16, Aug. 15, 2014, pp. 5124-5133.
Sorcerer Automated Colony Counting, 2002, Perceptive Instruments, 2 pages.
Supplementary European Search Report and Written Opinion for European Application No. EP 09816857, date of mailing: Mar. 20, 2012, 8 pages.
Susa, 1998, Legionella pneumophila infection in intratracheally inoculated T cell-depleted or -nondepleted A/J mice, J Immunol, 160: 316-321.
Technical Specification http://www.perceptive.co.uk/products/_scc/techspec.html, retrieved Apr. 12, 2005, 2 pages.
Texas Instruments TC211 192x165 Pixel CCD Image Sensor description dated Jan. 1990, 13 pages.
Thomas, 2000, Making gold nanoparticles glow: enhanced emission from a surface-bound fluoroprobe, J Am Chem Soc, 122:2655-2656.
Tibbe, 1999, Optical Tracking and Detection of Immunomagnetically Selected and Aligned Cells, Nature Biotechnol. 17:1210-1213.
Van Pouche, 2000, A 210-min Solid Phase Cytometry Test for the Enumeration of *Escherichia coli* in Drinking Water, J. Appl. Microbiol. 89:390-396.
Van Poucke, 1999, Solid Phase Cytometry-Based Enzymatic Detection of Coliforms in Drinking Water Within 4 h, Water Supply 17:67-72.
Van Poucke, 2000, Rapid Detection of Fluorescent and Chemiluminescent Total Coliforms and *Escherichia coli* on Membrane Filters J. Microbiol. Methods 42:233-214.
Vidon, 2001, A Simple Chemiluminescence-Based Method for Rapid Enumeration of *Listeria* spp. Microcolonies, J. Appl. Microbiol. 90:988-993.
Viinikka, 1981, A Two-Site Immunofluorometric Assay for Human Placental Lactogen, Clin. Chim. Acta. 114:1-9.
Waggoner, 1990, Fluorescent Probes for Cytometry, Flow Cytometry and Sorting, Wiley-Liss, 209-225.
Wellman, 2006, Magenetically-Assisted Transport Evanescent Field Fluoroimmunoassay, Anal, Chem. 78:4450-4456.
Wilson, 1995, Use of the IUL Countermat Automatic Colony Counter for Spiral Plated Total Viable Counts, Appl. Environ. Microbiol. 61:3158-3160.
Wolniak, 2004, BSCI 427 Principles of Microscopy Fall 2004 Syllabus, http://www.life.umd.edu/cbmg/faculty/wolniak/wolniakmicro.html, retrieved Nov. 8, 2007, 8 pages.
Yasui, 1997, Imaging of Lactobacillus brevis Single Cells and Microcolonies Without a Microscope by an Ultrasensitive Chemiluminescent Enzyme Immunoassay with a Photon-counting Television Camera, Appl. Environ. Microbiol. 63:4528-4533.
Zhao, 2004, Competitive Immunoassay for Microliter Protein Samples with Magnetic Beads and Near-infared Fluorescence Detection, Anal Chem. 76:1871-1876.
Office Action issued on Jul. 19, 2023 by the CN Patent Office for application 201980080506.9, filed Apr. 9, 2020 (7 pages) (Inventor: Straus).

\* cited by examiner

| Bacterial Target | FISH Probes | Labeled | Final Concentration | Sequence | Comments | |
|---|---|---|---|---|---|---|
| E. coli | Eco469 | Alexa647N | 0.3 µM | /5Alex647N/GTCAATGAGCAAAGG | Eco0649 H1 | (SEQ ID NO: 1) |
| | Eco469 H1 | No label | 3 µM | ACTCCCTTCTCCCCGTG | Went with Eco0649 | (SEQ ID NO: 2) |
| | Eco469 H2 | No label | 3 µM | GGTGCTTCTTCTGCGGGTAA | | (SEQ ID NO: 3) |
| | Eco649 | Alexa647N | 0.3 µM | /5Alex647N/TAGGAGATCAAGCT | Eco0649 H1 | (SEQ ID NO: 4) |
| | Eco649 H1 | No label | 3 µM | AGTATCAGATGCAGTTCCAG | Went with Eco0649 | (SEQ ID NO: 5) |
| | Eco649 H2 | No label | 3 µM | TTCGCACCTGAGGTCAGTC | | (SEQ ID NO: 6) |
| P. aeruginosa | Pae002 | Alexa647N | 0.2 µM | /5Alex647N/CTTCAAAGATCCTTT/3Alex647N/ | All probes were used in same mixture | (SEQ ID NO: 7) |
| | Pae002 H1 | No label | 1.5 µM | CGGTACGGGCTATCACCCA | | (SEQ ID NO: 8) |
| | Pae002 H2 | No label | 1.5 µM | GCTCCGTCCTACTCGATTCA | | (SEQ ID NO: 9) |
| | Pae004 H1 | No label | 1.5 µM | GGGCTAAATCCCGGTTGCTG | | (SEQ ID NO: 10) |
| | Pae004 H2 | No label | 5 µM | ACTTTCCAGAGCGTTCCGTA | | (SEQ ID NO: 11) |
| | Pae005 H2 | No label | 1.5 µM | CCAGTGAGATCTCATCTTGAG | | (SEQ ID NO: 12) |
| | Pae005 H3 | No label | 5 µM | CGTCGTAGTCTTCGACGGCCC | | (SEQ ID NO: 13) |
| K. pneumoniae | Kpn001 | Alexa647N | 0.6 µM | /5Alex647N/CACCTACACACCAGCG/3Alex647N/ | All probes were used in same mixture | (SEQ ID NO: 14) |
| | Kpn003_2 | Alexa647 | 0.2 µM | /5Alex647N/CTTCGACTGGTCAGC/3Alex647N/ | | (SEQ ID NO: 15) |
| | Kleb001 H1 | No label | 6 µM | TGCCTTCTCCGAAGTTACGG | | (SEQ ID NO: 16) |
| | Kleb325 H1 | No label | 1.5 µM | GCCAGCTGGTATCTTCGACTG | | (SEQ ID NO: 17) |
| | Kpn003 H3 | No label | 6 µM | ACAGTTGCAGCCAGCTGGTAT | | (SEQ ID NO: 18) |
| E. faecalis | UТI 338_A | Alexa647N | 0.6 µM | /5Alex647N/ACTGCTGCC | All probes were used in same mixture | (SEQ ID NO: 19) |
| | UТI 338_B | Alexa647N | 0.6 µM | CCGTAGGAGT/3Alex647N/ | | (SEQ ID NO: 20) |
| | Eco338 H1 | No label | 3 µM | CTGGACGGTGTCTCAGTC | | (SEQ ID NO: 21) |
| | Eco338 H2 | No label | 3 µM | CCCATTGTGCAATATTCCCC | | (SEQ ID NO: 22) |
| | Entero338 H1 | No label | 3 µM | TGGSCCGTGTCTCAGTGT | | (SEQ ID NO: 23) |
| | Entero338 H2 | No label | 3 µM | TCCATTGCCGAAGATTCCCT | | (SEQ ID NO: 24) |
| | | | | | | (SEQ ID NO: 25) |

FIG. 14

| Bacterial Target | FISH Probes | Labeled | Final Concentration | Sequence | |
|---|---|---|---|---|---|
| E. coli | Eco469 | Alexa647N | 0.6 µM | /5Alex647N/GTCAATGAGCAAAGG | (SEQ ID NO: 26) |
| | Eco469 H1 | No label | 3 µM | ACTCCCTTCCTCCCCGCTg | (SEQ ID NO: 27) |
| | Eco469 H2 | No label | 3 µM | GGTGCTTCTTCTGCcGGTAA | (SEQ ID NO: 28) |
| P. aeruginosa | Pae002 | Alexa647N | 0.4 µM | /5Alex647N/CTTCAAAGATCCTTT/3Alex647N/ | (SEQ ID NO: 29) |
| | Pae002 H1 | No label | 1.5 µM | CGGTACGGGGCTATCACCCA | (SEQ ID NO: 30) |
| | Pae002 H2 | No label | 1.5 µM | GCTCCGTCCTACTCGATTTCA | (SEQ ID NO: 31) |
| | Pae004 H1 | No label | 1.5 µM | GGGCTAATCCCCGGTCGCTCG | (SEQ ID NO: 32) |
| | Pae004 H2 | No label | 5 µM | ACTTCCAGAGCGTTCCGCTA | (SEQ ID NO: 33) |
| | Pae005 H2 | No label | 1.5 µM | CCAGTGAGATCTCATCTTCAG | (SEQ ID NO: 34) |
| | Pae005 H3 | No label | 5 µM | CGTCGTAGTCTTCGACGGCCC | (SEQ ID NO: 35) |
| K. pneumoniae | Kpn003_2 | Alexa647N | 0.4 µM | /5Alex647N/CTTCGACTGGTCTCAGC/3alex647N/ | (SEQ ID NO: 36) |
| | Kleb001 H1 | No label | 6 µM | TgCCTTCTCCGAAGTTACGG | (SEQ ID NO: 37) |
| | Kleb235 H3 | No label | 1.5 µM | GCCAGCTGGTATCTCGACTG | (SEQ ID NO: 38) |
| | Kpn003 H3 | No label | 6 µM | ACAGTTGCAGCAGCTGGTAT | (SEQ ID NO: 39) |
| E. faecalis | L1_Ent003 (LNA) | Alexa647N | 0.3 µM | /5Alex647N/CaAA+AAC+A+ACK+GG | (SEQ ID NO: 40) |
| | L2_Ent004 (LNA) | Alexa647N | 0.3 µM | /5Alex647N/TgC+ATT+CCTTA | (SEQ ID NO: 41) |
| | Ent003 H1 | No label | 5.6 µM | AGGAATATCAACCTGTTRTCC | (SEQ ID NO: 42) |
| | Ent003 H2_1 | No label | 5.6 µM | CTMCTGCGTCCCTCCATTGCTCA | (SEQ ID NO: 43) |
| | Ent003 H3 | No label | 5.6 µM | GTTTRCGGTACGGCMGYGT | (SEQ ID NO: 44) |
| | Ent003 H4 | No label | 5.6 µM | TTTCTCACTAGAAGCTTTCT | (SEQ ID NO: 45) |
| | Ent004 H4_2 | No label | 5.6 µM | CAGGAACTTCGTACTATTAT | (SEQ ID NO: 46) |
| | Ent004 H2.Efs | No label | 5.6 µM | GGACATGCACTTCCAATCGCA | (SEQ ID NO: 47) |
| P. mirabilis | Prot631 (LNA) | Alexa647N | 0.6 µM | /5Alex647N/C+TGACTTAATT+GACC | (SEQ ID NO: 48) |
| | Prot631 H1 | No label | 3 µM | CCTGCGTGCGCTTTAGCC | (SEQ ID NO: 49) |
| | Prot631 H2 | No label | 3 µM | TTAAGCTCGGGGCTTTCACA | (SEQ ID NO: 50) |

FIG. 18

| Bacteria Tested For Cross-reactivity | Reason for inclusion |
|---|---|
| K. oxytoca | UTI pathogen |
| K. pneumoniae | UTI pathogen, close relative |
| P. aeruginosa | UTI pathogen |
| P. mirabilis | UTI pathogen |
| E. faecium | UTI pathogen |
| E. faecalis | UTI pathogen |
| S. aureus | UTI pathogen, rare skin commensal |
| S. saprophyticus | UTI pathogen |
| S. agalactiae | UTI pathogen |
| S. epidermidis | Skin commensal |
| A. baumanii | UTI pathogen |
| M. luteus | Skin commensal |
| S. enterica | Close relative |
| K. aerogenes | Close relative, UTI pathogen |
| C. fruendii | Close relative, UTI pathogen |
| S. marcescens | UTI pathogen |

FIG. 19

| Bacterial Target | FISH Probes | Labeled | Final Concentration | Sequence | Comments | |
|---|---|---|---|---|---|---|
| E. coli | Eco649 | Alexa647N | 0.6 µM | /5Alex647N/GTCAATGAGCAAAGG | Eco0649 H1 Went with Eco0649 | (SEQ ID NO: 51) |
| | Eco649 H1 | No label | 3 µM | ACTCCCTTCCTCCCCGCTG | | (SEQ ID NO: 52) |
| | Eco649 H2 | No label | 3 µM | GGTGCTTCTTGCG3GTAA | | (SEQ ID NO: 53) |
| | Eco649 | Alexa647N | 0.6 µM | /5Alex647N/TACGAGACTCAAGCT | Eco0649 H1 Went with Eco0649 | (SEQ ID NO: 54) |
| | Eco649 H1 | No label | 3 µM | AGTATCAGATGCAGTTCCAG | | (SEQ ID NO: 55) |
| | Eco649 H2 | No label | 3 µM | TTCGCACCTGAGCGTCAGTC | | (SEQ ID NO: 56) |
| P. aeruginosa | Pae002 | Alexa647N | 0.4 µM | /5Alex647N/CTTCAAAGATCCTTT/3Alex647N/ | | (SEQ ID NO: 57) |
| | Pae002 H1 | No label | 1.5 µM | CGGTACGGCGTATCACCA | | (SEQ ID NO: 58) |
| | Pae002 H2 | No label | 1.5 µM | GCTCGTCCTACTCGATTCA | All probes were used in same mixture | (SEQ ID NO: 59) |
| | Pae004 H1 | No label | 1.5 µM | GtGCTAATCCCGTTGGCTG | | (SEQ ID NO: 60) |
| | Pae04 H2 | No label | 5 µM | ACTTCCAGAGATCATCTTGAG | | (SEQ ID NO: 61) |
| | Pae005 H2 | No label | 1.5 µM | CCAGTAGGATCTTCGGCTA | | (SEQ ID NO: 62) |
| | Pae05 H3 | No label | 5 µM | CGTCGTAGTCTTCGACGACCC | | (SEQ ID NO: 63) |
| K. pneumoniae | Kpn001 | Alexa647N | 0.6 µM | /5Alex647N/CACTACACCAGCG/3Alex647N/ | | (SEQ ID NO: 64) |
| | Kpn001_2 | Alexa647N | 0.2 µM | /5Alex647N/CTTCGACTGGTCAGC/3Alex647N/ | | (SEQ ID NO: 65) |
| | Kleb001 H1 | No label | 6 µM | TGCCTCTCCGAAGTTACGG | All probes were used in same mixture | (SEQ ID NO: 66) |
| | Kleb23S H3 | No label | 1.5 µM | GCCAGCTGGTATCTTCGACTG | | (SEQ ID NO: 67) |
| | Kpn003 H3 | No label | 6 µM | ACAGTTGCAGCCAGCTGGTAT | | (SEQ ID NO: 68) |
| E. faecalis | L1_Ent003 (LNA) | Alexa647N | 0.3 µM | /5Alex647N/CAAA+AAC+A+ACK+GG | | (SEQ ID NO: 69) |
| | L2_Ent004 (LNA) | Alexa647N | 0.3 µM | /5Alex647N/TGC+AT+CCTTA | | (SEQ ID NO: 70) |
| | Ent003 H1 | No label | 5.6 µM | AGGAAATATCAACTGTTRTCC | | (SEQ ID NO: 71) |
| | Ent003 H2_1 | No label | 5.6 µM | CTMCTGCTCCTCCATGCTCA | All probes were used in same mixture | (SEQ ID NO: 72) |
| | Ent003 H3 | No label | 5.6 µM | GTTTRCGGTACGGGCMGYTGT | | (SEQ ID NO: 73) |
| | Ent003 H4 | No label | 5.6 µM | TTCTCACTAGAAGCTTTTCT | | (SEQ ID NO: 74) |
| | Ent004 H4_2 | No label | 5.6 µM | CACGAACTTCGSTACTATTAT | | (SEQ ID NO: 75) |
| | Ent004 H2 Efis | No label | 5.6 µM | CGACATGCACTTCCAATCGCA | | (SEQ ID NO: 76) |

FIG. 20

| Bacterial Target | FISH Probes | Labeled | Color Channel | Final Concentration | Sequence | |
|---|---|---|---|---|---|---|
| E. coli | Eco469 | Alexa647N | Red | 0.8 μM | /5Alex647N/GTCAATGAGCAAAGG | (SEQ ID NO: 77) |
| | Eco469 H1 | No label | N/A | 3 μM | ACTCCCTTCCTCCCCGCTG | (SEQ ID NO: 78) |
| | Eco469 H2 | No label | N/A | 3 μM | CGTGCTTCTTCTGCCGGTAA | (SEQ ID NO: 79) |
| P. aeruginosa | Pae002 | Alexa532N | Yellow | 0.2 μM | /5Alex532N/CTTCAAAGATCCTTT/3Alex532N/ | (SEQ ID NO: 80) |
| | Pae002 H1 | No label | N/A | 1.5 μM | CGGTACGGGGCTATCACCCA | (SEQ ID NO: 81) |
| | Pae002 H2 | No label | N/A | 1.5 μM | GCTCCGTCCTACTCGATTCA | (SEQ ID NO: 82) |
| | Pae004 H1 | No label | N/A | 1.5 μM | GGGCTAATCCCGGTTCGCTCG | (SEQ ID NO: 83) |
| | Pae004 H2 | No label | N/A | 5 μM | ACTTCCAGAGATTCATCGCTA | (SEQ ID NO: 84) |
| | Pae005 H2 | No label | N/A | 1.5 μM | CCAGTGAGATCCATCTTGAG | (SEQ ID NO: 85) |
| | Pae005 H3 | No label | N/A | 5 μM | CGTCGTAGTCTTCGACGGCCC | (SEQ ID NO: 86) |
| K. pneumoniae | Kpn003_2 | Alexa488N | Green | 0.2 μM | /5Alex488N/CTTCGACTGGTCTTCAGC/3Alex488N/ | (SEQ ID NO: 87) |
| | Kleb001 H1 | No label | N/A | 6 μM | TGCCTTCCCGAAGTTACGG | (SEQ ID NO: 88) |
| | Kleb23S H3 | No label | N/A | 1.5 μM | GCCAGCTGGTATCTTCGACTG | (SEQ ID NO: 89) |
| | Kpm003 H3 | No label | N/A | 6 μM | ACAGTTGCAGCCAGCTGGTAT | (SEQ ID NO: 90) |
| K. oxytoca | Koxy_1717 | Alexa568N | Orange | 0.6 μM | /5Alex568N/CTTCATGACAAGT/3Alex568N/ | (SEQ ID NO: 91) |
| | Koxy_1717 H1 | No label | N/A | 3 μM | ACTTACCAATCAGCGTGCCTT | (SEQ ID NO: 92) |
| | Koxy_1717 H2 | No label | N/A | 3 μM | CTGGTATCTTCGACTGATT | (SEQ ID NO: 93) |

FIG. 24

| Bacterial Target | FISH Probes | Labeled | Final Concentration | Sequence | # of Samples used the probe set | |
|---|---|---|---|---|---|---|
| E. coli | Eco469 | Alexa647N | 0.6 µM | /5Alex647N/GTCAATGAGCAAAGG | | (SEQ ID NO: 94) |
| | Eco469 H1 | No label | 3 µM | ACTCCCTTCCTCCCCGCTG | 19 | (SEQ ID NO: 95) |
| | Eco469 H2 | No label | 3 µM | GGTGCTTCTTCTGCGGGTAA | | (SEQ ID NO: 96) |
| | Eco469 | Alexa647N | 0.3 µM | /5Alex647N/GTCAATGAGCAAAGG | | (SEQ ID NO: 97) |
| | Eco469 H1 | No label | 3 µM | ACTCCCTTCCTCCCCGCTG | 17 | (SEQ ID NO: 98) |
| | Eco469 H2 | No label | 3 µM | GGTGCTTCTTCTGCGGGTAA | | (SEQ ID NO: 99) |
| | Eco649 | Alexa647N | 0.3 µM | /5Alex647N/TACGAGACTCAAGCT | | (SEQ ID NO: 100) |
| | Eco649 H1 | No label | 3 µM | AGTATCAGATGCAGTTCCCAG | 12 | (SEQ ID NO: 101) |
| | Eco649 H2 | No label | 3 µM | TTCGCACTTGAGCGGTCAGTC | | (SEQ ID NO: 102) |

FIG. 29

| Target | Antibiotic | Essential Agreement |
|---|---|---|
| E. coli | Ciprofloxacin | 100% |
| | Trimethoprim/sulfamethoxazole | 100% |
| | Meropenem | 100% |
| | Ceftazidime | 100% |
| | Nitrofurantoin | 75% (3/4) |
| P. aeruginosa | Ciprofloxacin | 100% |
| | Meropenem | 100% |
| | Ceftazidime | 100% |
| Klebsiella spp. (K. pneumoniae and K. oxytoca) | Ciprofloxacin | 100% |
| | Trimethoprim/sulfamethoxazole | 89% (8/9) |
| | Meropenem | 100% |
| | Ceftazidime | 100% |
| | Nitrofurantoin | 100% |
| P. mirabilis | Ciprofloxacin | 100% |
| | Trimethoprim/sulfamethoxazole | 100% |
| | Meropenem | 100% |
| | Ceftazidime | 100% |

FIG. 32

| Bacterial Target | FISH Probes | Labeled | Final Concentration | Sequence | |
|---|---|---|---|---|---|
| E. coli | Eco649 | Alexa647N | 0.3 μM | /5Alex647N/GTCAATGAGCAAAGG | (SEQ ID NO: 103) |
| | Eco649 H1 | No label | 3 μM | ACTCCCTTCCTCCCCGCTG | (SEQ ID NO: 104) |
| | Eco649 H2 | No label | 3 μM | GGTGCTTCTTGCGGGTAA | (SEQ ID NO: 105) |
| P. aeruginosa | Pae002 | Alexa647N | 0.2 μM | /5Alex647N/CTTCAAAGATCCTTT/3Alex647N/ | (SEQ ID NO: 106) |
| | Pae002 H1 | No label | 1.5 μM | CGGTACGGGGCTATCACCA | (SEQ ID NO: 107) |
| | Pae002 H2 | No label | 1.5 μM | GCTCCGTCCTACTCGATTCA | (SEQ ID NO: 108) |
| | Pae004 H1 | No label | 1.5 μM | GGGCTAATCCCGGTTCGCTG | (SEQ ID NO: 109) |
| | Pae004 H2 | No label | 5 μM | ACTTCAGAGAGGTTCGCTA | (SEQ ID NO: 110) |
| | Pae005 H2 | No label | 1.5 μM | CCAGTGAGATCTATCTTGAG | (SEQ ID NO: 111) |
| | Pae005 H3 | No label | 5 μM | CGTGTAGTCTTCGACGGCCC | (SEQ ID NO: 112) |
| K. pneumoniae | Kpn003_2 | Alexa647N | 0.2 μM | /5Alex647N/CTTCGACTGGTCTCAGC/3Alex647N/ | (SEQ ID NO: 113) |
| | Kleb001 H1 | No label | 6 μM | TGCCTTCTCCGAAGTACGG | (SEQ ID NO: 114) |
| | Kleb23S H1 | No label | 1.5 μM | GCCAGTCGGTATCTTGACTG | (SEQ ID NO: 115) |
| | Kpn003 H3 | No label | 6 μM | ACAGTTGCACCAGCTGGTAT | (SEQ ID NO: 116) |
| K. oxytoca | Kox001_3 | Alexa647N | 0.6 μM | /5Alex647N/TCACYTACCATCAG/3Alex647N/ | (SEQ ID NO: 117) |
| | Kleb001 H1 | No label | 3 μM | TGCCTTCTCCGAAGTACGG | (SEQ ID NO: 118) |
| | Kleb23S H3 | No label | 3 μM | GCCAGTCGGTATCTTGACTG | (SEQ ID NO: 119) |
| P. mirabilis | Prot631-2 dye | Alexa647N | 0.6 μM | /5Alex647N/C+TGACTTAATT+GACC | (SEQ ID NO: 120) |
| | Prot631 H1 | No label | 3 μM | CCTGCGTGCGCTTACGCC | (SEQ ID NO: 121) |
| | Prot631 H2 | No label | 3 μM | TTAAGCTCGGGGCTTTCACA | (SEQ ID NO: 122) |

FIG. 33

| Antibiotics | Concentration 1 (μg/mL) | Concentration 2 (μg/mL) |
|---|---|---|
| Ciprofloxacin (CIP) | 0.25 | 0.5 |
| Nitrofurantoin (NIT) | 32 | 64 |
| Cefazolin (CFZ) | 8 | 16 |
| Trimethoprim/Sulfamethoxazole (TMP/SXT) | 1/19 | 2/38 |

| Bacteria Target | FISH Probes | Labeled | Final Concentration | Sequence | |
|---|---|---|---|---|---|
| E.coli | Eco469 | Alexa647 N | 0.3 µM | /5Alex647N/GTCAATGAGCAAAGG | (SEQ ID NO: 123) |
| | Eco469 H1 | No label | 3 µM | ACTCCCTTCCTCCCGCTG | (SEQ ID NO: 124) |
| | Eco469 H2 | No label | 3 µM | GGTGCTTCTTCTGCGGGTAA | (SEQ ID NO: 125) |

FIG. 36

| Target | Antibiotic | Essential Agreement | Categorical Agreement |
|---|---|---|---|
| E. coli | CIP | 100% | 100% |
| | CFZ | 100% | 100% |
| | NIT | 100% | 100% |
| | TMP/SXT | 100% | 100% |
| P. aeruginosa | CIP | 100% | 100% |
| | NIT | 100% | 100% |
| Klebsiella spp. | CIP | 100% | 100% |
| | CFZ | 100% | 100% |
| | NIT | 100% | 60% |
| | TMP/SXT | 100% | 100% |

FIG. 39

| Inoculum (CFU/mL) | MIC (μg/mL of NIT) |
|---|---|
| 2 E+03 | 8 |
| 2 E+04 | 8 |
| 1 E+05 | 8 |
| 2 E+05 | 16 |
| < 1 E+05 | 16 |
| 5 E+05 | 8 |
| 2 E+06 | 16 |
| 5 E+06 | 16 |
| 8 E+07 | 16 |

| Bacterial Target | FISH Probes | Labeled | Final Concentration | Sequence | Comment | |
|---|---|---|---|---|---|---|
| E. coli | P2 Coli Dye-10 | Alexa647N | 0.3 μM | /5Alex647N/GTCAATGAGCAAAGG | Not specific to E. coli | (SEQ ID NO: 126) |
| | P1 Universal Dye | No label | 3 μM | ACTCCCTTCCTCCCCGCTG | Not specific to E. coli | (SEQ ID NO: 127) |
| | P1 coli Helper 1 | No label | 3 μM | GGTGCTTCTTCTGCGGTAA | Not specific to E. coli | (SEQ ID NO: 128) |
| | Eco001 | Alexa647N | 1.2 μM | /5Alex647N/GTATTAACTTACTCC/3Alex647N/ | Specific to E. coli | (SEQ ID NO: 129) |
| | Eco001 H1 | No label | 1.5 μM | GGGTAACGTCAATGAGCAAAG | Specific to E. coli | (SEQ ID NO: 130) |
| | Eco001 H2 | No label | 1.5 μM | CTTCCTCCCCGCTGAAAGTAC | Specific to E. coli | (SEQ ID NO: 131) |
| P. aeruginosa | Pae002 | Alexa647N | 800 nM | /5Alex647N/CTTCAAAGATCCTTT/3Alex647N/ | Specific to P. aeruginosa | (SEQ ID NO: 132) |
| | Pae004 | Alexa647N | 800 nM | /5Alex647N/AAATCAATGAAGTTAA/3Alex647N/ | Specific to P. aeruginosa | (SEQ ID NO: 133) |
| | Pae002 H1 | No label | 3 μM | CGCGTACGGGCTATCACCCA | Specific to P. aeruginosa | (SEQ ID NO: 134) |
| | Pae002 H2 | No label | 3 μM | GCTTCGTCCTCACTGATTCA | Specific to P. aeruginosa | (SEQ ID NO: 135) |
| | Pae004 H1 | No label | 3 μM | GGGCTAATCCCGGTTCGCTG | Specific to P. aeruginosa | (SEQ ID NO: 136) |
| | Pae004 H2 | No label | 3 μM | ACTTCACGAGCGTTCGCTA | Specific to P. aeruginosa | (SEQ ID NO: 137) |
| K. pneumoniae | Kpn001 | Alexa647N | 1 μM | /5Alex647N/CACCTACACCATGGTTCACG/3Alex647N/ | Specific to K. pneumoniae | (SEQ ID NO: 138) |
| | Kpn003_2 | Alexa647N | 0.4 μM | /5Alex647N/CTTCGACTGGTTCACG/3Alex647N/ | Specific to K. pneumoniae | (SEQ ID NO: 139) |
| | Kleb001 H1 | No label | 6 μM | TGCCTTCTCCGAAGTTACG | Specific to K. pneumoniae | (SEQ ID NO: 140) |
| | Kleb23S H3 | No label | 6 μM | GCCACTGGTATCTTCGACTG | Specific to K. pneumoniae | (SEQ ID NO: 141) |
| | Kpn003 H3 | No label | 6 μM | ACACGTGCACCAGCTGGTAT | Specific to K. pneumoniae | (SEQ ID NO: 142) |

FIG. 42

| Target | Off Target Microbe added | Essential Agreement | Categorical Agreement |
|---|---|---|---|
| 1E+05 CFU per assay for E. coli | 1e+05 CFU per assay | 100% | 100% |
| | 1E+06 CFU per assay | 100% | 100% |
| | 1E+07 CFU per assay | 96% | 100% |

| | Bug | ABX | MultiPath | CLSI Compliant BMD | MP | BMD | Agree/Disagree |
|---|---|---|---|---|---|---|---|
| | 1e5E.coli with 1e5 S.aureus | LVX | 16 | 16 | R | R | Agree |
| | | CIP | 256 | 256 | R | R | Agree |
| | | NIT | 8 | 8 | S | S | Agree |
| | 1e5E.coli with 1e6 S.aureus | LVX | 16 | 16 | R | R | Agree |
| | | CIP | 256 | 256 | R | R | Agree |
| | | NIT | 8 | 8 | S | S | Agree |
| | 1e5E.coli with 1e7 S.aureus | LVX | 16 | 16 | R | R | Agree |
| | | CIP | 256 | 256 | R | R | Agree |
| | | NIT | 8 | 8 | S | S | Agree |
| | 1e5E.coli with 1e5 S.epiderm | LVX | 16 | 16 | R | R | Agree |
| | | CIP | 256 | 256 | R | R | Agree |
| | | NIT | 8 | 8 | S | S | Agree |
| | 1e5E.coli with 1e6 S.epiderm | LVX | 16 | 16 | R | R | Agree |
| | | CIP | 256 | 256 | R | R | Agree |
| | | NIT | 4 | 8 | S | S | Agree |
| | 1e5E.coli with 1e7 S.epiderm | LVX | 16 | 16 | R | R | Agree |
| | | CIP | 256 | 256 | R | R | Agree |
| | | NIT | 16 | 8 | S | S | Agree |
| | 1e5E.coli with 1e5 Citro | LVX | 16 | 16 | R | R | Agree |
| | | CIP | 256 | 256 | R | R | Agree |
| | | NIT | 8 | 8 | S | S | Agree |
| | 1e5E.coli with 1e6 Citro | LVX | 16 | 16 | R | R | Agree |
| | | CIP | 256 | 256 | R | R | Agree |
| | | NIT | 4 | 8 | S | S | Agree |
| | 1e5E.coli with 1e7 Citro | LVX | 16 | 16 | R | R | Agree |
| | | CIP | 256 | 256 | R | R | Agree |
| | | NIT | <1 | 8 | S | S | Agree |

FIG. 45

| Bug | ABX | MultiPath | CLSI Compliant BMD | MP | BMD | Agree/Disagree |
|---|---|---|---|---|---|---|
| 1e5E.coli with 1e5 | LVX | 32 | 16 | R | R | Agree |
|  | CIP | 256 | 256 | R | R | Agree |
| M.lut | NIT | 8 | 8 | S | S | Agree |
| 1e5E.coli with 1e6 | LVX | 16 | 16 | R | R | Agree |
|  | CIP | 256 | 256 | R | R | Agree |
| M.lut | NIT | 8 | 8 | S | S | Agree |
| 1e5E.coli with 1e7 | LVX | 32 | 16 | R | R | Agree |
|  | CIP | 256 | 256 | R | R | Agree |
| M.lut | NIT | 4 | 8 | S | S | Agree |
| 1e5E.coli with 1e5 | LVX | 16 | 16 | R | R | Agree |
|  | CIP | 256 | 256 | R | R | Agree |
| Abaum | NIT | 8 | 8 | S | S | Agree |
| 1e5E.coli with 1e6 | LVX | 16 | 16 | R | R | Agree |
|  | CIP | 256 | 256 | R | R | Agree |
| Abaum | NIT | 4 | 8 | S | S | Agree |
| 1e5E.coli with 1e7 | LVX | 16 | 16 | R | R | Agree |
|  | CIP | 256 | 256 | R | R | Agree |
| Abaum | NIT | 4 | 8 | S | S | Agree |
| 1e5E.coli with 1e5 | LVX | 16 | 16 | R | R | Agree |
|  | CIP | 256 | 256 | R | R | Agree |
| Corny | NIT | 8 | 8 | S | S | Agree |
| 1e5E.coli with 1e6 | LVX | 16 | 16 | R | R | Agree |
|  | CIP | 256 | 256 | R | R | Agree |
| Corny | NIT | 4 | 8 | S | S | Agree |
| 1e5E.coli with 1e7 | LVX | 16 | 16 | R | R | Agree |
|  | CIP | 256 | 256 | R | R | Agree |
| Corny | NIT | 4 | 8 | S | S | Agree |

FIG. 46

| Bug | ABX | MP | CLSI Compliant BMD | MP | BMD | Agree/Disagree |
|---|---|---|---|---|---|---|
| E.coli 2469 control (no Klebsiella) | NIT | 8 | 8 | S | S | Agree |
| | CFZ | >128 | >128 | R | R | Agree |
| | CIP | >128 | >128 | R | R | Agree |
| | TMP/SXT | >128 | >128 | R | R | Agree |
| | LVX | 16 | 16 | R | R | Agree |
| E.coli 2469 with 5e3 K. pneumoniae | NIT | 8 | 8 | S | S | Agree |
| | CFZ | >128 | >128 | R | R | Agree |
| | CIP | >128 | >128 | R | R | Agree |
| | TMP/SXT | >128 | >128 | R | R | Agree |
| | LVX | 16 | 16 | R | R | Agree |
| E.coli 2469 with 5e4 K. pneumoniae | NIT | 16 | 8 | S | S | Agree |
| | CFZ | >128 | >128 | R | R | Agree |
| | CIP | >128 | >128 | R | R | Agree |
| | TMP/SXT | >128 | >128 | R | R | Agree |
| | LVX | 16 | 16 | R | R | Agree |
| E.coli 2469 with 5e5 K. pneumoniae | NIT | 16 | 8 | S | S | Agree |
| | CFZ | >128 | >128 | R | R | Agree |
| | CIP | >128 | >128 | R | R | Agree |
| | TMP/SXT | >128 | >128 | R | R | Agree |
| | LVX | 16 | 16 | R | R | Agree |
| E.coli 2469 with 5e6 K. pneumoniae | NIT | 4 | 8 | S | S | Agree |
| | CFZ | >128 | >128 | R | R | Agree |
| | CIP | >128 | >128 | R | R | Agree |
| | TMP/SXT | >128 | >128 | R | R | Agree |
| | LVX | 16 | 16 | R | R | Agree |
| E.coli 2469 with 2.5e7 K. pneumoniae | NIT | 8 | 8 | S | S | Agree |
| | CFZ | >128 | >128 | R | R | Agree |
| | CIP | >128 | >128 | R | R | Agree |
| | TMP/SXT | >128 | >128 | R | R | Agree |
| | LVX | 16 | 16 | R | R | Agree |

FIG. 47

| Bacterial Target | FISH Probes | Labeled | Final Concentration | Sequence | |
|---|---|---|---|---|---|
| E. coli | Eco001 | Alexa647N | 0.8 μM | /5Alexa647N/GTATTAACTTACTCC/3Alexa647N/ | (SEQ ID NO: 143) |
| | Eco002 | Alexa647N | 0.4 μM | /5Alexa647N/ACACACTGATTCA/3Alexa647N/ | (SEQ ID NO: 144) |
| | Eco001 H1 | No label | 3 μM | GCGTAAGTCAATGAGCAAAG | (SEQ ID NO: 145) |
| | Eco001 H2 | No label | 3 μM | CTTCCTCCCGGCTGAAAGTAC | (SEQ ID NO: 146) |
| | Eco002 H6 | No label | 3 μM | TTTCCAGACGGTTCCACTAAC | (SEQ ID NO: 147) |
| | Eco002 H7 | No label | 3 μM | GGCTCTCGGCTTCCCCGT | (SEQ ID NO: 148) |

FIG. 48

| Bacterial Target | FISH Probes | Labeled | Final Concentration | Sequence | |
|---|---|---|---|---|---|
| E. coli | Eco001 | Alexa647N | 0.7 µM | /5Alex647N/GTATTAACTTACTCC/3Alex647N/ | (SEQ ID NO: 149) |
| | Eco002 | Alexa647N | 0.4 µM | /5Alex647N/ACACACACTGATTCA/3Alex647N/ | (SEQ ID NO: 150) |
| | Eco001 H1 | No label | 3 µM | GGGTAACGTCAATGAGCAAAG | (SEQ ID NO: 151) |
| | Eco001 H2 | No label | 3 µM | CTTCCTCCCCGCTGAAAAGTAC | (SEQ ID NO: 152) |
| | Eco002 H6 | No label | 3 µM | TTTCCAGACGCTTCCACTAAC | (SEQ ID NO: 153) |
| | Eco002 H7 | No label | 3 µM | GGCTCTGGGCTCCTCCCCGT | (SEQ ID NO: 154) |

FIG. 51

| Urine Sample | Essential Agreement Across 5 Antibiotics | Categorical Agreement Across 5 Antibiotics |
|---|---|---|
| Urine A | 100% | 100% |
| Urine B | 100% | 100% |
| Urine C | 100% | 100% |
| Urine D | 100% | 100% |
| Urine E | 100% | 100% |
| Urine F | 100% | 100% |
| Urine G | 100% | 100% |
| Urine H | 100% | 100% |
| Urine I | 100% | 100% |
| Urine J | 100% | 100% |
| Urine K | 100% | 100% |
| Urine L | 100% | 100% |
| Urine M | 100% | 100% |
| Urine N | 100% | 100% |
| Urine O | 100% | 100% |

FIG. 53

| Antibiotics | LVX | CIP | CFZ | TMP/SXT | NIT |
|---|---|---|---|---|---|
| CLSI Compliant | 16 | 128 | >128 | >128 | 8 |
| Urine A | 16 | 128 | >128 | >128 | 8 |
| Urine B | 16 | >128 | >128 | >128 | 8 |
| Urine C | 32 | >128 | >128 | >128 | 4 |
| Urine D | 8 | 128 | >128 | >128 | 4 |
| Urine E | 16 | 128 | >128 | >128 | 8 |
| Urine F | 32 | >128 | >128 | >128 | 8 |
| Urine G | 16 | 128 | >128 | >128 | 8 |
| Urine H | 16 | >128 | >128 | >128 | 8 |
| Urine I | 16 | >128 | >128 | >128 | 8 |
| Urine J | 16 | 128 | >128 | >128 | 8 |
| Urine K | 8 | 128 | >128 | >128 | 8 |
| Urine L | 16 | 128 | >128 | >128 | 8 |
| Urine M | 16 | 128 | >128 | >128 | 8 |
| Urine N | 8 | 128 | >128 | >128 | 8 |
| Urine O | 16 | >128 | >128 | >128 | 8 |

FIG. 54

| Bacterial Target | FISH Probes | Labeled | Final Concentration | Sequence | Comment |
|---|---|---|---|---|---|
| E. coli | P1 Universal Dye 647 | Cy3 | 300 nM | CCGTACTCCCCA/Cy3/GGC | Not specific to E. coli (SEQ ID NO: 155) |
| | P2 E.Coli Dye-10 647 | Cy5 | 300 nM | GGT/Cy5/CGAACTTA | Not specific to E. coli (SEQ ID NO: 156) |
| | Helper E.Coli | No label | 6 μM | 5'ACGGGTAGCTCGGAAGCCA | Not specific to E. coli (SEQ ID NO: 157) |

FIG. 55

S. aureus no cells

S. aureus no cells

| Bacteria | Strain ID | Susceptibility to Ciprofloxacin |
|---|---|---|
| E. coli | ATCC 25922 | Sensitive |
| E. coli | BAA 2469 | Resistant |
| K. pneumoniae | CDC 0076 | Sensitive |
| K. pneumoniae | CDC 0043 | Resistant |
| P. aeruginosa | CDC 0233 | Sensitive |
| P. aeruginosa | CDC 0236 | Resistant |
| E. faecalis | ATCC 29212 | Sensitive |
| E. faecium | ATCC 19434 | Resistant |

FIG. 59

| Bacterial Target | FISH Probes | Labeled | Final Concentration | Sequence | |
|---|---|---|---|---|---|
| E. coli | Eco001 | Alexa647N | 1.2 μM | /5Alex647N/GTATTAACTTACTCC | (SEQ ID NO: 158) |
| | Eco002 | Alexa647N | 0.6 μM | /5Alex647N/ACACACTCGATTCA/3Alex647N/ | (SEQ ID NO: 159) |
| | Eco002_H6 | No label | 3 μM | TTTCCAGAGGCTTCCACTAAC | (SEQ ID NO: 160) |
| | Eco002_H7 | No label | 3 μM | GGCTCTGGGCTCCTCCCGT | (SEQ ID NO: 161) |
| | Eco001_H2 | No label | 3 μM | CTTCCTCCCGTGAAAGTAC | (SEQ ID NO: 162) |
| | Eco001_H1 | No label | 3 μM | GGGTAAGGTCAATGAGCAAAG | (SEQ ID NO: 163) |
| P. aeruginosa | Pae002_2 dye | Alexa647N | 0.4 μM | /5Alex647N/CTTCAAAGATCCTTT/3Alex647N/ | (SEQ ID NO: 164) |
| | Pae004_2 dye | Alexa647N | 0.5 μM | /5Alex647N/AAATCAATGAAGCTTAA/3Alex647N/ | (SEQ ID NO: 165) |
| | Pae005_1_2 dye | Alexa647N | 1.1 μM | /5Alex647N/TTCAGGGGAATCAAGTTC/3Alex647N/ | (SEQ ID NO: 166) |
| | Pae002_H1 | No label | 1.5 μM | CGGGTAGGGGCTATCACCCA | (SEQ ID NO: 167) |
| | Pae002_H2 | No label | 1.5 μM | GCTCCGTCCTACCGATTCA | (SEQ ID NO: 168) |
| | Pae004_H1 | No label | 1.5 μM | GGGCTAATCCCCGTTCGCTCG | (SEQ ID NO: 169) |
| | Pae004_H2 | No label | 5 μM | ACTTCCAGAGAGGTCCGGCTA | (SEQ ID NO: 170) |
| | Pae005_1_H2 | No label | 1.5 μM | CCAGTGAGATTCATCTTGAG | (SEQ ID NO: 171) |
| | Pae005_1_H3 | No label | 5 μM | CGTCGTAGTCTTCGACGGCC | (SEQ ID NO: 172) |

FIG. 60

| | | | | |
|---|---|---|---|---|
| K. pneumoniae | Kpn003_2 | Alexa647N | 0.4 μM | /5Alex647N/CTTGGACTGGTCCTCAGC/3Alexf647N/ | (SEQ ID NO: 173) |
| | Kpn001-A | Alexa647N | 1 μM | /5Alex647N/CACTTACACACCAGCG/3Alexf647N/ | (SEQ ID NO: 174) |
| | Kleb001 H1 | No label | 6 μM | TGCCTCTCCGAAGTTACCG | (SEQ ID NO: 175) |
| | Kleb23S H3 | No label | 1.5 μM | GCCAGTGGTATCTTGACTG | (SEQ ID NO: 176) |
| | Kpn003 H3 | No label | 6 μM | ACAGTGCCAGCCAGTGGTAT | (SEQ ID NO: 177) |
| Enterococcus spp. | Ent001-2 dye | Alexa647N | 0.8 μM | /5Alex647N/TTGTACTTCCCA/3Alexf647N/ | (SEQ ID NO: 178) |
| | Ent003-2 dye | Alexa647N | 0.8 μM | /5Alex647N/AACAAAAACAACGGTAC/3Alexf647N/ | (SEQ ID NO: 179) |
| | Ent004- 2 dye | Alexa647N | 0.8 μM | /3Alex647N/TGCATTCCTTAGC/3Alexf647N/ | (SEQ ID NO: 180) |
| | Ent006-2 dye | Alexa647N | 0.8 μM | /5Alex647N/CATCATTCTCAATTC/3Alexf647N/ | (SEQ ID NO: 181) |
| | Ent001H1 | No label | 2.85 μM | AGGAATATCAACTGTTRTC | (SEQ ID NO: 182) |
| | Ent001H3 | No label | 2.85 μM | GTTKCGGTACGGCMGYGT | (SEQ ID NO: 183) |
| | Ent001H4 | No label | 2.85 μM | TTCTCACTAGAAGTTTTCT | (SEQ ID NO: 184) |
| | Ent003H2_1 | No label | 2.85 μM | CTMCTCGTCCTCCATTGCTA | (SEQ ID NO: 185) |
| | Ent004H2hs | No label | 2.85 μM | GGACATGCACTTCCAATGCA | (SEQ ID NO: 186) |
| | Ent004H2fsm | No label | 2.85 μM | TTCGAGACATTCCGATCG | (SEQ ID NO: 187) |
| | Ent004H4_2 | No label | 2.85 μM | CAGGAACTTCGTATTATTAT | (SEQ ID NO: 188) |
| | Ent006H1 | No label | 2.85 μM | GTCCAAACAGTGCTCTTACTC | (SEQ ID NO: 189) |
| | Ent006H2 | No label | 2.85 μM | TCGGTAACCCGAGATGGCCCTA | (SEQ ID NO: 190) |
| | Ent006H3 | No label | 2.85 μM | CGAGGTAGCCCTAAAGCTAT | (SEQ ID NO: 191) |
| | Ent006H1 | No label | 2.85 μM | TTGTABCAAGTGTGTAGCCC | (SEQ ID NO: 192) |
| | Ent001H4 | No label | 2.85 μM | TGAGAGAAAGCTTTAAGAGATT | (SEQ ID NO: 193) |

FIG. 61

| Labeled Target ↓ | Unlabeled Second Target | | | | | | | |
|---|---|---|---|---|---|---|---|---|
| | Sensitive E. coli | Resistant E. coli | Sensitive P. aeruginosa | Resistant P. aeruginosa | Sensitive K. pneumoniae | Resistant K. pneumoniae | Sensitive Enterococcus | Resistant Enterococcus |
| Sensitive E. coli | | | 100% | 100% | 100% | 100% | 100% | 100% |
| Resistant E. coli | | | 100% | 100% | 100% | 100% | 100% | 100% |
| Sensitive P. aeruginosa | 100% | 100% | | | 100% | 100% | 100% | 100% |
| Resistant P. aeruginosa | 100% | 100% | | | 100% | 100% | 100% | 100% |
| Sensitive K. pneumoniae | 100% | 100% | 100% | 100% | | | 100% | 100% |
| Resistant K. pneumoniae | 100% | 100% | 100% | 100% | | | 100% | 100% |
| Sensitive Enterococcus | 100% | 100% | 100% | 100% | 100% | 100% | | |
| Resistant Enterococcus | 100% | 100% | 100% | 100% | 100% | 100% | | |

FIG. 62

| Labeled Target ↓ | Unlabeled Second Target | | | | | | | |
|---|---|---|---|---|---|---|---|---|
| | Sensitive E. coli | Resistant E. coli | Sensitive P. aeruginosa | Resistant P. aeruginosa | Sensitive K. pneumoniae | Resistant K. pneumoniae | Sensitive Enterococcus | Resistant Enterococcus |
| Sensitive E. coli | | | 100% | 100% | 100% | 100% | 100% | 100% |
| Resistant E. coli | | | 100% | 100% | 100% | 100% | 100% | 100% |
| Sensitive P. aeruginosa | 100% | 100% | | | 100% | 100% | 100% | 100% |
| Resistant P. aeruginosa | 100% | 100% | | | 100% | 100% | 100% | 100% |
| Sensitive K. pneumoniae | 100% | 100% | 100% | 100% | | | 100% | 100% |
| Resistant K. pneumoniae | 100% | 100% | 100% | 100% | | | 100% | 100% |
| Sensitive Enterococcus | 100% | 100% | 100% | 100% | 100% | 100% | | |
| Resistant Enterococcus | 100% | 100% | 100% | 100% | 100% | 100% | | |

FIG. 63

| Organisms Spiked into Culture Negative Urine | | Culture Negative Urine | Did probe detect organisms spiked into culture negative urine? | | |
|---|---|---|---|---|---|
| | | | E. coli Probe n=2 | K. pneumoniae Probe n=2 | P. aeruginosa Probe n=2 |
| E. coli | K. pneumoniae | 1 | Y | Y | N |
| | | 2 | Y | Y | N |
| | | 3 | Y | Y | N |
| | | 4 | Y | Y | N |
| | | 5 | Y | Y | N |
| | | 6 | Y | Y | N |
| | | 7 | Y | Y | N |
| | | 8 | Y | Y | N |
| | | 9 | Y | Y | N |
| | | 10 | Y | Y | N |
| E. coli | P. aeruginosa | 1 | Y | N | Y |
| | | 2 | Y | N | Y |
| | | 3 | Y | N | Y |
| | | 4 | Y | N | Y |
| | | 5 | Y | N | Y |
| | | 6 | Y | N | Y |
| | | 7 | Y | N | Y |
| | | 8 | Y | N | Y |
| | | 9 | Y | N | Y |
| | | 10 | Y | N | Y |
| K. pneumoniae | P. aeruginosa | 1 | N | Y | Y |
| | | 2 | N | Y | Y |
| | | 3 | N | Y | Y |
| | | 4 | N | Y | Y |
| | | 5 | N | Y | Y |
| | | 6 | Invalid | | |
| | | 7 | N | Y | Y |
| | | 8 | N | Y | Y |
| | | 9 | N | Y | Y |
| | | 10 | N | Y | Y |

FIG. 67

| Bacterial Target | FISH Probes | Labeled | Final Concentration | Sequence | |
|---|---|---|---|---|---|
| E. coli | Eco469 | Alexa647N | 0.8 μM | /5Alex647N/GTCAATGAGCAAAGG | (SEQ ID NO: 193) |
| | Eco469 H1 | No label | 3 μM | ACTCCCTTCCTCCCCGCTG | (SEQ ID NO: 194) |
| | Eco469 H2 | No label | 3 μM | GGTGTGCTTCTTCGCGGGTAA | (SEQ ID NO: 195) |
| P. aeruginosa | Pae002 | Alexa647N | 0.2 μM | /5Alex647N/CTTCAAAGATCCTTT/3Alexf647N/ | (SEQ ID NO: 196) |
| | Pae002 H1 | No label | 1.5 μM | CGGCTACGGGCCTATCACCCA | (SEQ ID NO: 197) |
| | Pae002 H2 | No label | 1.5 μM | GCTCCGTCCTACTCGATTCA | (SEQ ID NO: 198) |
| | Pae004 H1 | No label | 1.5 μM | GGGCTAATCCCCGGTTGCTCG | (SEQ ID NO: 199) |
| | Pae004 H2 | No label | 5 μM | ACTTCCAGACGGTTCGGCTA | (SEQ ID NO: 200) |
| | Pae005 H2 | No label | 1.5 μM | CCAGTGAGATCTCATCTGAG | (SEQ ID NO: 201) |
| | Pae005 H3 | No label | 5 μM | CGTCGTAGTCTTCGACGCCC | (SEQ ID NO: 202) |
| K. pneumoniae | Kpn003_2 | Alexa647N | 0.2 μM | /5Alex647N/CTTCGACTGGTCCAGC/3Alexf647N/ | (SEQ ID NO: 203) |
| | Kleb001 H1 | No label | 6 μM | TGCCCTTCCTCCCGAAGTTAGG | (SEQ ID NO: 204) |
| | Kleb23S H3 | No label | 1.5 μM | GCCAGTGGTATCTTGACTG | (SEQ ID NO: 205) |
| | Kpn003 H3 | No label | 6 μM | ACAGTTGCAGCCAGCTGGTAT | (SEQ ID NO: 206) |

FIG. 68

DETECTION AND ANALYSIS OF CELLS

GOVERNMENT SUPPORT

This invention was made with government support under grant number R01 AI117058 awarded by the National Institutes of Health as well as contract number HHSO100201500022C awarded by the Biomedical Advanced Research and Development Authority. The government has certain rights in the invention.

TECHNICAL FIELD

The disclosure relates to a fluorescent in situ hybridization (FISH) method for identifying and quantifying cells in a biological specimen.

BACKGROUND

The epidemic of life-threatening infections caused by antibiotic-resistant bacteria is fueling a global healthcare crisis. The problem is driven, in part, by the fact that conventional diagnostic methods require days to determine the optimal antimicrobial treatments to treat infection in a patient. Delays caused by slow testing lead to suboptimal treatment, poor medical outcomes, and overuse of powerful broad-spectrum antibiotics that cause the spread of antibiotic resistance. Mortality due to infections caused by resistant bacteria is increasing precipitously. A 2014 report by the Review on Antimicrobial Resistance estimates that by the year 2050, antimicrobial resistance will be responsible for more than 10 million fatalities per year.

Unfortunately, conventional methods to identify the effective targeted antibiotics, called antimicrobial susceptibility testing (AST) methods, require days to deliver results. One reason that conventional antimicrobial susceptibility testing takes so long is that the tests require a large number—on the order of millions—of purified pathogen cells. One or more days are needed to use the more than 11-year-old colony purification method to purify a sufficient number of cells by culturing in petri dishes. Once the purified cells are available, one or more days are needed to identify the pathogens and determine which antibiotics will be effective for treating the patient.

In the meantime, patients are treated "empirically" with broad-spectrum antibiotics that kill a broad range of pathogens that might be causing the infection. The broad-spectrum antibiotics are generally not the optimal therapy and can fail to effectively treat the infection. Empiric use of broad-spectrum antibiotics also causes the spread of antibiotic resistance. The broad-acting drugs cause resistance not only in the disease-causing pathogens, but also in the trillions of benign microbes that populate the human body. In the absence of rapid diagnostics to determine which patients actually have infections, uninfected patients are unnecessarily treated with the resistance-causing antibiotics.

High costs of healthcare in the United States can also be attributed to the lengthy times for determining effective antimicrobial treatments. For example, nearly $10B of healthcare costs in the United States comes from common life-threatening hospital-acquired infections, such as surgical site infections and ventilator-acquired pneumonia, and the length of stay in the hospital is the largest cost attributable to these infections. The hospital stay is lengthy due to the conventional methods used, which require days to determine if a patient has an infection and which antimicrobial agents are most likely to be effective. Delays are caused by the time-consuming cell purification steps the methods require. Furthermore, while waiting for the cell purification steps use in conventional methods, the patients are treated empirically with broad-spectrum antibiotics, which may be suboptimal and cause the spread of resistance. Moreover, because the antibiotics are prescribed before diagnostics results are even available, uninfected patients are often unnecessarily treated and acquire antibiotic resistance.

SUMMARY

The invention addresses the need for diagnostic tests that detect infections and determine the effective antimicrobial treatment much more rapidly than conventional methods. The invention eliminates the time-consuming steps needed by conventional methods to generate large numbers of purified cells. Methods of the invention detect infections, identify the infectious pathogens, and identify effective antimicrobial agents in several hours, rather than the days required by conventional methods. By detecting infections, identifying and quantifying the infectious pathogens, and determining the effective targeted antimicrobial agents much closer to the onset of symptoms in patients, the invention allows for dramatic improvement in medical outcomes and minimizes empiric treatment with resistance-causing broad-spectrum antibiotics.

Specifically, methods of the invention use fluorescent in situ hybridization (FISH) and allow for sensitive and efficient detection and quantification of infectious pathogens directly in patient specimens. The invention provides high performance tests for identifying effective antimicrobial agents used to treat infections in a patient, while eliminating the time-consuming steps for purifying large numbers of cells required by conventional methods.

The invention makes it possible to detect infections and detect and quantify the infectious pathogen in about 30 minutes, compared to the days required by conventional methods. The invention can further identify effective antibiotic therapies in several hours, compared to the days required by conventional methods. Medical outcomes can be improved by administering effective antibiotic therapy to a patient days earlier than would be provided in conventional methods. The earlier treatment can also help attenuate the overuse of empirically prescribed broad-spectrum antibiotics which causes the spread of resistance.

Conventional methods for determining effective treatment, called antimicrobial susceptibility testing methods, require days to deliver results, in part because these methods require millions purified pathogen cells. The process for generating these purified cells uses a time-consuming colony purification method for culturing the disease-causing pathogen cells on petri dishes. Colony purification typically takes one or more days to complete. After colony purification, another day or more is generally required to identify the pathogen species and for antimicrobial susceptibility testing to determine which antimicrobial agents should be used to treat the patient.

The invention provides significant improvement in time to results when compared to conventional methods because methods of the invention are able to analyze patient specimens directly without requiring time-consuming steps for preparing of large numbers of purified pathogen cells.

Antimicrobial susceptibility testing can be viewed as a stepwise process. The goal is to determine which members of a panel of antimicrobial agents are effective for the particular pathogen strain that is causing a patient's infection. The steps are infection detection, pathogen identification, and antimicrobial susceptibility testing. Identifying the species of the pathogen is essential for choosing the appropriate antimicrobials and determining the dosing that can be used for treating that species. Quantification of the pathogen can indicate whether the pathogen is responsible for an infection. The invention can be used to accelerate each of these steps, allowing for inventive integrated systems and methods to carry out the entire process.

In conventional methods, when an infection is suspected, a patient specimen is sent to a clinical microbiology lab where the specimen is applied to the surface of a petri plate containing nutrient agar. Microbial cells divide in place on the plate so that the next day a visible colony containing millions of pure cells corresponding to a microbial cell that was in the specimen. The number of colonies are counted to assess whether the cell concentration in the specimen indicates an infection. If so, the purified cells from the colony are identified using a variety of methods. A species of pathogen is first identified and quantified. Identification, usually to the species level, can be done using manual or automated microbiological and/or biochemical tests, Matrix-Assisted Laser Desorption/Ionization-Time Of Flight (MALDI-TOF) mass spectrometry (MS), or genetic methods nucleic acid amplification (for example the polymerase chain reaction, or PCR) or DNA sequencing. Importantly, the purified cells from the colony purification step are then used to determine the effective antimicrobial agents for treating the infection. However, the patient is medically vulnerable while waiting the 2 to 5 days required to complete the combination of colony purification to detect infections followed by pathogen quantification, pathogen identification, and antimicrobial susceptibility testing.

Existing rapid methods that detect infections, quantify pathogens, and identify pathogens directly from patient specimens and do not require the time-consuming colony-purification step include real-time PCR and some FISH methods. However, these methods are impractical for being used for the subsequent antimicrobial susceptibility testing step, and the goal of the entire process—determining which antibiotics will effectively target a patient's infection—is still dependent on conventional cell or colony purification, which requires days. Real-time PCR can specifically identify small numbers of unpurified pathogen cells patient specimens, but is impractical for use in the subsequent antimicrobial susceptibility testing step. Moreover, the FISH methods which use microscopic imaging are generally limited to analysis of samples with high concentrations of pathogen cells and thus are not useful for the many specimens from infected patients which have low numbers of pathogen cells.

Methods of the invention use FISH to detect infection and identify pathogens. The methods are rapid, requiring only about 30 minutes compared to the days required by conventional methods. The methods can also quantify and specifically identify small numbers of unpurified pathogen cells in patient specimens that may contain the many types of other bacteria that are often present in human samples. In contrast to conventional methods, the inventive FISH methods can be used to rapidly analyze unpurified cells from patient specimens not only for infection detection, pathogen quantification, and pathogen identification, but also for antimicrobial susceptibility testing. Thus, the invention provides for integrated methods for full analysis of a patient specimen to deliver potentially life-saving antimicrobial therapy recommendations to clinicians.

Today, after species identification using the pathogen cells purified by colony purification, the purified cells are used for antimicrobial susceptibility testing. Antimicrobial susceptibility testing, sometimes called phenotypic antimicrobial susceptibility testing, tests which antimicrobial agents can inhibit replication of the pathogen cells in nutrient microbiological medium. This microbiological medium, in the absence of any antimicrobial agents, fosters rapid cell division of microbes causing the of cells to increase. Two methods are commonly used for antimicrobial susceptibility testing. In one method, which can be carried out manually or on automated systems, a defined concentration of the purified pathogen cells is added to each of several portions microbiological medium, which contain various concentrations of various antimicrobial agents. The portions are incubated at physiological temperature (typically 35-37° C.) generally overnight after which the portions are assessed to determine if the post-incubation concentration of pathogen cells has significantly increased. Typical methods for assessing the portions for pathogen growth include visual or spectrophotometric examination for an increase in turbidity of the portions, either of which can be done manually or automatically. A portion in which the cells did not increase in number, indicates that antimicrobial agent and concentration was effective for inhibiting cells division. The results of the process are compared to tables of published standards (e.g, from CLSI or EUCAST) for pathogen-antimicrobial agent combinations to determine to interpret the pathogen's susceptibility or resistance to each of the antimicrobial agents tested. The antimicrobial susceptibility results and recommended antimicrobial agents for treatment are then reported to the clinician.

Both conventional methods and the inventive method for antimicrobial susceptibility testing follow the steps above, but the inventive method determines a pathogen's antimicrobial susceptibility profile in several hours while conventional methods require several days. The rapid antimicrobial susceptibility testing results using the inventive method arise from the new FISH method's ability to count small numbers of pathogen cells specifically in patient specimens without the time-consuming colony purification steps of the conventional method.

Aspects of the inventive systems and methods allows for the ability to rapidly deliver antimicrobial susceptibility results directly from patient specimens. Firstly, patient specimens generally contain orders of magnitude fewer cells than are required for traditional antimicrobial susceptibility testing. The inventive methods, in contrast to current culture-pre-enrichment dependent methods, can enumerate small numbers of pathogen cells by sensitive single cell counting using non-magnified digital imaging. Furthermore, because the method enumerates small numbers of individual cells, it can very quickly—in only a few bacterial generations—determine whether the cells have increased in number in an aliquot containing an antimicrobial and growth medium.

Secondly, patient specimens contain sample matrix and commensal microbes unrelated to the infectious pathogens. Guidelines for conventional methods (for example, from the Clinical Laboratories Standards Institute [CLSI] or the European Committee on Antimicrobial Susceptibility Testing [EUCAST]) require purified culture cells resulting from clonal growth of colonies on agar-based growth media in petri dishes. These cells contain only a single microbial species and no sample matrix.

As discussed above, the identity of the pathogen species must be known in order to interpret antimicrobial susceptibility testing results correctly for arriving at effective clinical treatment options. This is a key reason underlying why conventional and most emerging antimicrobial susceptibility testing methods require a pure culture of cells.

To determine the antimicrobial susceptibility profile, as described above, the conventional and most emerging methods assess the impact of different antimicrobials at different concentrations on the growth of the target pathogen. The reason why these methods require a pure population of identified cells to interpret the antimicrobial susceptibility testing results is that these methods use non-specific methods, for example light-scattering or microscopy, for assessing growth in the antimicrobial-containing aliquots. Consider the case if there were more than one species present, for example a pathogen and species of normal microbes that are part of the human microbiome—which is the case in most primary patient specimens. If growth were observed in an antimicrobial-containing aliquot, it would be impossible to tell, using a general method for detecting growth, such as detecting a change in turbidity, whether the disease-causing pathogen or one or more of the commensal species was resistant and capable of growing.

In contrast, to conventional methods that require purified pathogen cells, the inventive methods use pathogen-specific detection to assess growth of the pathogen in the presence of various antimicrobials. Because only the disease-causing pathogen cells are enumerated after the incubation step (any commensal microbes are not enumerated), the inventive method can be used to determine antimicrobial susceptibility directly in the non-sterile primary specimen containing one or many commensal microbial species.

Systems and methods of the invention for pathogen identification can be used to determine whether a specimen contains cells of pathogen species in sufficient numbers to be suspected of causing an infection. Systems and methods of the invention for antimicrobial susceptibility testing can be used to determine which of one or more antimicrobial agents can prevent normal cellular replication of a pathogen that is suspected of causing an infection in a patient specimen. Such antimicrobial agents can potentially be used to effectively treat a patient's infection.

In a preferred embodiment of the inventive method for antimicrobial susceptibility testing, a specimen is into separate portions containing nutrient growth medium to promote microbiological cell replication or growth. One or more of said portions may be used as a reference or baseline portion which is directly processed and analyzed by the inventive method before incubation at a temperature that promotes growth to determine the number and quality of pathogen cells.

One or more of said portions may be incubated at a temperature that promotes growth of the pathogen cells to ascertain if the pathogen cells are viable. Other of said portions each contain, in addition, one or more antimicrobial agents at particular concentrations, are incubated to determine the impact of the antimicrobial agents on pathogen cellular replication.

The invention provides methods for FISH which can detect, quantify, and identify specific target cells in about 30 minutes. Methods of the invention can be practically integrated into systems for analyzing patient specimens for the presence of infections, pathogen identification and quantification, and antimicrobial susceptibility testing in several hours rather than the days required by conventional methods.

Methods of the invention include FISH methods that use a concerted reaction, combining cell permeabilization, nucleic acid hybridization of target-specific fluorescent probes to cellular nucleic acids, and magnetically tagging of the target cells. The inventive methods allow magnetic selection to draw the magnetically tagged cells through a dense opaque dye-cushion layer and to deposit them on an imaging surface on which the FISH-labeled cells can be imaged and analyzed. The dye-cushion optically sequesters both the specimen and the unbound fluorescent FISH probes from the imaging surface eliminating the need for the wash steps to that are typically required in other FISH methods to remove the potentially fluorescent specimen and the unbound fluorescent probe. This approach minimizes or eliminates sample preparation steps, simplifies instrumentation, and increases signal to noise.

The cells labeled using the FISH methods can be imaged using non-magnified digital imaging to count individual cells. This enables rapid, efficient, and low-cost imaging of small numbers of specific target cells in a specimen.

The methods include using the FISH methods to rapidly assess the inhibition of cell division by antimicrobial agents to determine antimicrobial susceptibility of pathogens in patient specimens without requiring cell purification. The FISH methods can be used to perform cell permeabilization, nucleic acid hybridization of target-specific fluorescent probes to cellular nucleic acids, and magnetically tagging of the target cells at single temperature compatible with the cellular replication of pathogens. This permits antimicrobial susceptibility testing in a single instrument and close consumable without requiring liquid handling.

The FISH methods include methods for stabilizing the reagents of the methods in dry form that can be rapidly dissolved in liquid-containing specimen potentially containing pathogens. The FISH methods include methods for multiplexing so that multiple pathogens can be simultaneously analyzed in a single patient specimen. Thus, the FISH methods can be used in integrated systems that can rapidly and efficiently detect infections, detect and quantify and identify pathogens, and determine antimicrobial susceptibility testing.

In some embodiments, all the steps of the method are performed at body temperature to detect and identify pathogenic bacteria in clinical samples. A sample such as a urine sample is loaded into a cartridge and fluorescently labeled for imaging with a microscope. In the cartridge, bacterial cells are chemically permeabilized to promote uptake of species-specific fluorescent probes. Labelled bacteria are pulled down onto an imaging surface and a dye cushion is used to keep unbound probes off of the imaging surface. An image of the surface shows whether and in what quantities the infectious bacteria are present in the clinical sample.

Specific chemical reagents are provided that permeabilize the cells and help the fluorescent probes bind, to allow the entire process to be performed without heating above "body temperature". Keeping the process at about 37 degrees C. promotes a result that faithfully shows what organisms are in the original sample. Traditional FISH protocols require heating above 70 degrees C. to denature target DNA. That temperature would prevent the growth of human pathogens. Embodiments of the inventive FISH method that perform efficiently at physiological temperatures enable simplified low-cost integrated systems for antimicrobial susceptibility testing that combine differential growth in the presence of antimicrobial agents with specific detection of small numbers of unpurified pathogen cells in a constant temperature environment.

That heat would have adverse effects on the sample, killing some cells that should be detected, while possibly promoting the growth of otherwise irrelevant cells. Extreme heat also interferes with chemical and metabolic processes in the sample in ways that distort the results. By maintaining the sample at physiological temperature, the final imaging result accurately depicts bacterial activities that continue to occur in the patient's body. This aids clinicians in selecting appropriate treatments while avoiding the misuse or overuse of antibiotics.

Methods of the invention comprise performing antimicrobial susceptibility testing directly from the sample. In some embodiments, performing antimicrobial susceptibility testing comprises differential growth, permeabilization, hybridization, and magnetic tagging. In some embodiments, permeabilization, hybridization, and magnetic tagging are concerted. The antimicrobial susceptibility is performed in a single cartridge.

Methods of the invention further comprise using FISH for detecting, quantifying, and identifying target microbes. The methods further comprise performing phenotypic antimicrobial susceptibility testing. Detecting and quantifying target microbes occurs in less than about 90 minutes. In some embodiments, detecting and quantifying target microbes occurs in less than about 60 minutes. In some embodiments, detecting and quantifying target microbes occurs in less than about 30 minutes.

Methods of the disclosure include methods for carrying out concerted FISH reactions combining cell permeabilization, nucleic acid hybridization of target-specific fluorescent probes to cellular nucleic acids, and magnetically tagging of the target cells. The inventive methods can enable magnetic selection to draw the magnetically tagged cells through a dense opaque dye-cushion layer and to deposit them on an imaging surface on which the FISH-labeled cells can be imaged and analyzed. The dye-cushion optically sequesters both the specimen and the unbound fluorescent FISH probes from the imaging surface eliminating the need for the wash steps to that are typically required in other FISH methods to remove the potentially fluorescent specimen and the unbound fluorescent probe. This approach minimizes or eliminates sample preparation steps, simplifies instrumentation, and increases signal to noise.

In a preferred embodiment, FISH probes are designed to hybridize to microbial 16S ribosomal RNA and probes and reagents disclosed herein work when used to fluorescently label bacteria at a single temperature that does not exceed physiological temperatures. While most previous FISH methods use high temperatures for various steps, including permeabilizing cells and denaturing cellular nucleic acids, certain embodiments of the invention instead use chemical reagents to enable a concerted reaction for efficient isothermal cell permeabilization, nucleic acid hybridization and labeling, and binding magnetic tags to cells. For example, target cells can be efficiently permeabilized and specifically and magnetically tagged in the presence of reagents that include, for example detergents such as 3-([3-Cholamidopropyl]dimethylammonio)-2-hydroxy-1-propanesulfonate or sulfobetaine 3-12. Or for example, the permeabilizing agent may include one or more detergents (such as CHAPSO and SB3-12).

The cells that are magnetically tagged are specifically labeled by the inventive FISH method and can be separated from the specimen and the unbound labels by certain embodiments of the invention. Magnetic fields can be applied to magnetic particles to physically separate bound detectable labels from unbound detectable labels, in solution, without a washing step. Dye-cushion layers, for example those as described in U.S. Pat. No. 9,643,180, incorporated herein by reference, can be used in conjunction with the magnetic particles and a magnetic field to pull microbes through a dense, opaque, aqueous dye-cushion layer and deposit them on a detection surface in a well of an analytical cartridge for imaging analysis. The dye in the dye-cushion layer is preferably chosen to absorb the excitation and emitted light used by the instrument for imaging. Thus, the signal from unbound detectable labels above the dye cushion layer (the "assay layer") does not significantly interfere with detecting the signal from the labelled target-cell or microbe complexes that are magnetically deposited on the detection surface. Similarly, the use of the dye-cushion may prevent auto-fluorescence from a specimen matrix, which may also be contained in the assay layer, from significantly interfering with detection of the signal from the deposited labelled target-cell or microbe complexes. These attributes of the dye-cushion can make it possible to detect microbes without specimen preparation by the user and without wash steps to remove the unbound label from the cartridge.

Non-magnified digital imaging is preferably used to detect the labeled target cells that have been deposited on the detection surface. In the preferred case of fluorescent labelling, various lenses, illumination sources, excitation light sources, and filters may be used. Imaging systems may include any device capable of producing a digital image of the detectably labelled target microbes in a solution or pulled to a detection surface in a well of a cartridge. Imaging systems may be contained in a subsystem of the instrument described herein. Imaging systems may include, for example, CCD cameras, CMOS cameras, line scan cameras, CMOS avalanche photodiodes (APD's), photodiode arrays, photomultiplier tube arrays, or other types of digital imaging detectors. Imaging can be carried out under a single set of conditions or light sources, filters, and/or lenses may be changed between images to detect different optically distinguishable labels (e.g., different fluorescent probes corresponding to different microbes). The imaging techniques, analyzers, and instruments described in U.S. Pat. Nos. 9,643,180 and 8,021,848, both incorporated by reference, may allow for identification and enumeration of individual bacterium or other target cells.

Because the unbound fluorescent labels are removed from the cells, the cells can be imaged, and any fluorescence that is detected indicates the presence of the species of interest, such as a target pathogen. Bacterial cells can be separated from unbound labels by binding the cells to magnetic particles and using a magnet to pull the bound cells through a dense matrix that the unbound probes do not diffuse or penetrate into. Suitable matrices may include polyacrylamide, agar, collagen, density gradient media, or other molecular solutions and compositions. In some embodiments, the dense matrix is provided by a density gradient medium such as a solution of iodixanol or polyvinylpyrrolidone-coated colloidal silica particles, optionally dried or lyophilized prior to use. That density gradient medium provides a cushion against which the sample is held while a magnetic field pulls magnetic particle bound cells into and through the medium. Because the target cells are bound to magnetic particles and fluorescently labeled, the magnetic field can be used to pull the cells onto a surface for imaging such as a transparent wall of a tube or well. To promote the successful imaging of fluorescently labeled cells, the medium cushion may include a dye, to block errant fluorescence from unbound probes. In some embodiments, that dyed cushion of density gradient medium (e.g., iodixanol) is referred to as a dye cushion. The dye cushion is used to separate unbound probes from labeled bacteria.

A magnetic field pulls the cells onto an imaging surface, and fluorescent microscopy may be used to take an image of the cells. Any fluorescence apparent in the image is indicative of target bacteria being present in the original sample.

In certain aspects, the invention provides a method for antimicrobial susceptibility testing at a single temperature that allows for differential growth of target pathogens in microbiological medium followed by cell permeabilization, FISH-based target-specific labeling, tagging with magnetic particles, magnetic selection and deposition on a detection surface, and finally imaging and image analysis.

Some embodiments of the invention involve fluorescently labeling bacteria in a species-specific manner and separating bacterial cells from unbound labels. The probes may be fluorescently labeled oligonucleotides that hybridize to nucleic acid targets within specific species of bacteria. To avoid prior requirements of FISH by which extreme heat is used to permeabilize cells and denature genomic DNA, methods of the disclosure use chemical permeabilization to target RNA that is abundantly present and accessible in bacteria. Species-specific, fluorescently-labeled oligonucleotide probes enter the cells when delivered with, for example, a detergent. The probes hybridize to target rRNA in a species-specific manner, and unbound probe is separated from the cells in the sample.

In certain aspects, the invention provides a method for detecting a microorganism. The method includes incubating—without exceeding 45° C.—a sample with probes specific for target nucleic acid of a species of microorganism, separating intact cells in the sample from unbound probes, and detecting probes bound within the intact cells to show the presence of the species in the sample. In preferred embodiments, the sample is maintained at or beneath about 40° C. throughout all steps, and more preferably at temperatures between about 36° C. and 39° C., and more preferably between 36.5° C. and 37.5° C.

In certain embodiments of the method: the probes comprise fluorescently-labeled oligonucleotides complementary to ribosomal RNA of the species; the incubating step further includes exposing the cells to magnetic particles that bind to surfaces of bacterial cells; the separating step includes using a magnetic field to pull magnetic particle-bound cells through a dye cushion and onto an imaging surface while the dye cushion holds unbound labels away from the imaging surface; the detecting step comprising imaging the imaging surface; and the steps are all performed at temperatures between about 36° C. and 39° C. The incubating step may further include exposing the cells to reagents that permeabilize the cells, thus allowing the probes to enter the cells and bind to targets therein. The probes preferably include oligonucleotides that are complementary to microbial RNAs. For example, the permeabilizing agent may include one or more detergents (such as CHAPSO and SB3-12), the target nucleic acids may be microbial ribosomal RNAs, and the probes may include fluorescently-labeled oligonucleotides complementary to portions of the microbial ribosomal RNAs.

In some embodiments, the probes include: a fluorescently-labeled oligonucleotide that is complementary to a segment of ribosomal RNA specific to the species. Preferably, the fluorescently-labeled oligonucleotide is between 10 and 18 bases in length and includes at least one conformationally-restricted nucleic acid. The probes may further include and one or more helper probes that are oligonucleotides that bind to the ribosomal RNA at a location within 1 to 30 bases from the segment where the fluorescently-labeled oligonucleotide binds.

The incubating step may include exposing the cells to magnetic particles that bind to surfaces of bacterial cells and the separating step may include using a magnetic field to pull bound cells away from the unbound probes. The magnetic particles may include a chemical group (e.g., diethylamine ethyl-starch; dextran-sulfate; polyaspartic acid; polyacrylic acid; polystyrenesulfonate; or poly-diallyldimethylamin) that binds to bacterial cell surfaces and the cells may be exposed to the magnetic particles in the presence of a compound (e.g., cetrimide) that promotes the binding of the chemical group to the bacterial cell surfaces.

In certain embodiments, the incubating step includes exposing the cells to magnetic particles that bind to surfaces of bacterial cells; and the separating step includes using a magnetic field to pull bound cells through a dye cushion and onto an imaging surface while the dye cushion holds unbound probes away from the imaging surface. The probes may include a fluorescently-labeled oligonucleotide that is complementary to a segment of ribosomal RNA exclusive to the species, and the detecting step may include imaging fluorescently labeled cells of the species using a fluorescent microscope. The dye cushion may be, for example, a density gradient medium (such as a solution of iodixanol or poly-vinylpyrrolidone-coated colloidal silica particles, optionally dried or lyophilized prior to exposure to the sample) that further includes a dye that absorbs light from unbound probes.

Aspects of the invention provide methods for detecting a microorganism. Methods include incubating a sample with labels that bind only to one species of microorganism, separating cells in the sample from unbound labels, and detecting bound label among the cells to show the presence of the species in the sample, In certain embodiments, the labels include fluorescently-labeled probe oligonucleotides complementary to ribosomal RNA exclusive to the species; the incubating step further includes exposing the cells to magnetic particles that bind to surfaces of bacterial cells; the separating step includes distributing magnetic particle bound cells over a surface of a dyed cushion and using a magnetic field to pull bound cells through dye cushion and onto an imaging surface, leaving the unbound labels on the surface of the dye cushion; the detecting step comprising imaging the imaging surface with a fluorescence microscope; and the steps are all performed at temperatures between about 36 and 39 degrees C.

In some embodiments, the incubating step includes exposing the cells to reagents that permeabilize the cells, thus allowing the labels to enter the cells and bind to targets therein. The labels may include probe oligonucleotides that are complementary to microbial RNAs. Preferably the reagents include one or more detergents (e.g., CHAPSO and/or SB3-12), the labels include oligonucleotides (e.g., fluorescently-labeled oligonucleotides complementary to portions of the microbial ribosomal RNAs), and the targets include microbial ribosomal RNAs. In preferred embodiments, the labels include: a fluorescently-labeled probe oligonucleotide that is complementary to a segment of ribosomal RNA exclusive to the species and the labels also further include and one or more helper probes such as oligonucleotides that bind to the ribosomal RNA at a location within 1 to 30 bases from the segment where the fluorescently-labeled probe oligonucleotide binds. The fluorescently-labeled probe oligonucleotide may be between 10 and 18 bases in length and may include at least one conformationally-restricted nucleic acid. The incubating step may include exposing the cells to magnetic particles that bind to surfaces of bacterial cells and the separating step may include using a magnetic field to pull bound cells away from the unbound labels.

In certain embodiments, the magnetic particles include a chemical group that binds to bacterial cell surfaces and the cells are exposed to the magnetic particles in the presence of a compound that promotes the binding of the chemical group to the bacterial cell surfaces. That compound may include, for example, cetrimide, and the chemical group may be diethylamine ethyl-starch; dextran-sulfate; polyaspartic acid; polyacrylic acid; polystyrenesulfonate; or poly-diallyldimethylamin. Optionally, the incubating step includes exposing the cells to magnetic particles that bind to surfaces of bacterial cells and the separating step includes distributing magnetic particle bound cells over a surface of a dyed cushion and using a magnetic field to pull bound cells through dye cushion and onto an imaging surface, leaving the unbound labels on the surface of the dye cushion. The dyed cushion may include a density gradient medium (e.g., Percoll or OptiPrep) that further includes a dye. Preferably the steps are all performed at temperatures between about 36 and 39 degrees C., preferably between 36.5 and 37.5 degrees C.

BRIEF DESCRIPTION OF THE DRAWINGS

FIG. 14 is a table of Probe sequences used in this example.
FIG. 17 is a table giving Inclusivity results for 4 additional bacteria.
FIG. 18 is a table giving Probe sequences used in this example.
FIG. 19 shows the bacterial species and strains tested.
FIG. 19 is a table showing challenge bacteria to test the specificity of detecting *E. coli
*
FIG. 20 is a table showing Probe sequences used in this example.
FIG. 24 is a table of Probe sequences used in this example 4.
FIG. 29 is a table of Probe sequences used in this example 6.
FIG. 32 is a table of AST results for all bacteria and antibiotics tested in this example.
FIG. 33 is a table of Probe sequences used in this example 7.
FIG. 36 is a table of Oligonucleotides used in this example 8.
FIG. 39 is a Summary of the overall essential and categorical agreement for all organisms, antibiotics and inoculum levels.
FIG. 42 is a table of Probe sequences used in this example 9.
FIG. 45 shows agreement of *E. coli* with varying inoculum levels of off-target microbe (*S. aureus, Staphylococcus epidermidis*, and, *Citrobacter freundii*) standard BMD.
FIG. 46 shows agreement of *E. coli* with varying inoculum levels of off-target microbe (*Micrococcus luteus, Acinetobacter baumannii, Corynebacterium minutissimum*) standard BMD.
FIG. 47 shows agreement of *E. coli* with varying inoculum levels of off-target microbe (*K. pneumoniae*) standard BMD.
FIG. 48 is a table of Probe sequences used in this example 10.

FIG. 51 is a table of probe sequences used in this example 11.

FIG. 53 shows 100% essential agreement and 100% categorical agreement for each of the 15 spiked culture negative clinical UTI urine samples to standard BMD.

FIG. 54 shows the MIC for 15 urine samples spiked with *E. coli* as determined by the novel AST method compared to the standard BMD method ("CLSI Compliant"). Concentrations in µg/ml.

FIG. 55 is a table of probe sequences used in this example 12.

FIG. 59 shows Ciprofloxacin-sensitive and resistant strains used in this example FIG. 60 is a first half of a Table of probe sequences used in this example 13.

FIG. 61 is a second half of a Table of probe sequences used in this example 13.

FIG. 62 shows essential agreement for a polymicrobial infection with 2 target organisms. As seen below, the AST method described above yields 100% essential agreement to standard BMD FIG. 63 shows categorical agreement for a polymicrobial infection with 2 target organisms. As seen below the AST method described above yields 100% categorical agreement to standard BMD.

FIG. 67 is a table showing target pathogens were detected while other non-target pathogens were not.

FIG. 68 is a table showing probe sequences used in example 14.

DETAILED DESCRIPTION

Figure 1:
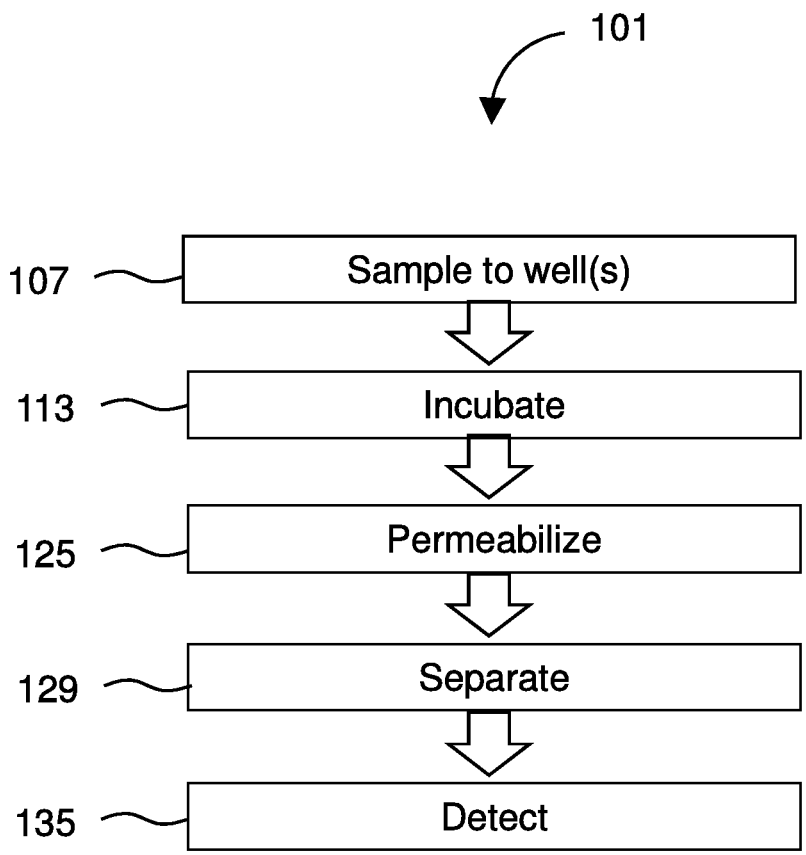
FIG. 1 diagrams a method for detecting a microorganism.

The disclosure provides a technique and protocol for performing fluorescent in situ hybridization (FISH) at constant physiological temperature. In some embodiments, the invention allows for direct analysis of patient specimens for rapid detection, quantification, and identification of infectious pathogens and determining effective antibiotic therapy. The invention enables high performance tests for identifying effective antimicrobial agents for treating a patient's infection, while eliminating the time-consuming steps for purifying large numbers of cells required by todays methods. Embodiments of the inventive FISH method allow for integration of the steps to detect infections, identify the pathogen and determine antimicrobial susceptibility on the one efficient and low-cost automated system comprising an instrument and menu of application-specific consumables. For such embodiments, the various steps of the integrated process can be performed at a single physiological temperature.

This allows for probing and detecting genetic content of cells and organisms within samples without the requirement of subjecting the sample to extremes of heat that may otherwise lyse cells of interest, denature proteins, unduly influence the relative, differential growth rates of different cells or organisms, or otherwise have adverse effects on chemical constituents and process steps of the sample analysis protocol. One important feature of being able to perform FISH at constant physiological temperature is that samples can be fluorescently probed and imaged according to the methods herein while loaded on instruments or cartridges that are also, simultaneously being used to perform other biological assays that are optimal at physiological temperature. Similarly, protocols and processes of the disclosure include embodiments in which samples are subjected to multiple steps while loaded onto a cartridge. Where some of those steps include incubation to promote growth of organisms of interest, the ability to perform fluorescent probe hybridization simultaneously within other wells of the same cartridge without heating significantly above physiological temperatures allows the multiple steps to all proceed at their own times and paces including chronologically overlapping or even simultaneously. Moreover, where fluorescent probe hybridization is performed within a well within an analytical cartridge that is loaded and operated within an analytical instrument, the instrument can multiplex cartridges, routing and scheduling multiple different cartridges to different test steps while maintaining a constant temperature within the instrument.

Preferred embodiments of the disclosure provide a fluorescent probe hybridization protocol as well as reagent-loaded cartridges for performing such a protocol that operate at physiological temperature. Generally, physiological temperature refers to bodily temperature of an organism such as an animal. The process steps, molecular species, and chemical reagents disclosed herein are useful for hybridizing fluorescent probes to nucleic acids within cells, and imaging those probes, at physiological temperature without lysing the cells. There is flexibility as to what temperatures the sample is exposed to and the steps are performed at. Methods of the disclosure may be usefully performed at temperatures that fluctuate but do not exceed 45 degrees C. and even work at temperatures that do not exceed 40 degrees C. Methods and compositions of the disclosure are useful and functional when used at temperatures within a range of 36 to 39 degrees C., for example. In fact, methods of the disclosure may be implemented on instruments that maintain temperatures essentially at, or at about, human body temperature, i.e., about 37 degrees C. for a healthy human, 38 degrees C. for a human with a fever, or 36 degrees C. for some nocturnal human temperature fluctuation patterns. To say "about" is to mean within a decimal point or two. That is, 36.3 is about 36.5 and 37.7 counts as being about 37.5. What is important is to understand that the FISH protocol disclosed herein can be performed entirely at about physiological temperature of a body, such as of a mammal, and preferably of a human.

One benefit of the temperature range permitted by the methods is that microorganisms in clinical samples can be studied under temperature conditions that approximate the in vivo conditions, thus avoiding an effect by which heat promotes the differential growth of one organism that wouldn't otherwise be clinically significant while suppressing the appearance of another. For example, if a person is suffering from a urinary tract infection in which the primary underlying irritant is *Proteus mirabilis*, and a clinical test is performed that involves heating a urine sample, if the heat promotes growth of an otherwise insignificant few cells of *Streptococcus agalactiae*, then that clinical test will not direct the clinician to the appropriate treatment. That test would miss-identify the microorganism that needs to be treated. To avoid such an outcome, the disclosure provides compositions, devices, and methods for performing FISH at constant physiological temperature, which compositions, devices, and methods have particular utility in identifying a microorganism.

FIG. 1 diagrams a method 101 for detecting a microorganism. The method 101 preferably includes obtaining a sample suspected to contain a microorganisms, such as a urine sample from a patient with a urinary tract infection. The sample may be delivered 107 into a collection tube, well, reservoir, or cartridge for processing according to the steps herein. For example, a urine sample may be collected by a patient using a urine specimen collection cup and delivered to a clinician. The clinician may use a disposable pipette such as a 1 mL plastic graduate transfer pipette to transfer 107 a portion of the sample into a receiving reservoir of a testing device or cartridge. For identifying or detecting the presence of a microbe in the sample, the method 101 includes incubating 113 the sample with labels that bind only to one species of microorganism, i.e., a label that is specific for the target species. As discussed herein, a permeabilization agent may be introduced to permeabilize 125 cells in the sample. The method 101 further includes separating 129 cells in the sample from unbound labels and detecting 135 bound label among the cells to show the presence of the species in the sample. Note that in certain embodiments, the label is species specific and cells at large are separated from unbound probe.

Figure 2:
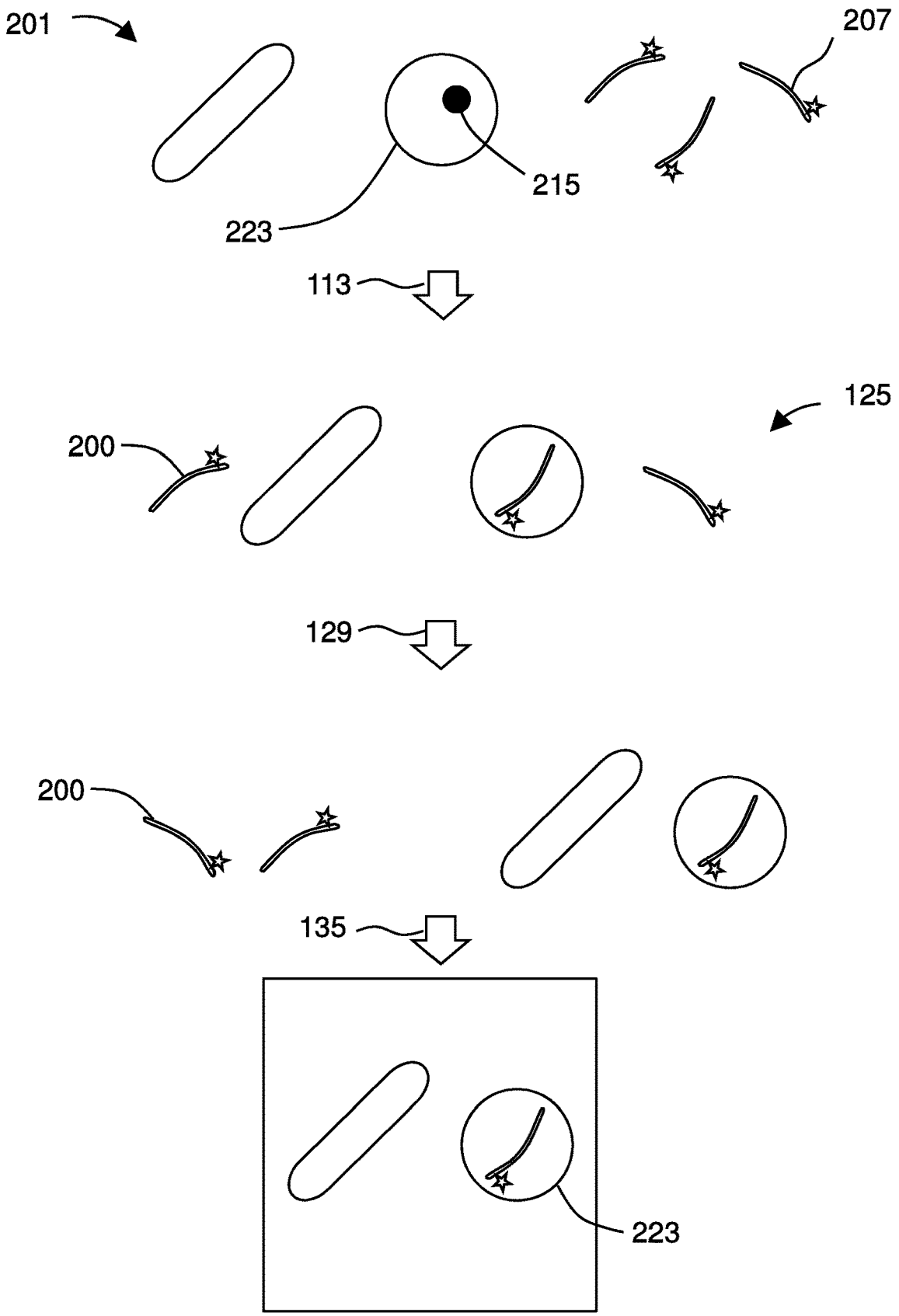
FIG. 2 shows how steps of the method proceed.

FIG. 2 shows how steps of the method 101 proceed. A sample may include a mixture of cells 201 with one or more target cells 223 there among the cells 201. The cells are incubated with the labels 207. Preferably, a permeabilization agent is used to permeabilize 125 the cells 201 including the target cell 223, allowing the labels to diffuse therein. In preferred embodiments, the labels 207 specifically bind to a nucleic acid 215 target within the target cell 223. The cells are separated 129 from the labels, and the portion that includes the cells is examined to detect 135 label. As discussed herein, the labels are preferably probes such as fluorescently labelled oligonucleotides (e.g., about 10 to 18 bases in length). The cells may be separated 129 from unbound probes 207 by using magnetic particles that bind to the cells 201 and pulling the cells, using a magnetic field B, through a density medium that causes the unbound probes to get left behind. The detection 125 may be performed by imaging (e.g., with a microscope) the separated cells. The cells may be imaged within or under the density medium and the density medium, also referred to as a dye cushion, may further include a dye or pigment to prevent light from unbound probes from reaching the imaging device such that any light spots in the image show the presence of target cells 223 having fluorescently-labelled oligonucleotide probes hybridized to target nucleic acid 215 there.

Thus the method includes introducing a species-specific label (such as a fluorescently labeled oligonucleotide complementary to a RNA in the target cell) into a sample, optionally permeabilizing the cells using an agent (such as a detergent such as 3-([3-Cholamidopropyl]dimethylammonio)-2-hydroxy-1-propanesulfonate (aka CHAPSO); sulfobetaine 3-12 (aka sb3-12); Polyethylene glycol p-(1,1, 3,3-tetramethylbutyl)-phenyl ether (aka TRITON X100); nonyl phenoxypolyethoxylethanol (aka NP-40); others; or some combination thereof); separating unbound label from cells in the sample; and imaging the cells to detect the label. The method is useful for testing samples that include microbes such as a clinical samples (e.g., to test for or detect the causative agent of UTI). When performed according to the disclosure, the method provides for FISH at constant physiological temperature.

Fluorescence in situ hybridization has been proposed for applications such as gene mapping and diagnosis of chromosomal aberrations. See Nature Methods 2(3):237 (2005). Those protocols have involved the hybridization of biotin- or digoxigenin-labeled probes to denatured chromosomal DNA and detection of the probes using fluorochrome-conjugated reagents. Generally, those protocols require denaturing steps in which the probes themselves and the target DNA are separately denatured at 70 to 80 degrees C. before probe hybridization, incubation, and visualization. Methods of the disclosure do not require that heating step and do not require any portion of the sample or reagents to be heated about 70 degrees C. or even above 40 degrees C. One important feature providing for the temperature ranges allowable for methods of the disclosure involves the use of a permeabilization agent (rather than heat) to deliver the probes 207 into the cells 201.

Figure 3:
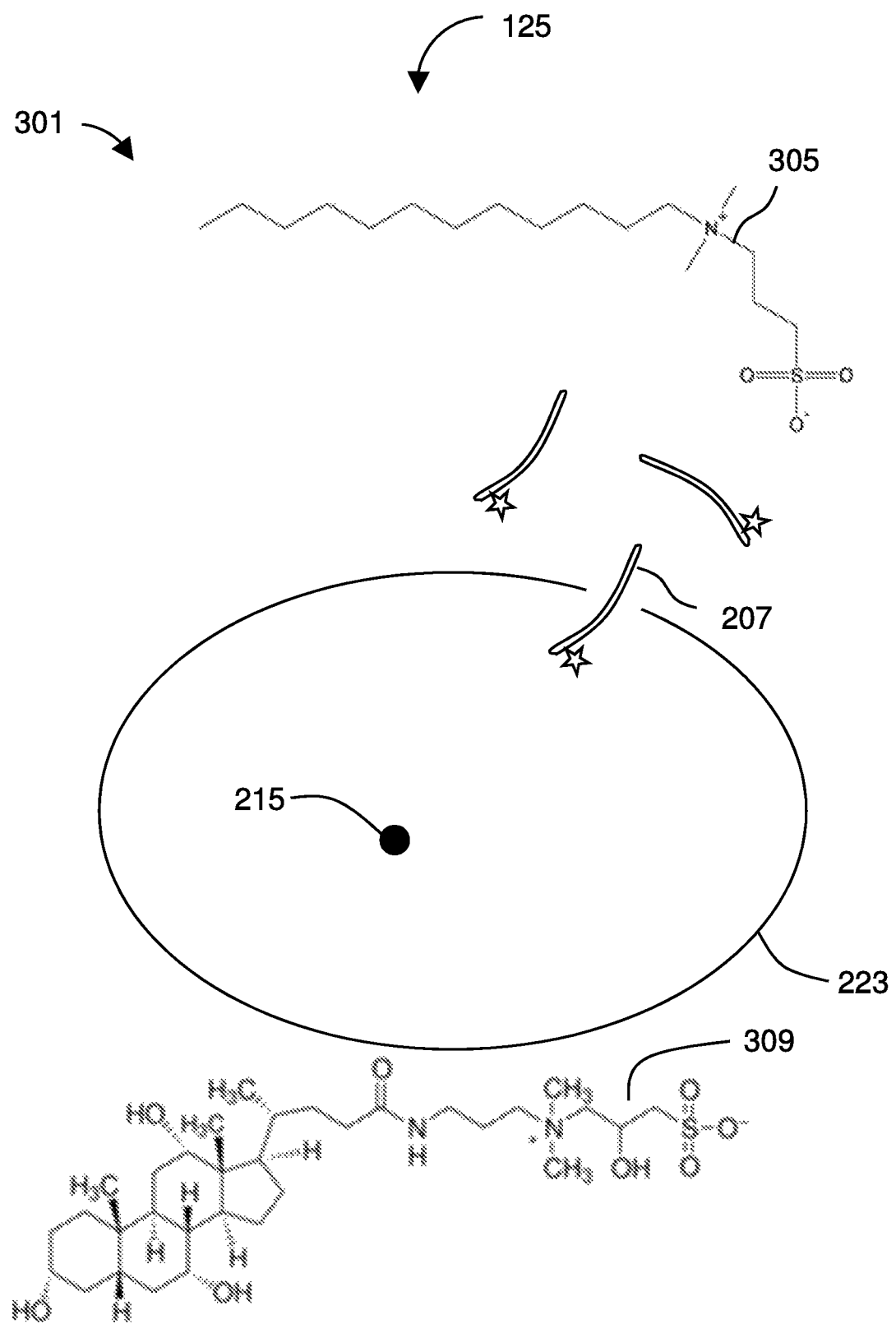
FIG. 3 illustrates a permeabilization agent.

FIG. 3 illustrates a permeabilization agent 301 in use to permeabilize 125 cells 201 according to methods herein. In the depicted embodiment, the agent 301 includes a mixture of 3-([3-cholamidopropyl]dimethylammonio)-2-hydroxy-1-propanesulfonate (sold under the name CHAPSO by Millipore Sigma, St. Louis, MO) and sulfobetaine 3-12 (available as SB3-12 from B-Biosciences, St. Louis, MO). These detergents permeabilize 125 the cells 201, allowing the probes 207 to enter to bind to microbial target nucleic acid 215. Any suitable probe may be used with methods herein. FIG. 3 shows that the incubating step includes exposing the cells to reagents that permeabilize the cells, thus allowing the labels to enter the cells and bind to targets therein.

Probes suitable for use with methods herein may include nucleic acid probes that include DNA, RNA, peptide nucleic acids, modified bases, conformationally restricted nucleic acids, or combinations thereof. Suitable probes may include antibodies or antigens, binding molecules such as mannose-binding lectin or other collectins. Molecular or chemical structures and compositions such as polyethylene glycol, dyes, stains, intercalating dyes, crystal violet, safranin/carbol fuchsin, or any other composition or structure that may bind specifically to targets. In a preferred embodiment, the probes 207 include oligonucleotides.

Figure 4:
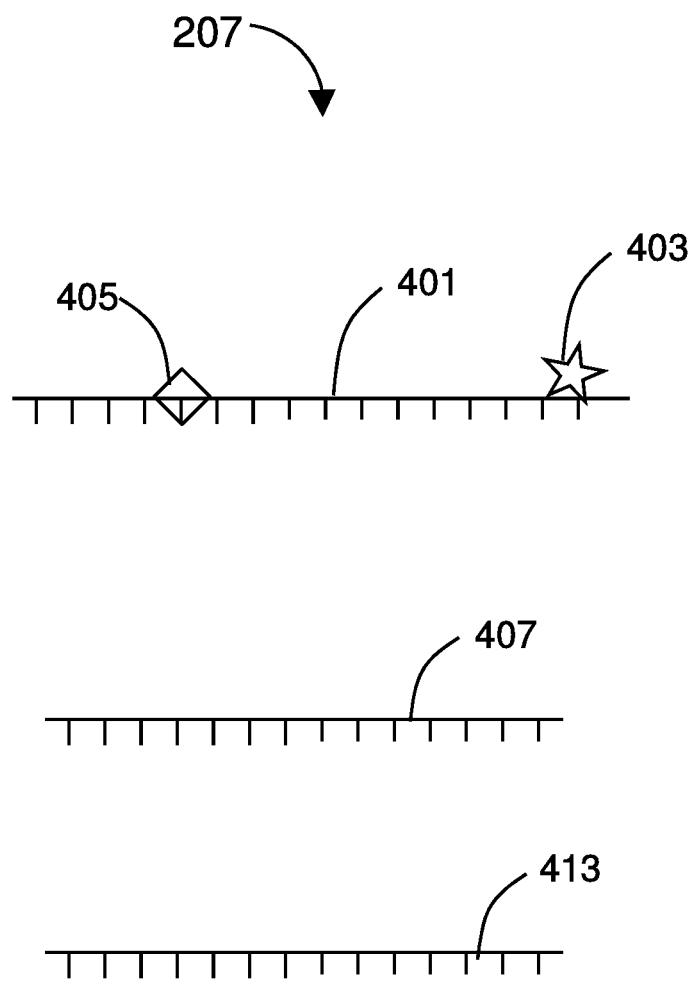
FIG. 4 shows a probe.

FIG. 4 shows a probe 207 according to preferred embodiments. In the preferred embodiment, the probe 207 includes an oligonucleotide 401 with a length between about 8 and 22 bases long, preferably between about 10 and 22 bases long. The probes preferably include DNA bases to avoid autocatalysis catalyzed by nucleophilic attack by free electrons of a 2' hydroxyl group (although RNA bases may optionally be used or included). The probes preferably have a melting temperature of about 45 degrees C., e.g., between 40 and 50. Each oligonucleotide 201 is preferably labeled with at least one fluorophore 403. In a preferred embodiment, each oligonucleotide 401 also includes one to a few conformationally restricted nucleotides 405 (sometimes variously referred to as locked nucleic acids or bridged nucleic acids). Thus, the probes 207 include fluorescently-labelled DNA oligos 401 with optional conformationally-restricted nucleic acids 405 and more preferably also include at least one help probe 407, optionally with a second helper probe 413, as well.

In certain embodiments, the labels or probes 207 comprise probe oligonucleotides 401 that are complementary to microbial RNAs. For probes oligos 401 that are complementary to microbial ribosomal RNA, the oligos 401 preferably have length generally between 10 and 18 nt. Tm is approximately 45 degrees C. They are designed by looking at the structure of rRNA. The helper probes disrupt the ribosomal structure. One reason to target rRNA is that copy number is very high. There are thousands of copies per cell, so one gets a de facto signal amplification. Thus, preferred embodiments of the method 101 use reagents that include one or more detergents (e.g., one or more of CHAPSO and SB3-12) and use probe oligonucleotides to target microbial ribosomal RNAs. Specifically, the probes are fluorescently-labeled probe oligonucleotides complementary to a segment of ribosomal RNA exclusive to a target species of interest. Preferably, the fluorescently-labeled probe oligonucleotide is between 10 and 18 bases in length and includes at least one conformationally-restricted nucleic acid. Also preferably, the probes oligos 401 are provided along with at least one helper probe 407 and optionally a second helper probe 413.

Figure 5:
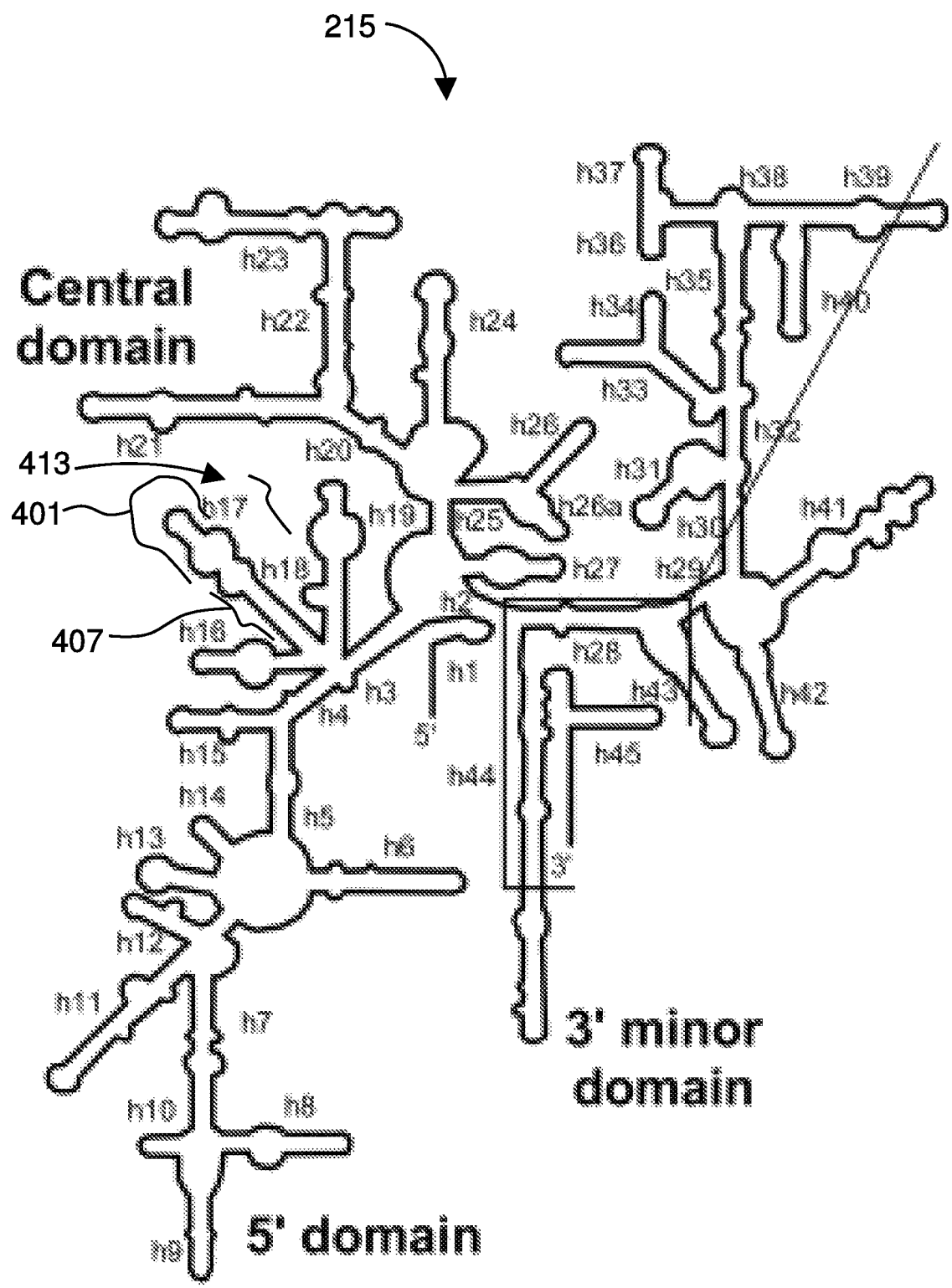
FIG. 5 illustrates the principles of probe design.

FIG. 5 illustrates the principles of probe design and the design and role of the helper probes. Preferably, where the oligo 401 hybridizes to a segment of microbial ribosomal RNA, the helper probe 407 and any optional second helper probe 413 are oligonucleotides that bind to the ribosomal RNA at a location within 1 to 30 bases from the segment where the fluorescently-labeled probe oligonucleotide binds. For example, the helper probes may hybridize to the microbial ribosomal RNA immediately upstream and downstream of the hybridized probe oligo 401. Without helper probes 407, 413 target site inaccessibility may present issues for hybridization of 16S rRNA with oligonucleotide probes. Here, unlabeled oligonucleotides (helpers 407, 413) that bind adjacent to the probe target site are used to increase weak probe hybridization signals. Helper probes may be used to enhance the fluorescence signal. See Fuchs, 2000, Unlabeled helper oligonucleotides increase the in situ accessibility to 16S rRNA of fluorescently labeled oligonucleotide probes, Appl Environ Microbiol 66(8):3603-7, incorporated by reference. Considerations in picking probe target sequences include determining theoretical specificity and inclusivity of FISH probes, optimizing location of LNA bases, and designing helper probes for specific probes. Many pathogen targets already have FISH probes that have been shown to be specific that may be used (as published, or shortened to accommodate temperatures of this disclosure). One find many of them in probeBase, an online resource for rRNA-targeted oligonucleotide probes. See Loy, 2007, probeBase—an online resource for rRNA-targeted oligonucleotide probes: new features 2007, Nucleic Acids Res 35: D800-D804 and Loy, 2003, probeBase—an online resource for rRNA-targeted oligonucleotide probes, Nucleic Acids Res 31:514-516, both incorporated by reference. Note that FISH is usually done at much higher temperatures, so probes from those sources may need to be shortened or modified for the method 101. One may also use the on-line tool "DECIPHER" to input a genus, and have the DECIPHER tool suggest regions on the 16S that will be specific for the genus. See Wright, 2014, Automated Design of Probes for rRNA-Targeted Fluorescence In Situ Hybridization Reveals the Advantages of Using Dual Probes for Accurate Identification, Applied Env Microbiology, incorporated by reference.

Whether starting with an online tool, or designing a probe by hand, it may be valuable to examine alignments (e.g., probe to 16S rRNA pairwise sequence alignment as made by ClustalW) and select regions where the target sequences (preferably have multiple) match, but other pathogens do not. It may be valuable to examine Inclusivity (coverage) and specificity. Tm should be over 40 degrees C. (since methods of the disclosure operate at 35 degrees C.). Higher melting temperatures may be preferable, but how high you can go depends on how many mismatches there are to off-target sequences. Probe oligos according to the disclosure have melting temperature between 40 and 60 degrees C. (e.g., when 10 to 18 nt-length, DNA probes, complementary to helix h17 in 16S rRNA with 2 or 3 LNA bases). Mismatches at the center are more discriminating than mismatches at the end. Order of strength of mismatches: (least bad to most bad): G/T, G/G, A/G, A/A, T/T, A/C, T/C, C/C. Preferably, pick a region of the rRNA that is more accessible.

FIG. 5 shows a secondary structure of E. coli 16 rRNA. While other bacteria will not have exactly the same 16S rRNA as E. coli, the secondary structure of ribosomes is highly conserved (see Woese & Fox, 1977) so most of the depicted helices in FIG. 5 will have easily identifiable homologues in other bacteria. Preferred targets within 16S rRNA include (using the labels of FIG. 5 for reference): h44; h27; h16; h17; h18; h25; h27; h9; h10; h13; h23; h19; and h43. See Fuchs, 2000, Unlabeled helper oligonucleotides increase the in situ accessibility to 16S rRNA of fluorescently labeled oligonucleotide probes, Appl Environ Microbiol 66(8):3603-7, incorporated by reference. Having settled on a provisional probe design, one may test the specificity and inclusivity using an online tool such as SILVA, "high quality ribosomal RNA databases", available as a website supported by the German network for bioinformatics infrastructure. See Pruesse, 2007, SILVA: a comprehensive online resource for quality checked and aligned ribosomal RNA sequence data compatible with ARB, Nucl Acids Res 35:7188-7196 and Quast, 2013, The SILVA ribosomal RNA gene database project: improved data processing and web-based tools, Nucl Acids Res 41 (D1):D590-D596, both incorporated by reference. The probe oligo 401 preferably includes at least one bridged or locked nucleic acid. For the helper probes 407, 413 it is permissible for them to have lower specificity (see SILVA tools) than the oligo 401. The helper probes 407, 413 may preferably be about 20 nt in length.

The probes 207 are used to label specific target microbes. Another part of the method 101 involves separating 129 cells 201 from unbound probes. Any suitable method or technique may be used to separate 129 the cells 201 from unbound probes. Suitable techniques for separating cells 201 from unbound probes includes centrifugation, flow cytometry, fluorescent activated cell sorting, a column separation, digestion of unbound probe via one or more nucleases, others, or combinations thereof. In a preferred embodiment, the cells 201 are separated 129 from unbound probe 207 by the use of magnetic particles. For example, the incubation 113 step may include exposing the cells to magnetic particles that bind to surfaces of the cells.

Any suitable magnetic particle that binds to surfaces of the cells may be used including for example magnetic particles bound to an antibody, a collagen-containing C-type lection (aka collectin such as mannose-binding lectin), or a chemical group that binds bacterial cells. In certain preferred embodiments, the magnetic particles preferably include PAA.

Figure 6:
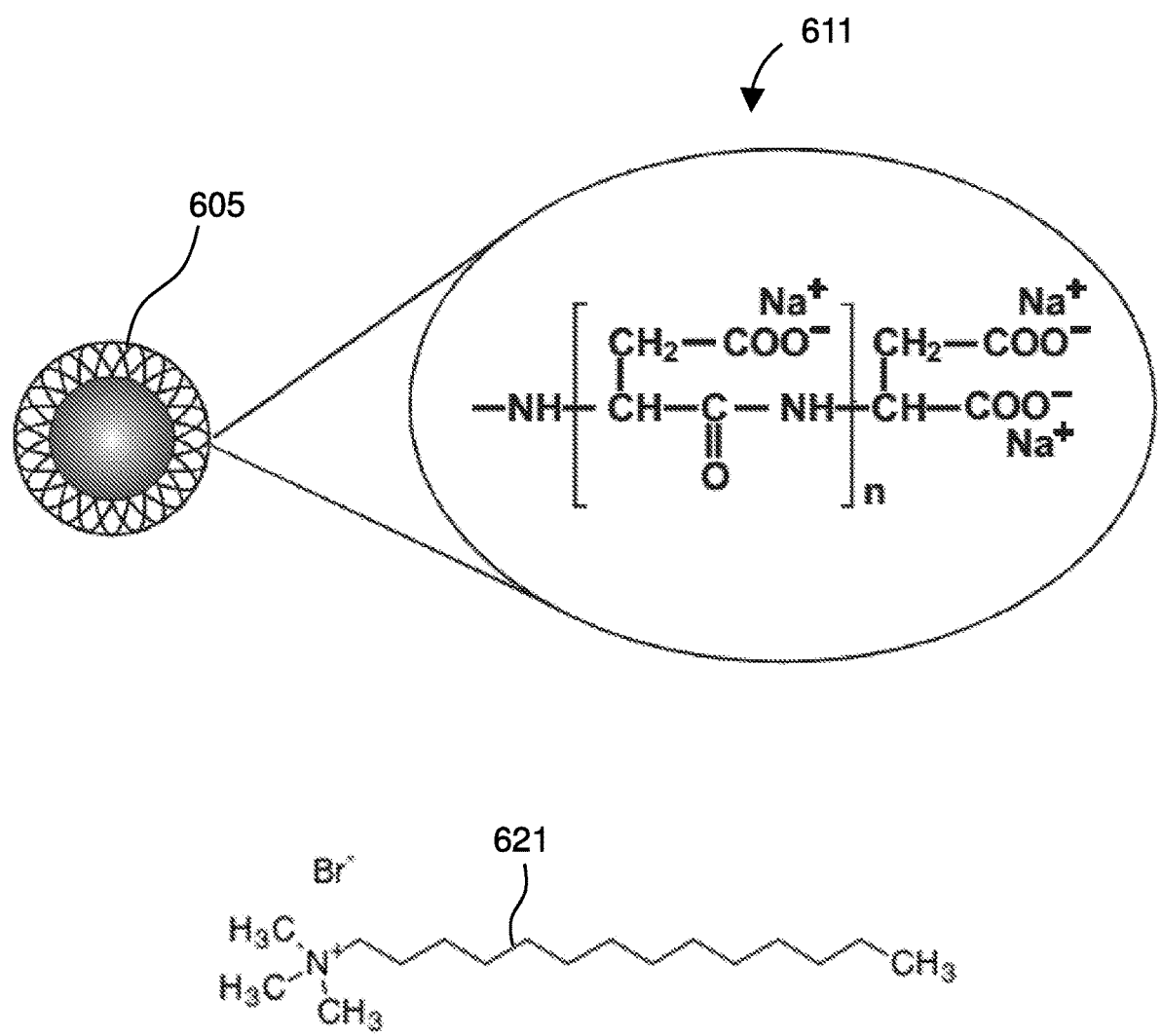
FIG. 6 shows a magnetic particle.

FIG. 6 shows a magnetic particle 605 that include a chemical group 611 that binds to bacterial cell surfaces. The chemical group 611 may include, for example, diethylamine ethyl-starch; dextran-sulfate; polyaspartic acid; polyacrylic acid; polystyrenesulfonate; poly-diallyldimethylamin; or a combination thereof. As shown, magnetic particle 605 includes a polyaspartic acid chemical group 611. This particle is sold as fluidMAG-PAA by chemicell GmbH (Berlin, Germany). The fluidMAG-PAA particle is a polyaspartic acid that binds to the surface of bacteria. The cells may be exposed to the magnetic particles 605 in the presence of a compound 621 that promotes the binding of the chemical group 611 to the bacterial cell surfaces.

To effectively bind the particles 605 to the cells 201 it may be helpful to include an agent 621 that promotes the binding of PAA to cell surfaces. Any suitable agent 621 may be included to promote binding. For example, in some embodiments, the agent includes a mixture of different quaternary ammonium salts including cetrimonium bromide (CTAB), also known as cetrimide. Cetrimide promotes binding of PAA to cell surfaces for magnetic capture, and solves particular trouble with Gram+organisms. It may be found that Gram− organisms bind to the fluidMAG-PAA without trouble. Where the target microorganism of interest is Gram+, it may be preferable to include the agent 621 (e.g., cetrimide). Thus, in preferred embodiments of the method 101, the labels include fluorescently-labeled probe oligonucleotides 401 complementary to ribosomal RNA 215 exclusive to the species; the incubating 113 step also includes exposing the cells to magnetic particles 605 that bind to surfaces of bacterial cells 201; and the separating 129 step includes applying a magnetic field B to the cells 201.

Figure 7:
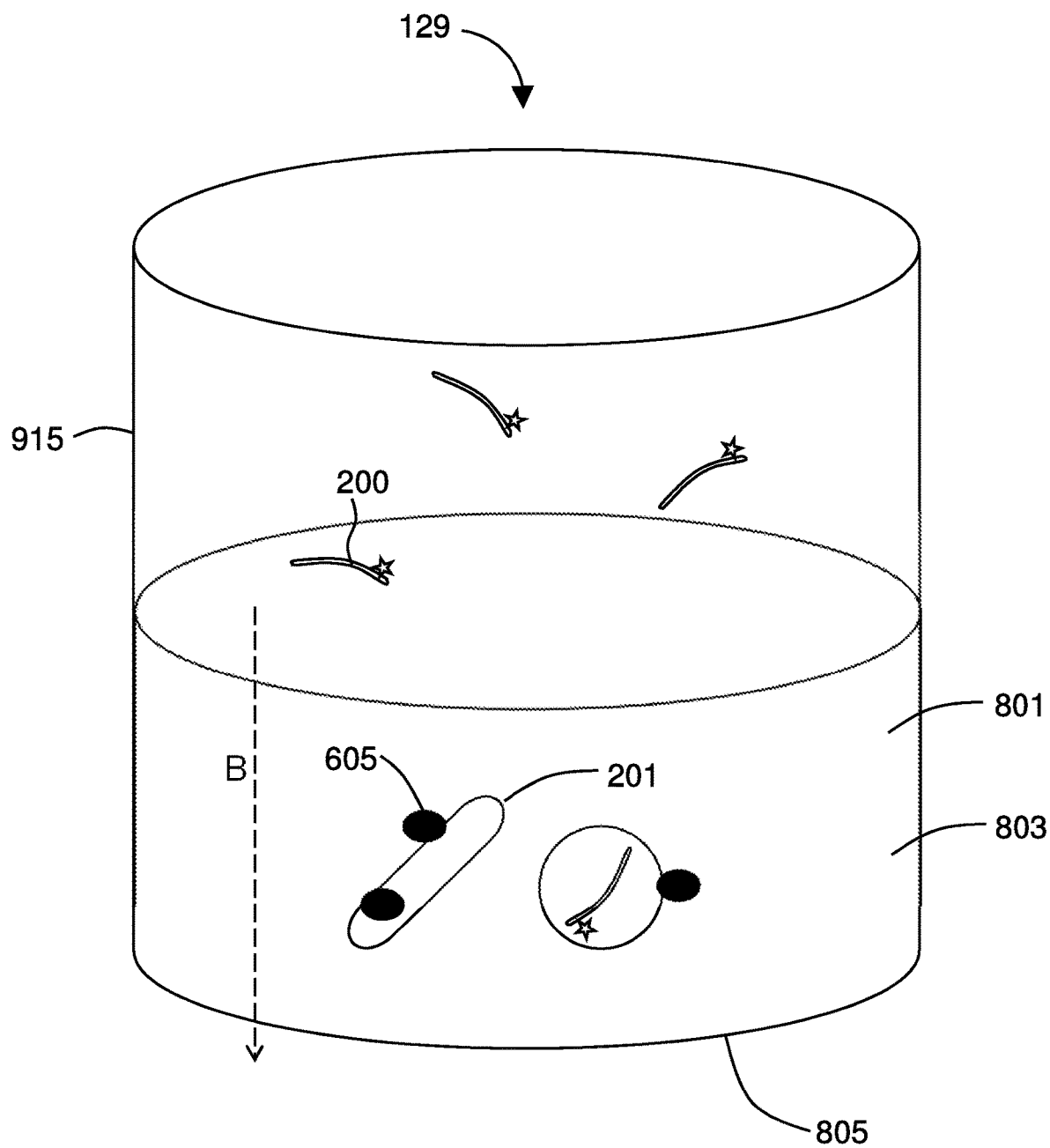
FIG. 7 shows magnetic particle bound cells being separated from unbound probes.

FIG. 7 shows magnetic particle 605-bound cells 201 being separated 129 from unbound probes 200 by pulling the cells 201 through a density gradient medium 801 using an applied magnetic field B. The density medium 801 may be supplied within a tube or well 915 (and may include a dye to provide a "dye cushion 803") as pictured, such that the separating 129 may include distributing magnetic particle 605-bound cells 201 over the dye cushion 803 and using a magnetic field B to pull bound cells 201 through the dye cushion 803 and onto an imaging surface 805, leaving the unbound probes 200 on the surface of the dye cushion 803. The detecting step 135 may then include imaging the imaging surface 805 with a fluorescence microscope and all of the steps may be performed at temperatures below 40 degrees C. Preferably the steps are performed at temperatures between about 36 and 39 degrees C. Thus, as shown the incubating 113 step includes exposing the cells to magnetic particles 605 that bind to surfaces of bacterial cells and the separating step 129 includes using a magnetic field B to pull bound cells away from the unbound labels. Preferably, the separating step 129 includes distributing magnetic particle bound cells over a surface of a dye cushion 803, and using the magnetic field to pull bound cells through dye cushion 803 and onto an imaging surface 805, leaving the unbound labels on the surface of the dye cushion.

As discussed, embodiments of the separation 129 make use of a density gradient medium 801 that may include a dye to provide a dye cushion. Thus, a dye cushion 803 is a material that includes a density gradient medium that further includes a dye.

The dye cushion 803 may be, for example, a density gradient medium (such as a solution of iodixanol or polyvinylpyrrolidone-coated colloidal silica particles, optionally dried or lyophilized prior to exposure to the sample) that further includes a dye that absorbs light from unbound probes 200. The cushion may include a high density material for excluding unselected components of the reaction from the detection zone. The cushion is a layer (liquid or dried or lyophilized) which is generally of higher density than the reaction components. The cushion can include various density agents singly or in combination (and at various concentrations) including for example, sucrose, diatrizoate, iodixanol (aka OptiPrep), NaCl, CsCl, Percoll, or albumin. Embodiments can also incorporate other density agents, including other commonly used density agents such as iodixanol, sodium diatrizoate, sodium, sucrose, and other sugars, oligosaccharides, synthetic polymers (e.g., Ficoll), and various salts such as cesium chloride, potassium bromide, and others. Embodiments may use dyes to match different signaling character and moieties in use. For example the dye Toluidine Blue O could be used with the fluorescent label Texas Red (sulforhodamine). One embodiment uses a 65 μL aliquot of dye-cushion reagent, which is 2 mg/mL Chromotrope R2 and 10% v/v OptiPrep (a 60% w/v solution of iodixanol) plus 5% w/v trehalose pipetted into assay wells. The dye cushion may be 15% OptiPrep and 5 mg/mL Chromotrope R2 pre-aliquoted in 96-well half-area diameter clear bottom black plate or into the imaging wells of a cartridge. With reference to the well 915, the dye cushion 903 can be formed by preparing a solution of iodixanol or polyvinylpyrrolidone, including any optional dye, and drying or lyophilizing the solution there in the well 915 to form the dye cushion 915. The dye cushion 915 will then be essentially a solid (e.g., dried, e.g., the well 915 can be stored in any orientation including upside-down until use). When a liquid sample is delivered into the well 915, the liquid rehydrates the dye cushion 803. In fact, the reagents disclosed and discussed throughout herein for use in the method 501 may be provided in dried or lyophilized form for later use in a protocol for FISH at constant physiological T. This allows the reagents to be prepared and loaded dry onto a cartridge that may then be shipped or stored and later used in methods 101 of the disclosure.

Figure 8:
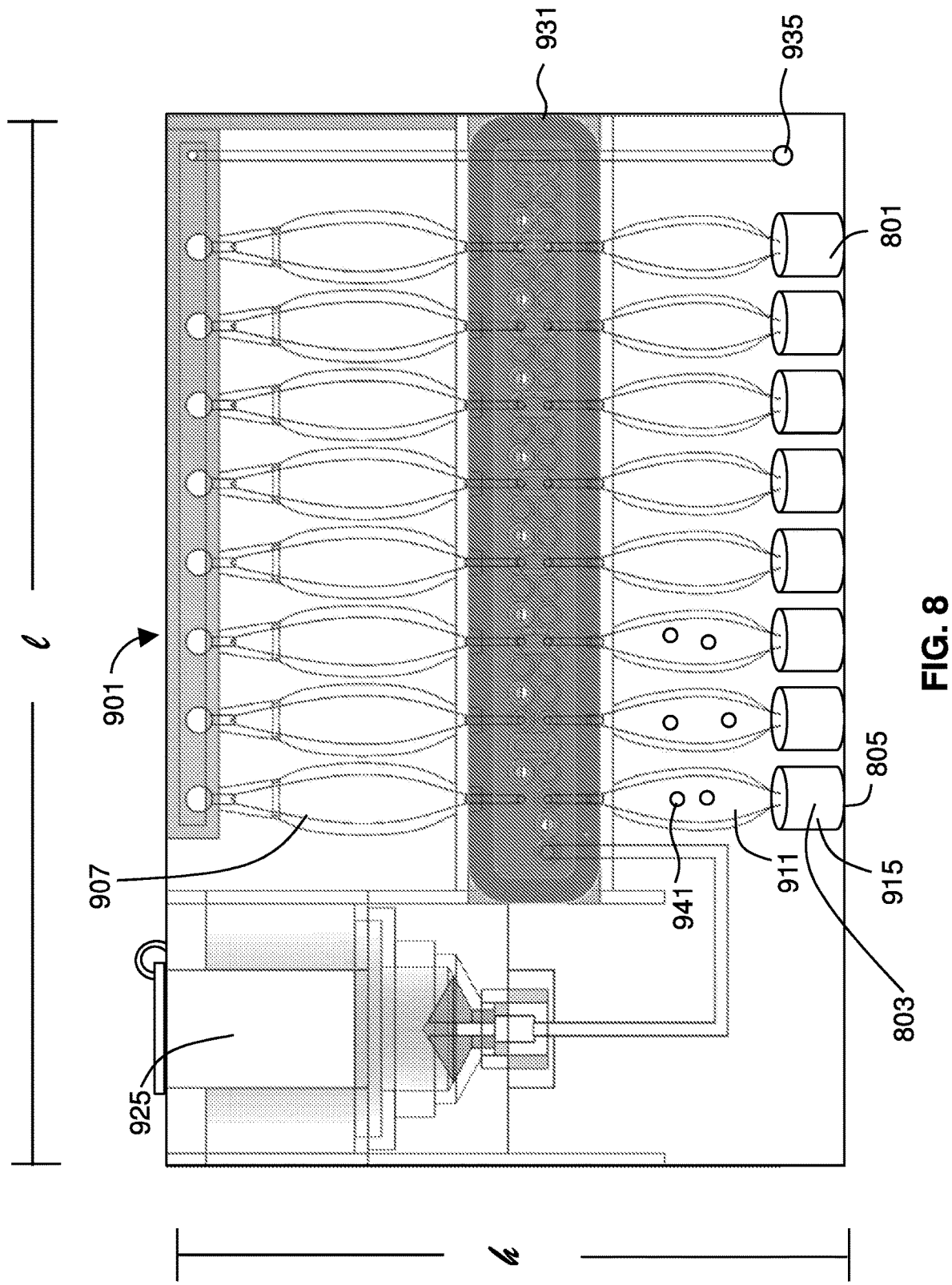
FIG. 8 shows one embodiment of a cartridge.

FIG. 8 shows one embodiment of a cartridge 901 useful for performing the method 101. The cartridge 901 includes an incubation well 911, a species-specific microbial probe 207 and a permeabilization agent 301. The probe 207 and the permeabilization agent 301 are included in beads 941 (e.g., lyophilized beads). When a sample comprising microbes 201 is delivered into the incubation well 911, the permeabilization agent 301 promotes entry of the probe 201 into a microbe (e.g., target cell 223) while the sample is maintained at temperatures beneath about 40 degrees C. The probe 207 comprises a fluorescently labeled oligonucleotide 401 complementary to a segment of ribosomal RNA of a specific bacterial species. Preferably the permeabilization agent 301 comprises one or more detergents (e.g., CHAPSO, SB3-12, TRITON X100).

As shown, the probe 207 and the permeabilization agent 301 are provided in lyophilized beads 941 that are rehydrated and dissolved by delivery of the sample into the incubation well.

In preferred embodiments, the cartridge 901 also includes magnetic particles 605 that bind to bacterial cell surfaces; and a dye cushion adjacent a transparent wall 905. When a magnetic field is applied across the dye cushion 803, the magnetic field pulls the magnetic particles 605 through the dye cushion to the transparent wall. Preferably, the magnetic particles 605 (and any compound to promote binding 621) are also included in lyophilized beads 941. The dye cushion 803 comprises a solution of density gradient medium 801 that further includes a dye that absorbs light from unbound probes 200. In the depicted embodiment, the dye cushion 803 and the transparent wall 805 are provided in an imaging well 915 in fluidic communication with the incubation well 911. The dye cushion 803 is provided in a dried or lyophilized state in the imaging well within the cartridge until wetted by sample.

As shown, the cartridge may include a plurality of paired imaging well/incubation well sets in parallel to one another. Here, the cartridge 901 is shown as including 8 parallel "channels" in which each channel includes a division well 901, an incubation well 911, and an imaging well 915. Embodiments of the cartridge may include 2 gangs of 8 channels such that the picture in FIG. 8 would look about the same, because the additional 8 channels would be behind the eight visible channels (the cartridge is a 3-dimensional object). The cartridge may be described according to its dimensions such as height h, length l, and width w (where width w is measured normal to the page in FIG. 8). Height h may be between about 3 and 10 cm. length l may be between about 5 and 12 cm. Width w may be between about 0.5 and 3 cm. For example, in one embodiment, h is about 6 cm, l is about 8 cm, and w is about 2 cm.

The cartridge 901 preferably includes a receiving reservoir 925 into which a user can pipette the sample into the cartridge. In certain embodiments, the cartridge 901 includes a slideable gate 931 comprising a gasket with channels therethrough. When the gate 931 is positioned at a first position, the receiving reservoir 925 is in fluid communication with at least the first division well 907. When the gate 931 is in a second position, the receiving reservoir 925, the first division well 907, and a first incubation well 911 are all sealed from one another. When the gate 931 is in a third position, the first division well 907 and the first incubation well 911 are in fluid communication with each other.

The cartridge 901 may include a fitting 935 for coupling to an external instrument to receive pneumatic pressure therefrom to divide (hence, "division") the sample from the receiving reservoir 925 into the division wells 927 and to subsequently pass liquid from the division wells 907 into corresponding incubation wells 911.

Preferably, the magnetic particles 905 in the lyophilized beads 941 include a chemical group that binds to the bacterial cell surfaces and the cartridge further comprises a compound that promotes the binding of the chemical group to the bacterial cell surfaces. The compound that promotes binding of the chemical group to the cell surface may be cetrimide, and the chemical group may be, for example, diethylamine ethyl-starch; dextran-sulfate; polyaspartic acid; polyacrylic acid; polyglutamic acid; poly-styrenesulfonate; or poly-diallyldimethylamin.

The probe 207 may be provided, in the lyophilized beads 941, as a fluorescently labeled oligonucleotide 401 complementary to a segment of ribosomal RNA 215 of a specific bacterial species 223, and the beads 941 preferably also include at least one helper probe oligonucleotide that binds to the ribosomal RNA at a location within 1 to 30 bases from the segment. The fluorescently-labeled oligonucleotide 401 may be between 10 and 18 bases in length and include at least one conformationally-restricted nucleic acid for use in FISH at constant physiological temperature.

The reagent composition, the probe, the helper probe, and the compound are provided as lyophilized beads 941 that are rehydrated and dissolved by delivery of the sample into the cartridge 901. The dye cushion 803 comprises a solution of density gradient medium 801 that further includes a dye that absorbs light from unbound probes. The cushion 803 may be provided in a dried or lyophilized state in the imaging well within the cartridge until wetted by sample. The method 101 and the cartridge 901 may be used to perform an antibiotic susceptibility test.

Figure 9:
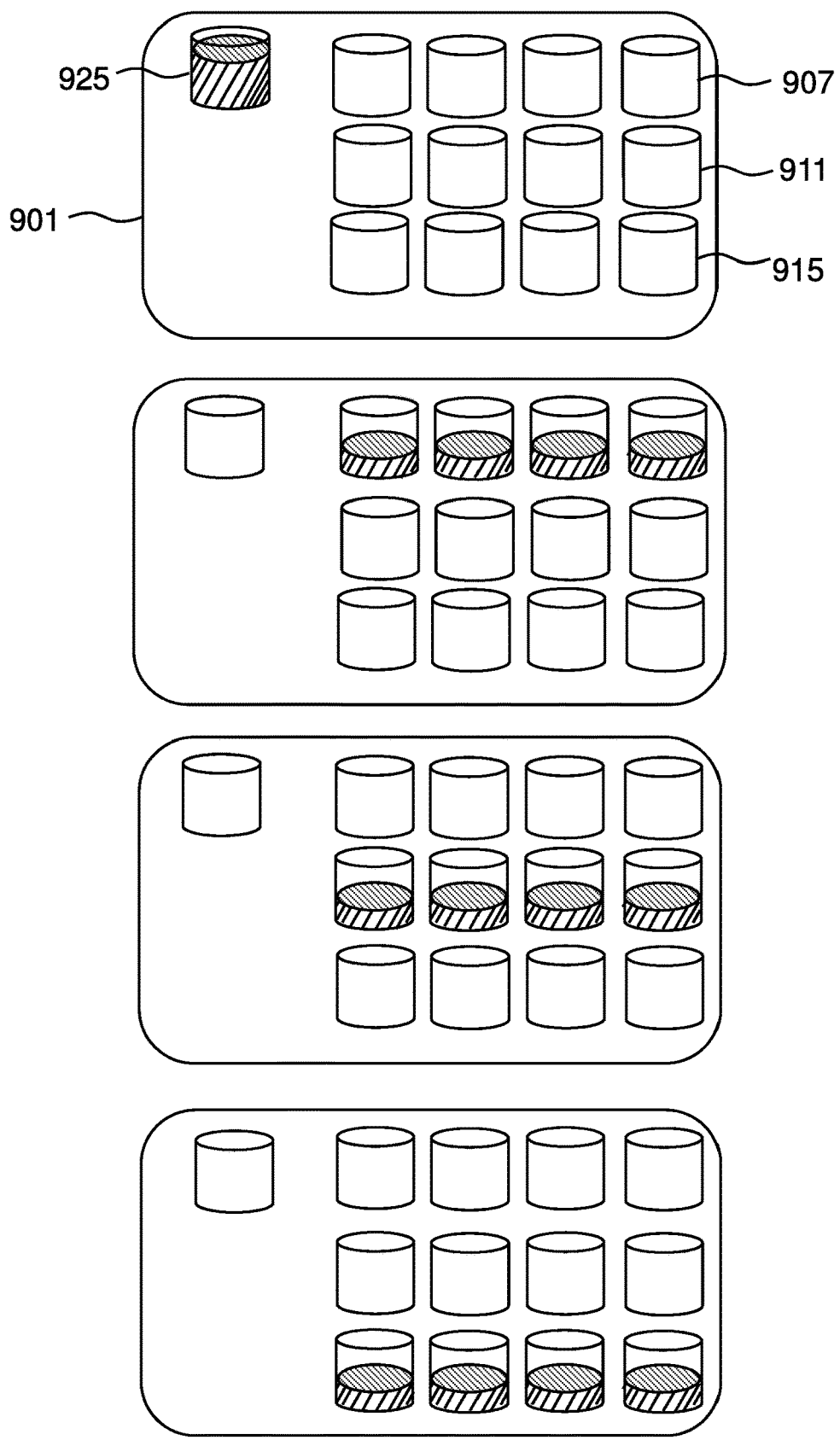
FIG. 9 diagrams a workflow for FISH at physiological temperature.

FIG. 9 diagrams a workflow in which FISH at physiological temperature is used to perform antibiotic susceptibility testing. A sample is loaded into a receiving well 925 of a cartridge 901. The division wells 901 include antibiotics, either different antibiotics or different concentrations of an antibiotic. One "channel" may include no antibiotic as a control, or to establish a baseline of growth. The cartridge is connected to a source of pneumatic pressure, a gate switch, and a fluorescent microscope or similar imaging instrument. The gate switch slides the gate 931 into a first position, the receiving reservoir 925 is in fluid communication with the division wells 907. Pneumatic pressure is applied through fitting 935 and the sample is divided among the division wells. Here, the sample may be incubated with a plurality of antibiotics distributed across the division wells 907.

The gate 931 is slid to the third position in which the division wells are in fluid communication with the incubation wells 911. Pneumatic pressure is applied through fitting 935 and the aliquots of sample are delivered from the division wells 907 to the respective incubation wells 911. In each incubation well 911, a sample aliquot is incubated, without exceeding 45 degrees C., with probes specific for target nucleic acid of a species of microorganism as well as with magnetic particles. The gate 931 is slid to second position in which incubation wells 911 are sealed. The sample is delivered to the imaging wells 915 and a magnetic field is applied to separate intact cells in the sample from unbound probes. This may be performed by sliding the cartridge onto a magnet. The field B draws the cells onto the imaging surface 805. Bound probes within the intact cells are detected to quantify growth of the species within each aliquot the sample. Growth or lack thereof may be correlated back to which antibiotic was present in which division well 907. For an imaging well 915 in which no pathogen growth is detected 135 (e.g., fluorescent microscopy shows no fluorescence), the sample is shown to be susceptible to the antibiotic that was present in the corresponding division well 907.

A benefit of the cartridge 901 and method 101 is that they are amenable to use with an instrument that interacts with the cartridge 901 to automate the steps.

Figure 10:
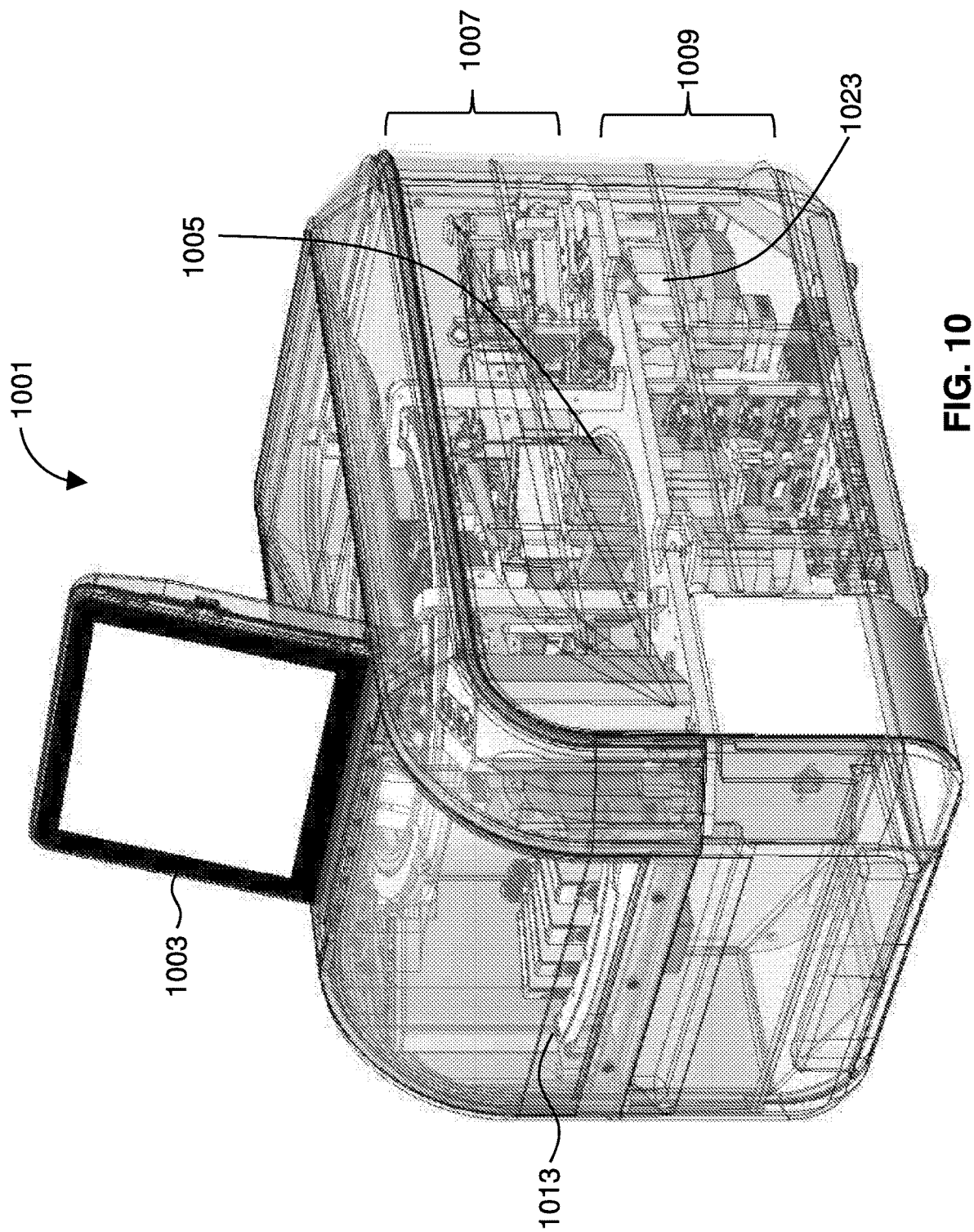
FIG. 10 shows an exemplary instrument.

FIG. 10 shows an exemplary instrument 1001 (e.g., analyzer) for performing microbe identification and antibiotic susceptibility testing (AST) of samples within a cartridge 901. The instrument 1001 may be used to interact with cartridges 901 to perform methods 101 useful for microbial ID and AST analysis of samples. The instrument 1001 includes at least one user interface 1003 (e.g., a touch screen) to display prompts, results, reports 129 and to receive commands. The instrument 1001 may include multiple work stations. The instrument may include a carousel 1005 for transporting cartridges, an upper compartment 1007 for housing processing and incubation equipment, and a lower compartment 1009 for housing electronics, imaging and pneumatic equipment. The instrument 1001 may include an input mechanism 1013 (e.g., a loading rack or tray) for accepting and cataloging a plurality of analytical cartridges. The instrument 1001 may also include a carousel 1005 and a pusher mechanism to move cartridges 901 within the instrument 705. The instrument 1001 may also include a task scheduler. The instrument 1001 is preferably controlled by a computer to automate manipulation of analytical cartridges, performance of microbe identification and AST analyses, and generation of results. The instrument 1001 may include a plurality of subsystems to perform methods of the invention.

Subsystems of the instrument 1001 may include a pneumatic subsystem, a magnetic subsystem, a clamshell heater, and an imaging subsystem 1023. The magnetic subsystem may include, for example, a permanent magnet or an electromagnet to provide a magnetic field B to pull magnetic particles 605 and targets on the detection surface 805 of the analytical cartridge 901 for imaging. The imaging subsystem may be such as those described in U.S. Pat. Nos. 9,643,180 and 8,021,848, both incorporated herein by reference, to capture images of microbes, and a stage to manipulate the detection surface of the cartridge 901 relative to the imaging module of the instrument 1001. The imaging subsystem 1023 can be operably associated with the computer to provide image processing, analysis, and display capabilities. The pneumatic subsystem may be operable to drive movement of the sample and reagents within the cartridge 901. The instrument 1001 may also include one or more incubation areas for holding (or storing) analytical cartridges during incubation for growth and/or assay incubation. The incubation area may include a heating and/or cooling element and a thermostat to control that element to maintain the incubation area at a desired temperature for growth of the target cells or microbes (e.g., 35 degrees C.) or for carrying out assay incubation.

In some embodiments the pusher mechanism (e.g., mechanical conveyor arm) may be operable to move the cartridge 901 amongst the various subsystems within the instrument 1001. In some embodiments of the invention, the pusher mechanism 707 transfers cartridges 901 between the carousel 1005 and the various subsystems of the instrument. The pusher mechanism pushes or pulls cartridges 901 onto and off of the carousel 1005. The carousel 1005 rotates to position an cartridge 901 adjacent another one of the subsystems and the pusher 707 may then apply force to slide the cartridge 901 onto the subsystem. In some embodiments, the instrument includes a task scheduler for managing the analytical cartridges 109 within the instrument 1001. The task scheduler is operable to control the movement, such as the transport and transfer of each of the analytical cartridges 901 amongst the plurality of subsystems. In some embodiments, the time each cartridge 901 spends in a subsystem may also be managed by the task scheduler. The task scheduler may reserve time on various subsystems as needed for analysis of each of the analytical cartridges 901. In some embodiments of the invention, the task scheduler may manage the movement of an cartridge 901 (i.e., the steps/parameters of the analysis to be performed) by identifying the contents of the cartridge.

In some embodiments, the instrument 1001 may also include a reader operable to analyze unique identifiers (e.g., barcodes) on a cartridge 901. The contents of a cartridge 901 and the required processing may be associated with a barcode on the cartridge 901. The instrument 1001 may read the unique barcode via a reader and associate the unique barcode with a particular set of instructions for the task scheduler to execute. The instrument preferably includes a computer (e.g., within or connected to interface 1003) to control operations described herein. The computer preferably includes a processor coupled to a non-transitory memory device. The memory preferably stores instructions executable by the processor to cause the system to manipulate analytical cartridges 901 within the instrument 1001 and to obtain and process images of labelled microbes.

Processor refers to any device or system of devices that performs processing operations. A processor will generally include a chip, such as a single core or multi-core chip, to provide a central processing unit (CPU). A process may be provided by a chip from Intel or AMD. A processor may be any suitable processor such as the microprocessor sold under the trademark XEON E7 by Intel (Santa Clara, CA) or the microprocessor sold under the trademark OPTERON 10200 by AMD (Sunnyvale, CA).

Memory refers a device or system of devices that store data or instructions in a machine-readable format. Memory may include one or more sets of instructions (e.g., software) which, when executed by one or more of the processors of the computer can accomplish some or all of the methods or functions described herein. Preferably, the computer includes a non-transitory memory such as a solid state drive, flash drive, disk drive, hard drive, subscriber identity module (SIM) card, secure digital card (SD card), micro SD card, or solid-state drive (SSD), optical and magnetic media, others, or a combination thereof.

An input/output device 1307 is a mechanism or system for transferring data into or out of a computer 1301 to the instrument 1001. Exemplary input/output devices 1307 include a video display unit (e.g., a liquid crystal display (LCD) or a cathode ray tube (CRT)), an alphanumeric input device (e.g., a keyboard), a cursor control device (e.g., a mouse), a barcode scanner, a reader, a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem. Input/output devices 1307 may be used to allow a user to control the instrument 1001 and display results and generate a report obtained from the analysis of the cartridges.

Thus the instrument 1001 may be used with a cartridge 901 to perform method 101 for detecting a microorganism by incubating, without exceeding 45 degrees C., a sample with probes specific for target nucleic acid of a species of microorganism; separating intact cells in the sample from unbound probes; and detecting probes bound within the intact cells to show the presence of the species in the sample. The incubating step preferably includes exposing the cells to magnetic particles that bind to surfaces of bacterial cells. The probes include a fluorescently-labeled probe oligonucleotide 401 that is complementary to a segment of ribosomal RNA exclusive to the species. In the cartridge, there will be lyophilized bead for the probes, magnetic particles, and other reagents. The detecting step preferably includes imaging fluorescently labeled cells of the species using a fluorescent microscope. The steps may all be performed at temperatures between about 36 and 39 degrees C., preferably between 36.5 and 37.5 degrees C.

EXAMPLES

Example 1. Limit of Detection (LoD) for Gram-Negative Bacteria Using a Novel, Rapid Fluorescence In Situ Hybridization Assay Overview: The following example demonstrates that very low concentrations of cells can be detected using the novel isothermal fluorescence in situ hybridization method. The limit of detection for three common human urinary tract infection (UTI) pathogens are shown.

Experimental Methods:

Bacterial cell preparation: Bacterial cultures for *E. coli* ATCC 19138, *K. pneumoniae* ATCC 700603 and *P. aeruginosa* ATCC 9721 were obtained by inoculating Trypticase Soy Broth (TSB, Hardy Diagnostics cat. U65) with 3 to 5 colonies from fresh tryptic soy agar plates (TSA, BD cat. 221185) and growing for 1.5 to 3 hours at 35° C. to achieve log-phase growth. After the cells had reached an optical density reading at 600 nm of 0.15-0.30, cells were placed on ice for at least 15 minutes before dilution. After cooling, the cells were diluted in 1× cation-adjusted Mueller-Hinton broth (MHBII, Teknova cat. M5860) to the concentrations to be assayed (approximately 19200, 9600, 4800, 2400, 1200, 600, 300, and 150 colony-forming units (CFU)/reaction). For more accurate cellular concentrations, these estimated bacterial inputs were adjusted using colony counts. Plate counts were determined by diluting the log-phase cultures to about 500 CFU/mL in MHBII, plating 100 µL on TSA plates and counting colonies after growth at 35° C. for 16 to 24 hours. Using the average plate counts, the actual CFU present in each concentration tested was computed.

Preparation of Magnetic Particles: Polyaspartic acid-conjugated magnetic particles (Fluidmag-PAA, Chemicell, cat. 4108) and carboxyl-coated magnetic particles with high iron (Carboxyl Magnetic Particles, Spherotech, cat. CM-025-10H) were used to non-specifically capture bacterial cells. Each particle was diluted 1:40 into 50 mM Epps buffer, pH 8.2, with final concentrations of approximately $1.38\times10^9$ particles per reaction for the polyaspartic acid particles and $3.46\times10^9$ particles per reaction for the carboxyl particles. Fluorescent magnetic microspheres containing a green dye (Dragon Green Fluorescent Microspheres, BANGS Laboratories, cat MEDG001) were added to the suspension at a final concentration of $3\times10^6$ particles/mL. These particles enable the optical system to focus on the correct plane. The magnetic particle mixture was sonicated for 1 minute immediately prior to use to minimize aggregation.

Preparation of FISH probes: Two species-specific DNA oligomer sets for *E. coli* and *K. pnuemoniae* and one for *P. aeruginosa* was heated in a water bath between 80-85° C. for 10 minutes and then placed on ice to reduce aggregation. A DNA oligomer set contained a species-specific DNA oligonucleotide labeled with a fluorescent dye (Alexa647N, Thermo Fischer) on either the 5' end, or on both the 5' and 3' ends of the oligonucleotide, and 2-6 helper oligonucleotides that bind adjacent or near the specific probe and are designed to disrupt the local secondary structure of the ribosomal subunit, and allow the labeled, specific probe greater hybridization efficiency to the target rRNA. Probe sequences used in this example are shown in Table A in FIG. 14.

Preparation of the dried hybridization buffer plates: A mixture of 10×SSC (1.5M NaCl, 0.15M Sodium citrate, Sigma, cat. S6639), 2.6% w/v CHAPSO (Sigma cat. C3649), 2.4% w/v SB3-12 (Sigma cat. D0431), 0.43M Guanidine thiocyanate (Sigma cat. G9277) and 0.6% w/v Cetrimide (Sigma cat. M7365) was prepared. 30 uL of this mixture was added to each well of a 96 well plate. The plates were placed into a convection oven at 50° C. and allowed to dry overnight. When 100 uL of liquid is added to these wells, the correct hybridization buffer concentrations of 3×SSC (0.45M NaCl, 0.045M Sodium citrate), 0.77% w/v CHAPSO (Sigma cat. C3649), 0.72% w/v SB3-12 (Sigma cat. D0431), 0.13M Guanidine thiocyanate (Sigma cat. G9277) and 0.18% w/v Cetrimide (Sigma cat. M7365) are achieved.

Limit of Detection (LoD) Assay procedure: A mixture of DNA oligonucleotide sets appropriate for the bacteria of interest was combined with urine and a concentrated cation-adjusted Mueller Hinton Stock (MHBII) to make a final solution containing 1×MHBII and 30% pooled human urine (Innovative Research, cat. IRHUURE500ML). Probe concentrations varied between different bacterial species but ranged from 0.2-0.6 µM for the labeled oligonucleotide and 1.5-6 µM for the corresponding helper probes. 90 uL of this mixture was placed into the appropriate dried hybridization buffer plate. 10 uL of the magnetic particle mixture was added, followed by 10 uL of the appropriate cell dilution. Twelve replicates of each cell concentration and 24 replicates of the blank (media containing no bacteria) were assessed for each target bacteria tested. 100 µL of the final reaction mixture was transferred to a microtiter plate containing 50 µL per well (previously dried) of "dye-cushion" (50 mM TRIS pH 7.5 (Sigma cat. T1075), 7.5% v/v Optiprep (Sigma cat. D1556), 50 mg/mL Direct Black 19 (Orient cat. 191L) and incubated at 35° C. for 30 minutes to allow for the simultaneous rehydration of the "dye-cushion", labeling of bacterial cells, and binding of magnetic particles to bacterial cell surfaces. After incubation, microtiter plates were placed onto a magnetic field (Dexter magnetic technologies, cat. 54170260) for 4 minutes to bring magnetic particles, a fraction containing labelled cells, through the "dye-cushion" and into proximity to the imaging surface at the bottom of the wells.

Imaging of labeled cells: The MultiPath™ laboratory imaging system is a custom-built instrument and software that is capable of automatically capturing image data from selected wells of a microtiter plate. It uses a high precision linear stage from Prior Scientific (Rockland, MA) to position each well over a fluorescence-based image acquisition subsystem. The instrument can image in 4 separate color channels and uses an objective lens, illumination LEDs, fluorescent filter sets, and camera. The objective lens has a field of view designed to capture the image of an entire microtiter plate well. The illumination module light source consists of 2 high power LEDs per color channel. A series of fluorescent image frames are captured with a camera using a 3.1MP Sony IMX265 monochrome sensor with 12-bit per pixel quantization. The final image for each well is then formed by summing multiple frames. 16 frames were captured at a 100 msec exposure using 635/25 nm excitation and 680/40 nm emission filters. The focus particles are imaged at 470/40 nm excitation and 520/40 nm excitation filters and captured 2 frames at a 20 msec exposure.

Data analysis: At each cell concentration, the number of fluorescent objects detected was determined. The data from all eight cell concentrations was fit to a linear regression line, and the slope, intercept and standard deviation of the lowest 3 cell inputs was used to determine the limit of the blank (LoB) and limit of detection (LoD) for each bacterium tested.

Results:

All three bacteria tested showed low limits of detection. FIGS. 1, 2, and 3 show the data generated for *E. coli*, *K. pneumoniae*, and *P. aeruginosa* with the linear fit used to calculate the LoB and LoD. The LoB and LoD are indicated in CFUs detectable in a single reaction well.

Conclusions. The novel and rapid FISH method described in this example is shown to be a sensitive method with limits of detection of about 500 CFU or less per reaction, using minimally processed urine matrix.

Variations. This example is illustrative of the performance of this novel FISH method and is not limited to the specific details included in the description. One skilled in the art will readily understand that many variations are therefore possible, including using different probe sequences and nucleic acid structures (PNA, LNA, etc.), alternative assay chemistries (different detergents, chaotropes, fluorophores, buffers, pH, temperatures, reaction times, component concentrations), concentration of urine and urine processing procedures. This methodology can also clearly be extended to other biological specimens and to other bacterial and non-bacterial pathogens.

Figure 11:
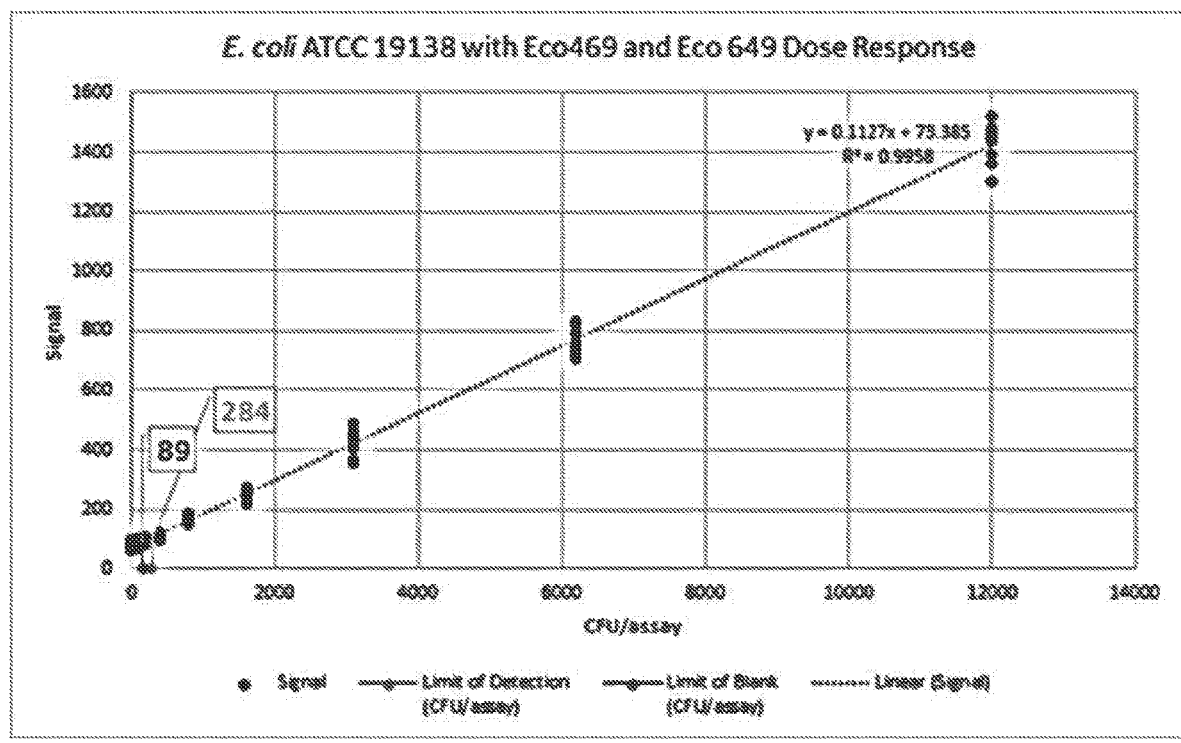
FIG. 11 shows Limit of detection (LoD) of *E. coli*.

FIG. 11 shows Limit of detection (LoD) of *E. coli* ATCC 19138 is shown. Limit of blank (LoB) was 89 CFU/assay and the LoD was 284 CFU/assay. This corresponds to an LoD of 9,467 CFU/ml of urine.

Figure 12:
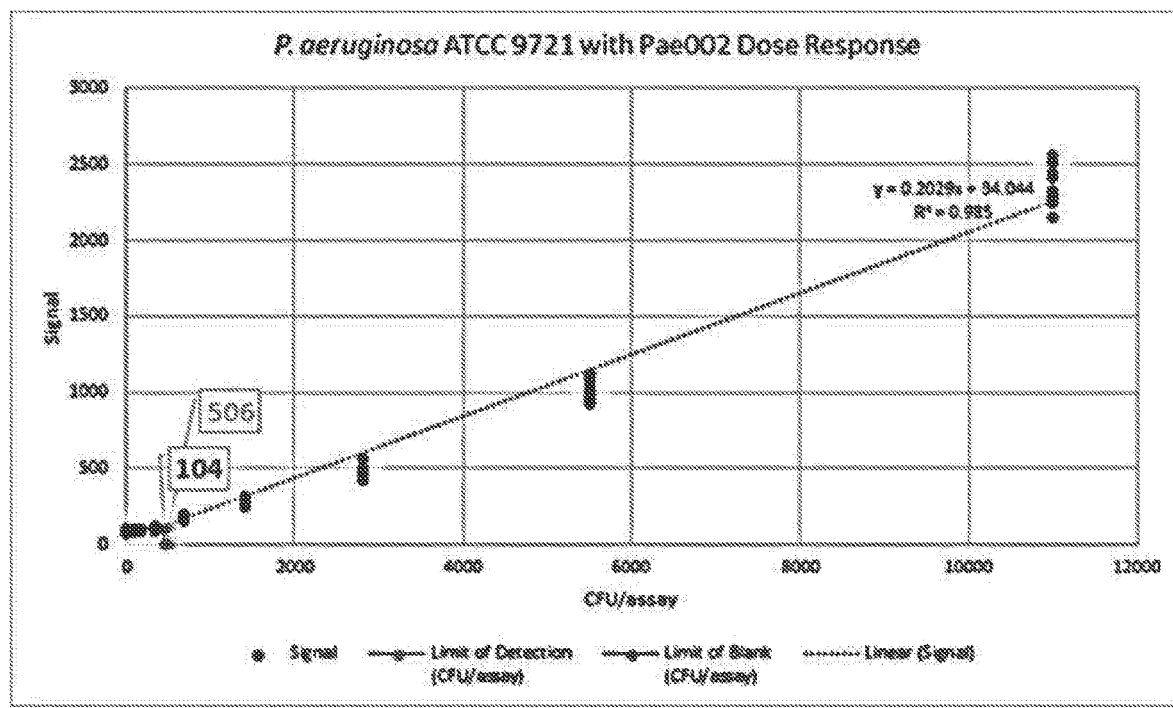
FIG. 12 shows Limit of detection (LoD) of *P. aeruginosa*.

FIG. 12 shows Limit of detection (LoD) of *P. aeruginosa* ATCC 9721 is shown. Limit of blank (LoB) was 104 CFU/assay and the LoD was 506 CFU/assay. This corresponds to an LoD of 16,867 CFU/ml of urine.

Figure 13:
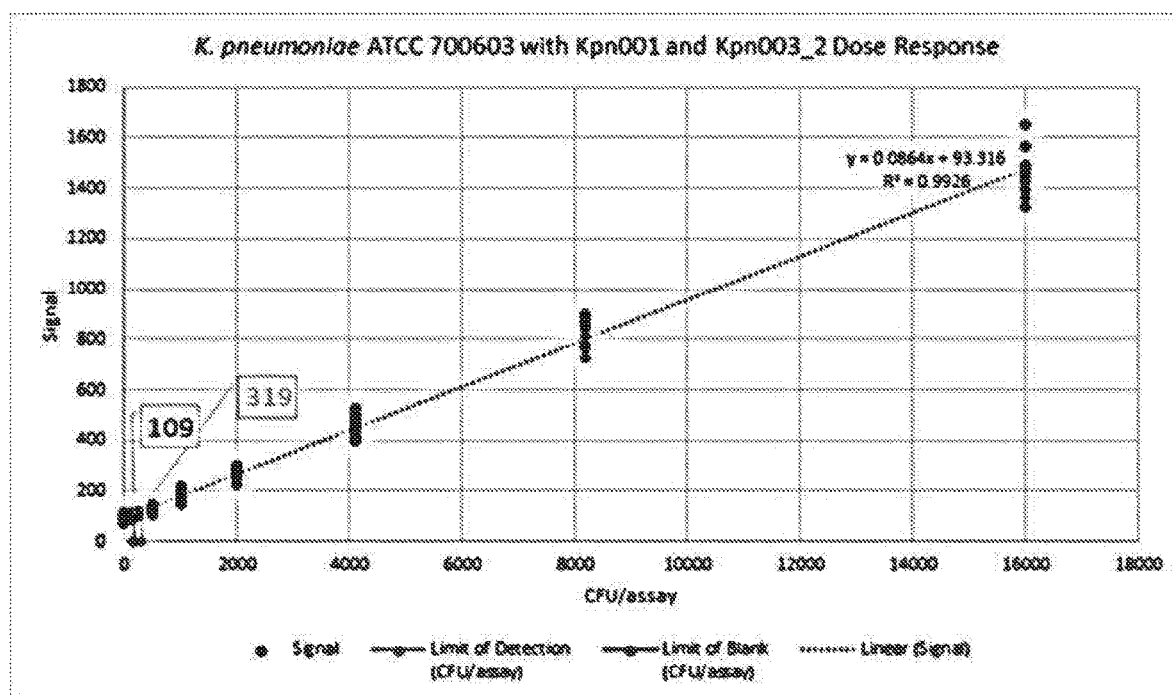
FIG. 13 shows Limit of detection (LoD) of *K. pneumoniae* ATCC 700603 is shown. Limit of blank (LoB) was 109 CFU/assay and the LoD was 319 CFU/assay. This corresponds to an LoD of 10,633 CFU/ml of urine.

FIG. 13 shows Limit of detection (LoD) of *K. pneumoniae* ATCC 700603 is shown. Limit of blank (LoB) was 109 CFU/assay and the LoD was 319 CFU/assay. This corresponds to an LoD of 10,633 CFU/ml of urine.

FIG. 14 is a table of Probe sequences used in this example.

Example 2. Inclusivity: Detecting and Identifying Different Strains of a Bacterial Species Using the Inventive Rapid FISH Method Overview. This example demonstrates the use of the invention to detect different strains for a targeted bacterial species. Raw data for 11 different *E. coli* strains are presented and data for *K. pneumoniae, P. aeruginosa, P. mirabilis* and *Enterococcus* spp. are summarized. Bacterial cell targets were labeled in 30 minutes using isothermal fluorescence in situ hybridization (FISH) and detected on the MultiPath™ CCD-camera-based detection system.
Experimental Methods.

Bacterial cell preparation: Bacterial cultures for different strains were obtained by inoculating Trypticase Soy Broth (TSB, Hardy Diagnostics Cat. U65) with 3 to 5 colonies from fresh tryptic soy agar plates (TSA, BD cat. 221185) and growing for 1.5 to 3 hours at 35° C. to achieve log-phase growth. Using optical density at 600 nm to estimate cell concentration, cells were diluted to approximately 600 CFU and 3000 CFU per reaction in 1× cation-adjusted Mueller-Hinton broth (MHBII, Teknova cat. M5860). For more accurate percent cellular detection calculations, these estimated bacterial inputs were adjusted using colony counts. Plate counts were determined by diluting the log-phase cultures to about 500 CFU/mL in MHBII, plating 100 µL on TSA plates and counting colonies after growth at 35° C. for 16 to 24 hours.

Preparation of Magnetic Particles: Polyaspartic acid-conjugated magnetic particles used to non-specifically capture bacterial cells (Fluidmag-PAA, Chemicell, cat. 4108) were diluted 1:20 into 50 mM EPPS buffer, pH 8.2 to $2.75 \times 10^{12}$ particles/mL. Fluorescent magnetic microspheres containing a green dye (Dragon Green Fluorescent Microspheres, BANGS Laboratories, cat MEDG001) were added to the suspension at a final concentration of $3 \times 10^6$ particles/mL. These particles enable the optical system to focus on the correct plane. The magnetic particle mixture was sonicated for 1 minute immediately prior to use to minimize aggregation. Separate magnetic particle suspensions were prepared for the time zero and time four-hour assays described below.

Labeling of Bacterial Cells: 100 µL labeling reactions were prepared by combining diluted cells, isothermal hybridization buffer (0.9×MHBII, 3×SSC (1.5M NaCl, 0.15M Sodium citrate, Sigma, cat. S6639), 0.77% w/v CHAPSO (Sigma cat. C3649), 0.72% w/v SB3-12 (Sigma cat. D0431), 0.13M Guanidine thiocyanate (Sigma cat. G9277), 0.18% w/v Cetrimide (Sigma cat. M7365)), species-specific Alexa647N-labelled DNA or LNA-containing DNA probes (Integrated DNA Technologies, IDT) targeted to the 16S or 23S bacterial rRNA, helper probes to facilitate effective hybridization (IDT) and 304, of pooled human urine (Innovative Research, cat. IRHUURE500ML). Probe sequences are shown in the Table in FIG. 18.

The urine was first processed through a Zeba 7K MWCO spin column (Thermo Fisher, Cat. 89893 or 89892 depending on urine volume) according to the manufacturer's instructions. 10 µL of the magnetic particle preparation was then added to this mixture. The final reaction mixture was transferred to a microtiter plate containing 50 µL (previously dried) "dye cushion" (50 mM TRIS pH 7.5 (Teknova cat. T1075), 7.5% v/v Optiprep (Sigma cat. D1556), 50 mg/mL Direct Black 19 (Orient cat. 191L) incubated at 35° C. for 30 minutes to allow for the simultaneous rehydration of the "dye cushion", labeling of bacterial cells, and binding of magnetic particles to bacterial cell surfaces. After incubation, microtiter plates were placed onto a magnetic field (Dexter magnetic technologies, cat. 54170260) for 4 minutes to bring magnetic particles, a fraction containing labelled cells, through the "dye cushion" and into proximity to the imaging surface at the bottom of the wells.

Imaging of labeled cells: Labeled bacterial cells on the MultiPath laboratory imaging system is a custom-built instrument and software that is capable of automatically capturing image data from selected wells of a microtiter plate. It uses a high precision linear stage from Prior Scientific (Rockland, MA) to position each well over a fluorescence-based image acquisition subsystem. The instrument can image in 4 separate color channels and uses an objective lens, illumination LEDs, fluorescent filter sets, and camera. The objective lens has a field of view designed to capture the image of an entire microtiter plate well. The illumination module light source consists of 2 high power LEDs per color channel. A series of fluorescent image frames are captured with a camera using a 3.1MP Sony IMX265 monochrome sensor with 12-bit per pixel quantization. The final image for each well is then formed by summing multiple frames. 16 frames were captured at a 100 msec exposure using 635/25 nm excitation and 680/40 nm emission filters. The focus particles are imaged at 470/40 nm excitation and 520/40 nm excitation filters and captured 2 frames at a 20 msec exposure.

Data analysis: For each bacterium, the number of fluorescent objects was determined (assay signal). A bacterial strain was considered detected if signal was detected above three standard deviations of the signal in the no cell condition.

Results. FIG. 1 shows assay signal for 11 *E. coli* strains. All 11 strains were detected above the background "no cell" condition for at a cell input of approximately 600 CFU per assay. FIG. 2 shows the data represented as percentage of cells detected (total assay signal in cell input well–background assay signal/total cell input*100). Although the detection efficiency is somewhat variable from strain to strain, this did not inhibit the assay's ability to detect each of the 11 different *E. coli* strains.

Figures 16, 17:
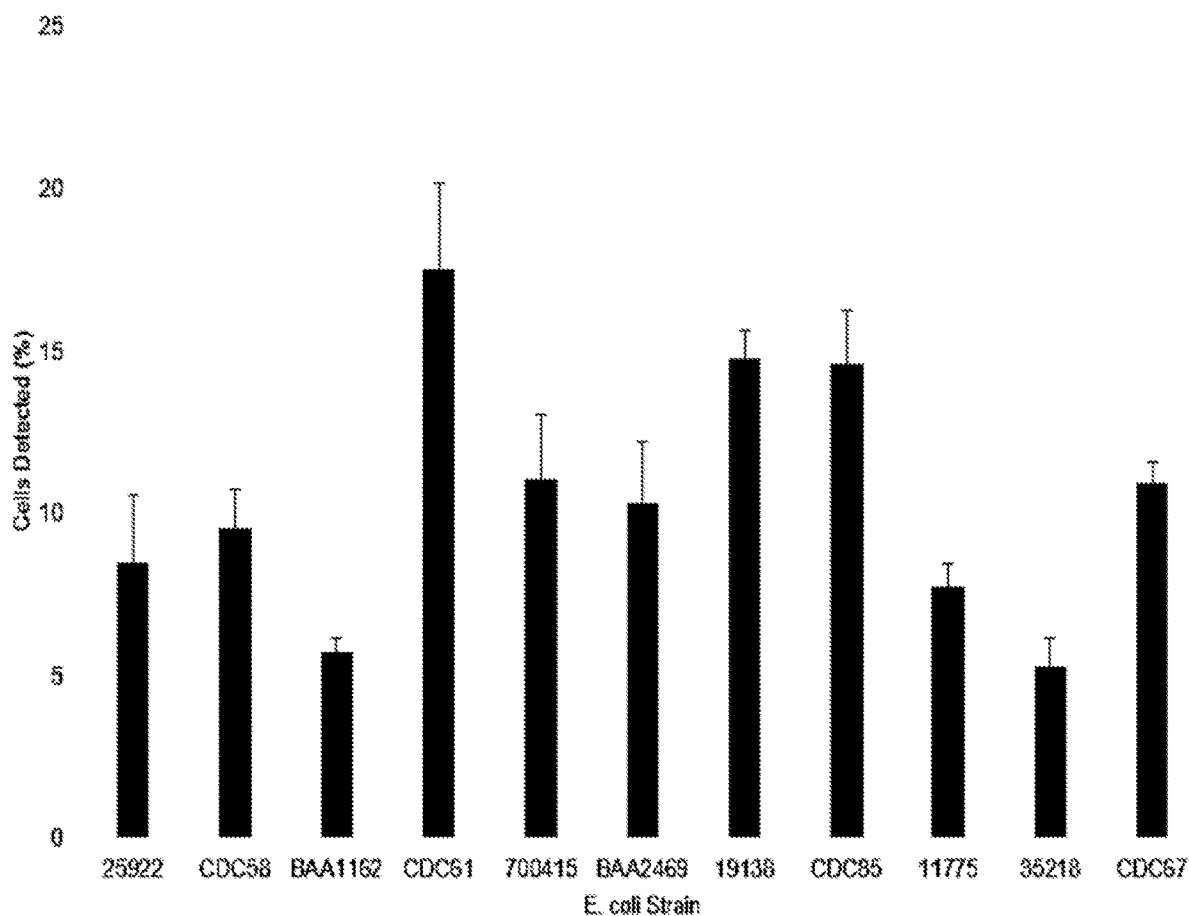
FIG. 17 summarizes inclusivity results for bacteria.
FIG. 16 shows The percentage of input cells (as determined by plate counts) that were detected are shown for each of the 11 *E. coli* strains. Each bar represents the mean of 6 determinations, 3 from each of the two different input cell levels. Percentage cell detection was calculated as [(assay signal−background signal)/input cells]*100.

The table in FIG. 17 summarizes inclusivity results for *E. coli, K. pneumoniae, P. aeruginosa, P. mirabilis* and *Entero-*

*coccus* spp. which were analyzed in the same manner as *E. coli*. Strains tested for *K. pneumoniae* were ATCC 13833, CDC80, CDC44, CDC87, CDC47, CDC43, BAA2470, CDC34, CDC39, ATCC 700603 and BAA-2472. Strains tested for *P. aeruginosa* were CDC263, CDC242, 9721, CDC236, 27853, BAA-2110, CDC233, 15692, CDC234, CDC246 and CDC261. Strains tested for *P. mirabilis* were CDC155, CDC29, CDC159, CDC59, ATCC 7002 and CDC156. Strains tested for *Enterococcus* included ATCC 19433, ATCC 29212, ATCC 33186, ATCC 51575, ATCC 51299 and BAA-2128.

Conclusions. The novel FISH method described in this example detected all strains tested for 5 different bacterial species that are among the major pathogens leading to clinical symptoms in patients with UTI.

Variations. This example is illustrative of the performance of this novel FISH method and is not limited to the specific details included in the description. One skilled in the art will readily understand that many variations are therefore possible, including using different probe sequences and nucleic acid structures (PNA, LNA, etc.), alternative assay chemistries (different detergents, chaotropes, fluorophores, buffers, pH, temperatures, reaction times, component concentrations), concentration of urine and urine processing procedures. This methodology can also clearly be extended to other biological specimens and to other bacterial and non-bacterial pathogens.

Figure 15:
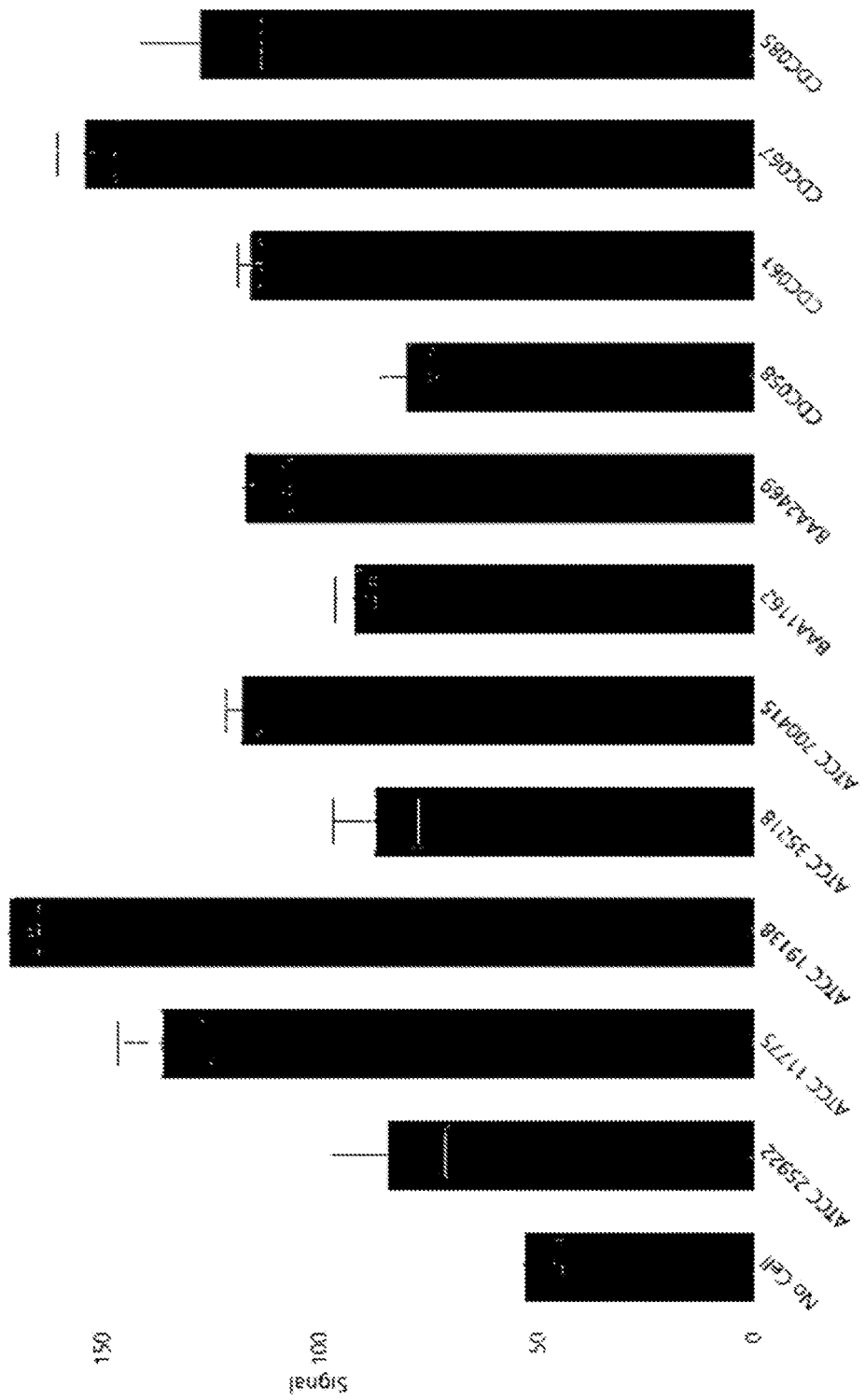
FIG. 15 shows Mean signal (n=3) is plotted for 11 *E. coli* strains for input cell concentrations of approximately 600 CFU/assay (light gray bars) and 3000 CFU/assay (dark gray bars). Signal derived from the no cell control (blank) is shown on left-hand side of the figure. Error bars represent 1 standard deviation.

FIG. 15 shows Mean signal (n=3) is plotted for 11 *E. coli* strains for input cell concentrations of approximately 600 CFU/assay (light gray bars) and 3000 CFU/assay (dark gray bars). Signal derived from the no cell control (blank) is shown on left-hand side of the figure. Error bars represent 1 standard deviation.

FIG. 16 shows The percentage of input cells (as determined by plate counts) that were detected are shown for each of the 11 *E. coli* strains. Each bar represents the mean of 6 determinations, 3 from each of the two different input cell levels. Percentage cell detection was calculated as [(assay signal−background signal)/input cells]*100.

FIG. 17 is a table giving Inclusivity results for 4 additional bacteria.

FIG. 18 is a table giving Probe sequences used in this example.

Example 3. Specific Detection of Target Bacteria Using Rapid Isothermal FISH

Overview. This example demonstrates that the novel isothermal FISH method specifically detects a target bacterium while not detecting related non-target bacteria, even at very high concentrations. This example presents assay conditions that specifically detect *E. coli* yet do not detect 16 other bacteria that also cause urinary tract infections (UTI), have similar rRNA sequences or are commensal organisms.

Experimental Methods.

Bacterial cell preparation: Bacterial cultures for 16 off-target bacteria (listed in Table 1) and *E. coli* strain ATCC 25922 were grown from a single colony selected from a fresh tryptic soy agar plates (TSA, BD cat.221185), inoculated into Trypticase Soy Broth (TSB, Hardy Diagnostics cat. U65) and grown with shaking overnight at 35° C. 50-80 μL of the overnight culture was added into fresh TSB and grown for 1.5-2 hours, until the optical density at 600 nm reached 0.15-0.3. Each bacterium was then diluted to approximately $1\times10^8$ cells per mL in cation-adjusted Mueller Hinton (MHBII, Teknova cat. M5860).

Selection of bacterial targets to evaluate: Bacterial pathogens to test for specificity were selected for their rRNA sequence similarity to the target bacteria's rRNA sequence or because they are pathogens that are commonly found in urinary tract infections (the disease target) and therefore, cross-reactivity to these organisms would be most problematic. The table in FIG. 19 shows the bacterial species and strains tested.

Preparation of FISH probes: A DNA probe set for *E. coli* was heated in a water bath between 80-85° C. for 10 minutes and then placed on ice to reduce aggregation. This DNA probe set is shown in Table in FIG. 20. The set contains a species-specific DNA oligonucleotide labeled with a fluorescent dye (Alexa647N, Thermo Fischer) and helper oligonucleotides that bind adjacent or near the specific probe and are designed to disrupt the local secondary structure of the ribosomal subunit, and allow the labeled, specific probe greater hybridization efficiency to the target rRNA.

Preparation of Magnetic Particles: Polyaspartic acid-conjugated magnetic particles used to non-specifically capture bacterial cells (Fluidmag-PAA, Chemicell, cat. 4108) were diluted 1:20 into 50 mM EPPS buffer, pH 8.2 to $2.75\times10^{12}$ particles/mL. Fluorescent magnetic microspheres containing a green dye (Dragon Green Fluorescent Microspheres, BANGS Laboratories, cat MEDG001) were added to the suspension at a final concentration of $3\times10^6$ particles/mL. These particles enable the optical system to focus on the correct plane. The magnetic particle mixture was sonicated for 1 minute immediately prior to use to minimize aggregation.

Labeling of Bacterial Cells: 100 μL labeling reactions were prepared by combining diluted cells, isothermal hybridization buffer (0.9×MHBII (Teknova cat. M5860), 3×SSC (0.45M NaCl, 0.045M Sodium citrate, Sigma, cat. cat. S6639), 0.77% w/v CHAPSO (Sigma cat. C3649), 0.72% w/v SB3-12 (Sigma cat. D0431), 0.13M Guanidine thiocyanate (Sigma cat. G9277), 0.18% w/v Cetrimide (Sigma cat. M7365)), species-specific Alexa647N-labelled probes (Integrated DNA Technologies, IDT) targeted to the 16S or 23S bacterial rRNA, helper probes to facilitate effective hybridization (IDT) and 30 μL of pooled human urine (Innovative Research, cat. IRHUURE500ML). The specific probe sets tested are shown in Table in FIG. 20. The urine was first processed through a Zeba 7K MWCO spin column (Thermo Fisher, Cat. 89893 or 89892 depending on urine volume) according to the manufacturer's instructions. 10 μL of the magnetic particle preparation was then added to this mixture. The final reaction mixture was transferred to a microtiter plate containing 504, per well (previously dried) of "dye-cushion" (50 mM TRIS pH 7.5 (Sigma cat. T1075), 7.5% v/v Optiprep (Sigma cat. D1556), 50 mg/mL Direct Black 19 (Orient cat. 191L)) and incubated at 35° C. for 30 minutes to allow for the simultaneous rehydration of the "dye-cushion", labeling of bacterial cells, and binding of magnetic particles to bacterial cell surfaces. Each bacterium was tested at a final concentration of $1\times10^6$ cells per reaction. This concentration is around 3000-fold higher than the determined limit of detection for *E. coli*. After incubation, microtiter plates were placed onto a magnetic field (Dexter magnetic technologies, cat. 54170260) for 4 minutes to bring magnetic particles, a fraction containing labelled cells, through the "dye-cushion" and into proximity to the imaging surface at the bottom of the wells.

Imaging of labeled cells: The MultiPath™ laboratory imaging system is a custom-built instrument and software that is capable of automatically capturing image data from selected wells of a microtiter plate. It uses a high precision linear stage from Prior Scientific (Rockland, MA) to position each well over a fluorescence-based image acquisition subsystem. The instrument can image in 4 separate color channels and uses an objective lens, illumination LEDs, fluorescent filter sets, and camera. The objective lens has a field of view designed to capture the image of an entire microtiter plate well. The illumination module light source consists of 2 high power LEDs per color channel. A series of fluorescent image frames are captured with a camera using a 3.1MP Sony IMX265 monochrome sensor with 12-bit per pixel quantization. The final image for each well is then formed by summing multiple frames. 16 frames were captured at a 100 msec exposure using 635/25 nm excitation and 680/40 nm emission filters. The focus particles are imaged at 470/40 nm excitation and 520/40 nm excitation filters and captured 2 frames at a 20 msec exposure.

Data analysis: For each bacterium, the number of fluorescent objects was determined (assay signal). A bacterium was considered cross-reactive if signal was detected within three standard deviations of the signal in the blank (no bacteria added).

Results.

FIG. 1 and FIG. 2 show the rapid novel FISH method only detects $E.\ coli$ and not the other 16 different challenge bacteria. FIGS. 1 and 2 each show that very high concentrations ($1\times10^6$ cells per reaction) of 8 clinically relevant challenge bacteria are not detected under the same assay conditions that generate high assay signal for the $E.\ coli$ targeted bacteria. The two bars represent two different probe sets designed to be specific for $E.\ coli$ (see Table in FIG. 20). The assay signal for each of the 16 challenge bacteria was less than the no-cell control plus three standard deviations (125).

Conclusions. The novel rapid FISH method described in this example specifically, by design, detects $E.\ coli$ but does not detect 16 clinically relevant potential cross-reactive bacteria. This demonstrates the method has high specificity for the identification of a target UTI pathogen which is of critical importance for the clinical treatment of the infection.

Variations. This example is illustrative of the performance of this novel FISH method and is not limited to the specific details included in the description. One skilled in the art will readily understand that many variations are therefore possible, including using different probe sequences and nucleic acid structures (PNA, LNA, etc.), alternative assay chemistries (different detergents, chaotropes, fluorophores, buffers, pH, temperatures, reaction times, component concentrations), concentration of urine and urine processing procedures. This methodology can also clearly be extended to other biological specimens and to other bacterial and non-bacterial pathogens. Assays have also been designed that demonstrate high specificity for $K.\ pneumoniae$, $K.\ oxytoca$, $P.\ aeruginosa$, $P.\ mirabilis$ and $E.\ faecalis$.

FIG. 19 is a table showing challenge bacteria to test the specificity of detecting $E.\ coli$ FIG. 20 is a table showing Probe sequences used in this example.

Figure 21:
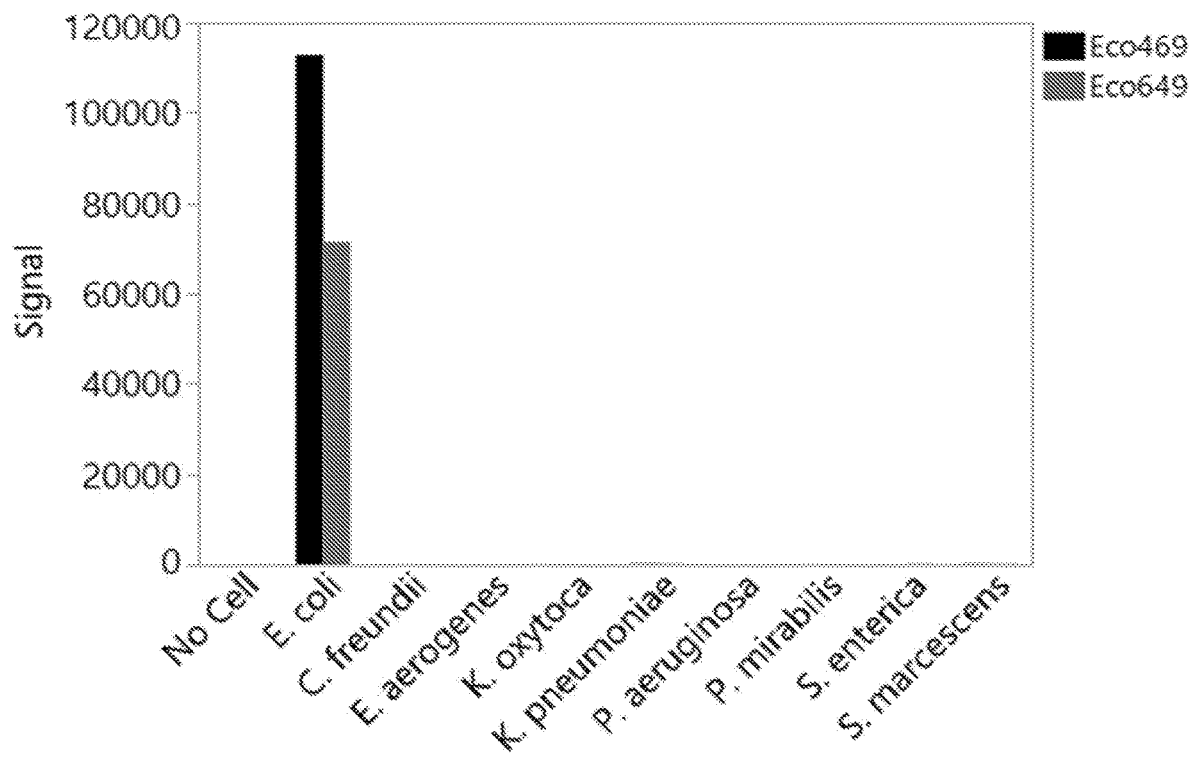
FIG. 21 shows Specific detection of *E. coli* and no detection of 8 challenge bacteria
Figure 22:
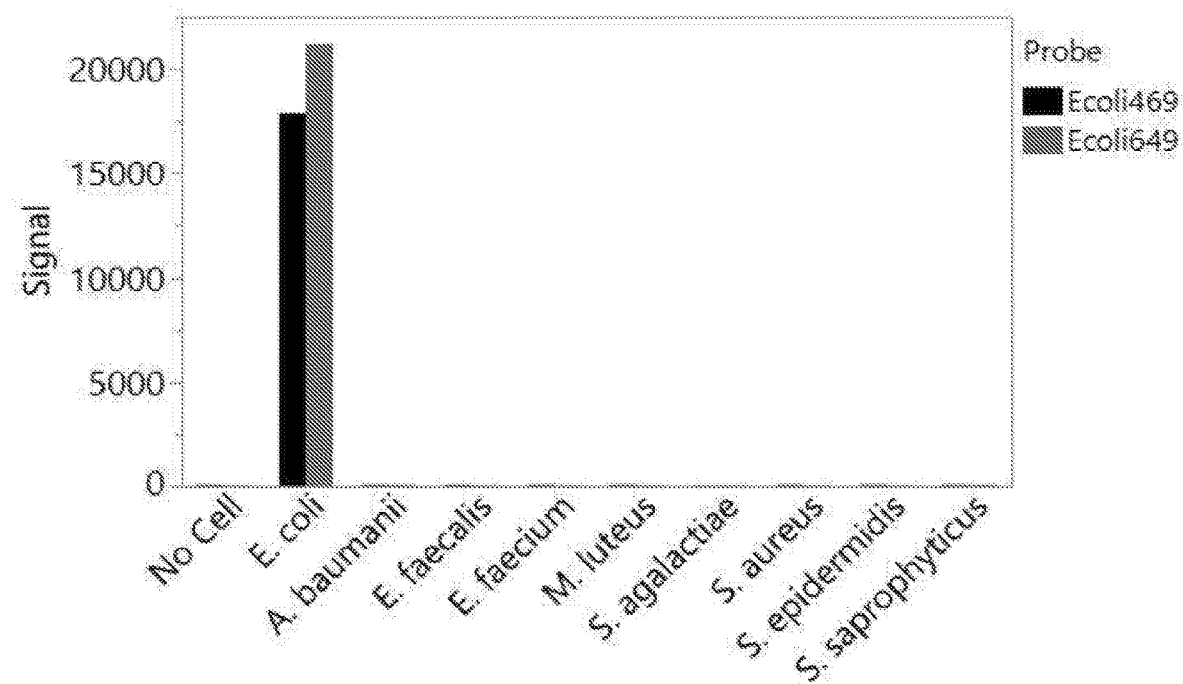
FIG. 22 shows Specific detection of *E. coli* and no detection of 8 additional challenge bacteria

FIG. 21 shows Specific detection of $E.\ coli$ and no detection of 8 challenge bacteria FIG. 22 shows Specific detection of $E.\ coli$ and no detection of 8 additional challenge bacteria Example 4. A Multiplexed FISH Method that Simultaneously Identifies 4 Distinct Microbes Overview. This example demonstrates the use of the invention to simultaneously detect, in a single reaction, $E.$ $coli$, $K.\ pneumoniae$, $P.\ aeruginosa$, and $K.\ oxytoca$ using fluorescently labeled probes specific for each bacteria's rRNA. Each pathogen was specifically detected in the mixture through the use of 4 distinct fluorophores—one for each bacterial species—that have different excitation/emission spectral properties.

Experimental Method. Bacterial cell growth: Bacterial cultures for $Escherichia\ coli$ ATCC 25922, $Klebsiella\ pneumoniae$ ATCC 13883, $Pseudomonas\ aeruginosa$ ATCC 27853, and $Klebsiella\ oxytoca$ ATCC 8724 were obtained by inoculating Trypticase Soy Broth (TSB, Hardy Diagnostics cat. U65) with 3 to 5 colonies from fresh tryptic soy agar plates (TSA, BD cat. 221185) and growing for 1.5 to 3 hours at 37° C. to achieve log-phase growth. Each culture was then diluted in cation-adjusted Mueller-Hinton Broth (MHBII, Teknova, cat. M5860) to an optical density at 600 nm of 0.15, which is approximately $1.0\times10^8$ colony-forming units (CFUs) per mL.

Preparation of Magnetic Particles: Polyaspartic acid-conjugated magnetic particles (Fluidmag-PAA, Chemicell, cat. 4108) and carboxyl-coated magnetic particles (Carboxyl Magnetic Particles, Spherotech, cat. CM-025-10H) were used to non-specifically capture bacterial cells. Each particle was diluted 1:40 into 50 mM Epps buffer, pH 8.2, with final concentrations of approximately $1.38\times10^9$ particles per reaction for the polyaspartic acid particles and $3.46\times10^9$ for the carboxyl particles.

Labeling of Bacterial Cells: 100 µL labeling reactions were prepared by combining diluted cells of all four bacteria, isothermal hybridization buffer (0.9×MHBII, 3×SSC (1.5M NaCl, 0.15M Sodium citrate, Sigma, cat. S6639), 0.77% w/v CHAPSO (Sigma cat. C3649), 0.72% w/v SB3-12 (Sigma cat. D0431), 0.13M Guanidine thiocyanate (Sigma cat. G9277), 0.18% w/v Cetrimide (Sigma cat. M7365)), species-specific DNA probes (Integrated DNA Technologies, IDT) targeted to the 16S or 23S bacterial rRNA, helper probes to facilitate effective hybridization (IDT) and 30 µL of pooled human urine (Innovative Research, cat. IRHUURE500ML). 10 µL of the magnetic particle preparation was then added to this mixture. Probe sequences and the location of their dye modifications are shown in Table in FIG. 24.

The cells/hybridization mixture (1 mL) was transferred into the cartridge. The cartridge was placed onto the analyzer (as described below) which automated the remaining assay steps and image acquisition and analysis. Briefly, the fluidic system of the analyzer moved the reaction mixture into the optical window containing 46 µL per well (previously dried) of "dye-cushion" (50 mM TRIS pH 7.5 (Sigma cat. T1075), 7.5% v/v Optiprep (Sigma cat. D1556), 50 mg/mL Direct Black 19 (Orient cat. 191L). The cartridge was incubated within the analyzer at 35° C. for 30 minutes. Following this incubation, the cartridge was moved for 4 minutes onto the magnet station (Dexter magnetic technologies, cat. 54170260) to bring magnetic particles, a fraction containing labeled cells, through the rehydrated "dye-cushion" and into proximity to the imaging surface at the bottom of the wells. After the magnet station, the cartridge was moved to the imaging station within the analyzer and a series of images taken in each of the four color channels (red (excitation 635/25 nm, emission 680/40 nm), yellow (excitation 530/20 nm, emission 572/23 nm), green (excitation 470/40 nm, emission 520/40 nm), orange (excitation 569/25 nm, emission 609/34 nm)).

Imaging of labeled cells: The MultiPath Analyzer imaging system is a custom-built instrument and software that is capable of automatically capturing image data from selected wells of a MultiPath Cartridge as part of a fully automated test. It uses a custom designed precision 3 axis positioning system to locate each well over a fluorescence-based image acquisition subsystem. The Analyzer can image in 4 separate color channels and uses an objective lens, illumination LEDs, fluorescent filter sets, and camera. The objective lens has a field of view designed to capture the image of an entire Cartridge Imaging Well. The illumination module light source consists of 2 high power LEDs per color channel. A series of fluorescent image frames are captured with a camera using a 3.1MP Sony IMX265 monochrome sensor with 12-bit per pixel quantization. The final image for each well is then formed by summing multiple frames. For the red channel, 16 frames were captured at a 100 msec exposure using 635/25 nm excitation and 680/40 nm emission filters. For the orange channel, 24 frames were captured at a 100 msec exposure using 569/25 nm excitation and 609/34 nm emission filters. For the Yellow channel, 48 frames were captured at a 100 msec exposure using 530/20 nm excitation and 572/23 nm emission filters. For the Green channel, 32 frames were captured at a 100 msec exposure using 470/40 nm excitation and 520/40 nm emission filters. The focusing plane for imaging the labeled cells was determined experimentally in this example.

Results. FIG. 1 shows a portion of the full acquired image in which the fluorescence was detected in each of the 4 color channels, each specific for one of the 4 input bacteria. Each spot corresponds to a single cell or group of cells. An algorithm is used to identify meaningful objects distinct from artifacts (e.g. debris) and counts those objects as cells. As seen in the inserts for each bacterium, a similar number of cells were detected as expected since the input cell concentrations were approximately the same. When overlaid, these spots do not correspond, indicating that different objects were observed in each channel, as expected with 4 different bacterial targets.

Conclusions. This method allows for a single rapid FISH method to simultaneous detect and quantify four different bacteria in a single well of a cartridge.

Variations:

This example is illustrative of the multiplex capability of this novel FISH method and is not limited to the specific details included in the description. One skilled in the art will readily understand that many variations are therefore possible, including using different probe sequences and nucleic acid structures (PNA, LNA, etc.) and alternative assay chemistries (different detergents, chaotropes, fluorophores, buffers, pH, temperatures, reaction times, component concentrations). This methodology can also clearly be extended to other biological specimens and to other bacterial and non-bacterial pathogens for which specific probes can be designed.

Figure 23:
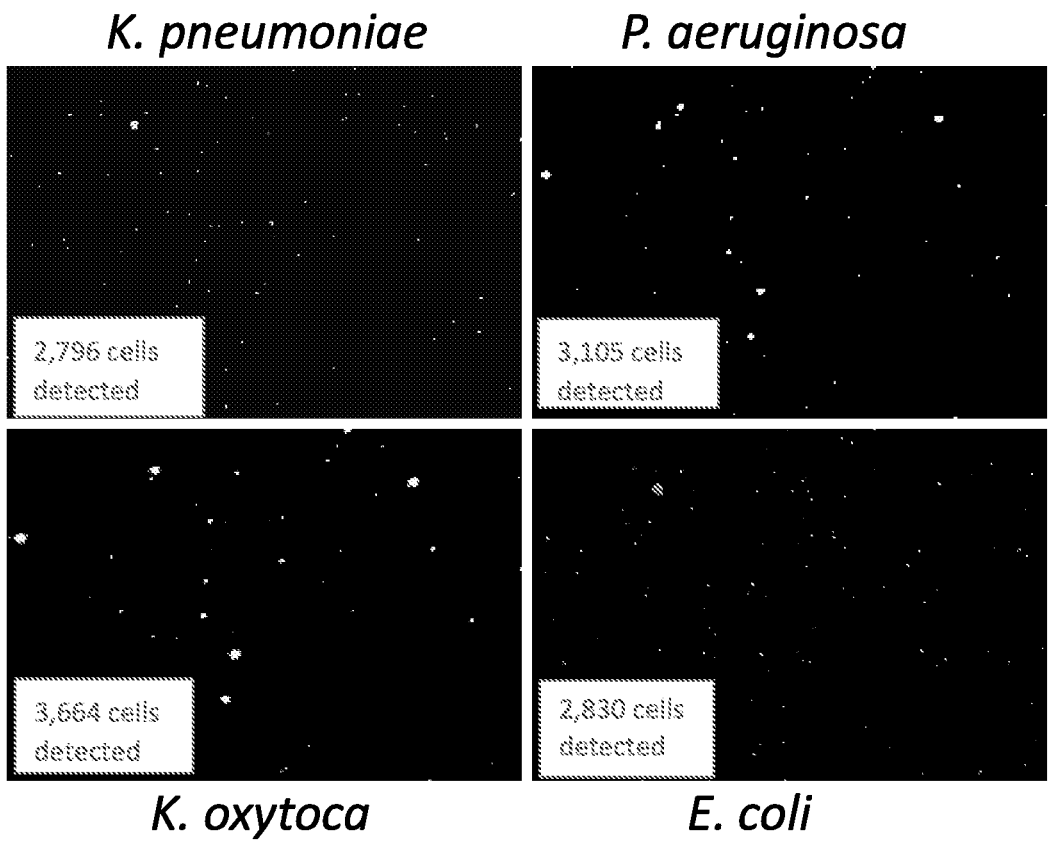
FIG. 23 is Images showing the same field of view taken in 4 different color channels using the CCD imaging method and 4 different fluorophores, one for each bacterium. All four bacteria could be detected in a single well.

FIG. 23 is Images showing the same field of view taken in 4 different color channels using the CCD imaging method and 4 different fluorophores, one for each bacterium. All four bacteria could be detected in a single well.

FIG. 24 is a table of Probe sequences used in this example 4.

Example 6. Automated Rapid AST of *E. coli* in Clinical Urine Specimens in a Cartridge on an Instrument Overview: This example demonstrates the use of the systems, devices, and methods of invention to determine the antimicrobial susceptibility of a targeted bacterial pathogen (*E. coli* in this example) in urine in 4 hours without requiring cell purification. The example using a concerted FISH method for labeling and magnetic selection and quantifies specific target cells after differential growth using non-magnified digital imaging. This new method has comparable performance to the gold standard CLSI broth microdilution (BMD) method.

Experimental Methods:

Urine Specimens: 48 remnant de-identified urine specimens collected from patients with a urinary tract infection (UTI) and known to contain *E. coli* were received from Dr. Kirby's lab at Beth Israel Hospital (Boston, MA). Samples were received 1-5 days post collection and contained a urine preservative to limit loss of cell viability. For each sample, color of urine, pH, and presence of particulates were noted. Upon receipt, conventional urine culture was performed to determine the approximate CFU/mL of bacteria present, and to confirm single or mixed bacterial morphology as reported by Dr. Kirby's lab. Briefly, a calibrated 1 µL loop was placed into a well-mixed urine sample and the 1 µL was evenly spread over a Tryptic soy agar (TSA, BD cat. 221185) plate and incubated in a 35° C. incubator for 18-24 hours. The remainder of the urine samples were processed and assayed as described below.

Urine Processing: Prior to testing, urine preservative and other potentially interfering compounds were removed using size exclusion chromatography. 2.5 mL of each clinically positive urine sample was applied to a pre-washed Zeba™ 7K MWCO spin column (ThermoFisher, cat. #89893) and centrifuged according to the manufacturer's instructions. Urine culture was repeated on this processed sample as described above, to examine bacterial loss following processing.

Preparation of Magnetic Particles: Polyaspartic acid-conjugated magnetic particles used to non-specifically capture bacterial cells (Fluidmag-PAA, Chemicell, cat. 4108) were diluted 1:20 into 50 mM EPPS buffer, pH 8.2 to $2.75 \times 10^{12}$ particles/mL. Fluorescent magnetic microspheres containing a green dye (Dragon Green Fluorescent Microspheres, BANGS Laboratories, cat MEDG001) were added to the suspension at a final concentration of $3 \times 10^6$ particles/mL. These particles enable the optical system to focus on the correct plane. The magnetic particle mixture was sonicated for 1 minute immediately prior to use to minimize aggregation. Separate magnetic particle suspensions were prepared for the time zero and time four-hour assays described below.

Bacterial Cell Labeling at AST Time Zero: Assay signal at time zero (T0) prior to the initiation of bacterial growth in the presence or absence of antibiotics was determined for each clinical urine specimen. 30 µL of each processed urine was added to 70 µL of 1X cation-adjusted Mueller-Hinton Broth (MHBII) containing species-specific Alexa647N-labeled DNA oligonucleotide FISH probes and unlabeled DNA helper probes. Probe sequences used are shown in Table A. The 100 µL mixture was then added to a well of a microtiter plate containing dehydrated hybridization buffer (3×SSC (0.45 M NaCl, 0.045 M Na citrate) buffer (Sigma, cat. # S6639), 0.18% cetrimide (Sigma, cat. # H9151), 0.77% CHAPSO (Sigma cat. # C3649), 0.72% SB3-12 (Sigma cat. # D0431) 0.13M guanidine thiocyanate (Sigma, cat. # G9277)). 10 µL of the prepared magnetic particle mixture was then added to the well. 100 µL of this reaction mixture was transferred to a microtiter plate containing 50 µL per well (previously dried) of "dye-cushion" (50 mM TRIS pH 7.5 (Sigma cat. T1075), 7.5% v/v Optiprep (Sigma cat. D1556), 50 mg/mL Direct Black 19 (Orient cat. 191L) and incubated at 35° C. for 30 minutes. After incubation, microtiter plates were placed onto a magnetic field (Dexter magnetic technologies, cat. 54170260) for 4 minutes to bring magnetic particles, a fraction containing labeled cells, through the "dye-cushion" and into proximity to the imaging surface at the bottom of the wells.

Imaging of labeled cells: The MultiPath™ laboratory imaging system is a custom-built instrument and software that is capable of automatically capturing image data from selected wells of a microtiter plate. It uses a high precision linear stage from Prior Scientific (Rockland, MA) to position each well over a fluorescence-based image acquisition subsystem. The instrument can image in 4 separate color channels and uses an objective lens, illumination LEDs, fluorescent filter sets, and camera. The objective lens has a field of view designed to capture the image of an entire microtiter plate well. The illumination module light source consists of 2 high power LEDs per color channel. A series of fluorescent image frames are captured with a camera using a 3.1MP Sony IMX265 monochrome sensor with 12-bit per pixel quantization. The final image for each well is then formed by summing multiple frames. 16 frames were captured at a 100 msec exposure using 635/25 nm excitation and 667/30 nm emission filters. The focus particles are imaged at 470/40 nm excitation and 520/40 nm excitation filters and captured 2 frames at a 20 msec exposure.

Preparation of Antibiotic Plates: Microtiter plates containing six concentrations of each antibiotic in a 2-fold serial dilution series were prepared, starting at a 10-fold higher concentration than the expected minimum inhibitory concentration (MIC). Antibiotics used were Cefazolin, Ciprofloxacin, Nitrofurantoin, and Trimethoprim-Sulfamethoxazole. Antibiotic dilutions were verified to be within the appropriate tolerance by confirming that the MIC for at least two CLSI QC strains fell within the QC range reported in CLSI document M100Ed29E-2019. The concentrations selected for testing of each antibiotic straddled the CLSI-reported breakpoints for the antibiotic for $E. coli$. In addition to the wells containing the antimicrobial dilution series, eight wells containing water or diluent were included in the plates to allow for a no antibiotic positive and negative growth control.

Four Hour Growth: While the time zero cell quantification was occurring, 32.4 µL of processed clinical urine and 75.6 µL of 1.43×MHB II (Teknova, cat. # M5860) was added to each well of the antibiotic plate (already containing 124, of antibiotics). The samples were allowed to grow in a standard incubator at 35° C. for 4 hours.

Bacterial Cell Labeling at AST time four-hour growth: After samples had incubated in the presence and absence of antibiotics for four hours (T4), cells were labeled and quantified to determine how much growth, if any, occurred. 100 µL of each well of the incubated sample-antibiotic plate was transferred to a corresponding well of a dehydrated buffer plate and combined with FISH probes, helper probes, magnetic particles, and focus particles in the same manner as described above for assay time zero.

Comparison Method: Results for the MulitPath™ Assay were compared to broth microdilutions (BMD) performed according to the CLSI method M07-Ed13E 2018.

Data Analysis and Threshold Generation: Using the image captured by the CCD camera, detected cells were estimated by an algorithm that looked at both number of objects in the field of view and the intensity of the objects. Number of cells based on this detection algorithm were generated at time zero, and at time four hours without antibiotic and with all 6 concentrations of each antibiotic. For each urine sample/drug concentration, fold growth was calculated as the signal in the well containing antibiotic after growth (time four) to the signal in the urine sample prior to growth (time zero). Using fold growth and the observation of growth in the corresponding well in the CLSI-compliant broth microdilution, a logistic regression model was used to generate thresholds for determining the fold growth cutoff above which cells are growing in the presence of the antibiotic (and thus, resistant at that concentration) and below which, cells are in the process of dying (and thus, sensitive at that concentration). The point where the fold growth number falls below the determined threshold is the MIC value generated by the assay. Results were correspondingly assigned to categories of susceptible, intermediate, or resistant to each antibiotic. All data was then compared to CLSI standard BMD. Four-hour growth in the absence of antibiotic is a control condition to ensure viable bacterial are present in the processed urine sample.

Results.

FIG. 25 through FIG. 28 shows three examples from our larger data set that demonstrate how this method can be used to generate MICs on three individual urines that match the gold-standard broth microdilution method. FIG. 1 shows the fold growth numbers at different antibiotic concentrations results for a single clinical urine sample (BIUR0017) against a single drug (Nitrofurantoin). The MIC for the broth microdilution matches exactly with the MIC determined by the fold-growth threshold. FIG. 2 shows the fold growth numbers at different antibiotic concentrations results for a single clinical urine sample (BIUR0047) against a single drug (Cefazolin). The MIC for the broth microdilution matches exactly with the MIC determined by the fold-growth threshold. FIG. 3 shows the fold growth numbers at different antibiotic concentrations results for a single clinical urine sample (BIUR0057) against a single drug (Ciprofloxacin). The MIC for the broth microdilution matches exactly with the MIC determined by the fold-growth threshold. FIG. 4 shows the fold growth numbers at different antibiotic concentrations results for a single clinical urine sample (BIUR0052) against a single drug (Trimethoprim/Sulfmethoxazole). The MIC for the broth microdilution matches exactly with the MIC determined by the fold-growth threshold.

Conclusions. This novel method shows that accurate AST results (MIC determinations) may be made with only 4 hours of differential growth of minimally processed urine clinical specimens, notably without lengthy colony purification steps. The AST results, whether reported as MIC categorical antibiotic susceptibility results, compare favorably to the gold standard, broth microdilution method.

Variations. This example is illustrative of the performance of this novel AST method and is not limited to the specific details included in the description. One skilled in the art will readily understand that many variations are therefore possible, including using different probe sequences and nucleic acid structures (PNA, LNA, etc.), alternative assay chemistries (different detergents, chaotropes, fluorophores, buffers, pH, temperatures, reaction times, component concentrations, etc.), concentration of urine and urine processing procedures. This methodology can also clearly be extended to other antibiotics, biological specimens and to other bacterial and non-bacterial pathogens.

Figure 25:
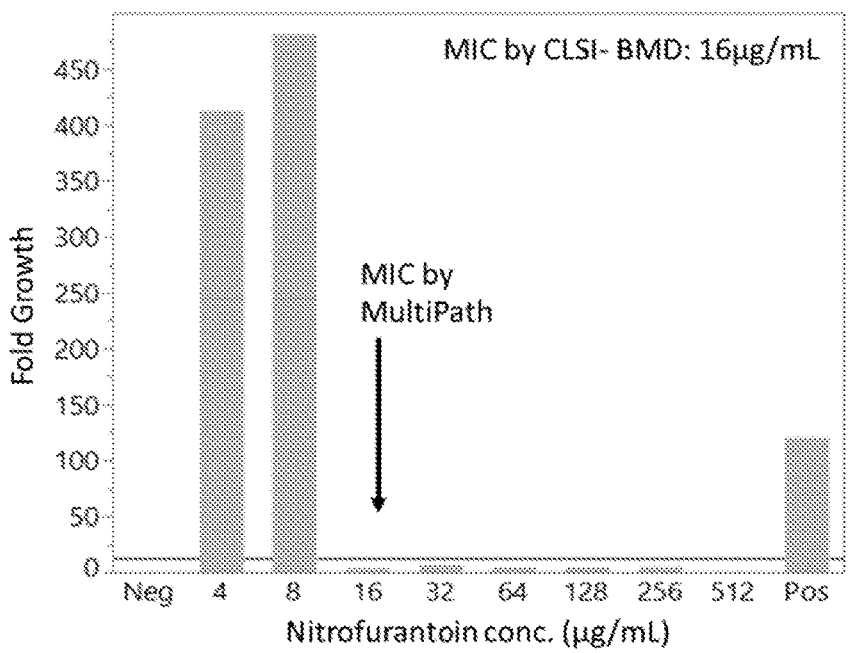
FIG. 25 shows BIUR0017 with Nitrofurantoin

FIG. 25 shows BIUR0017 with Nitrofurantoin

Figure 26:
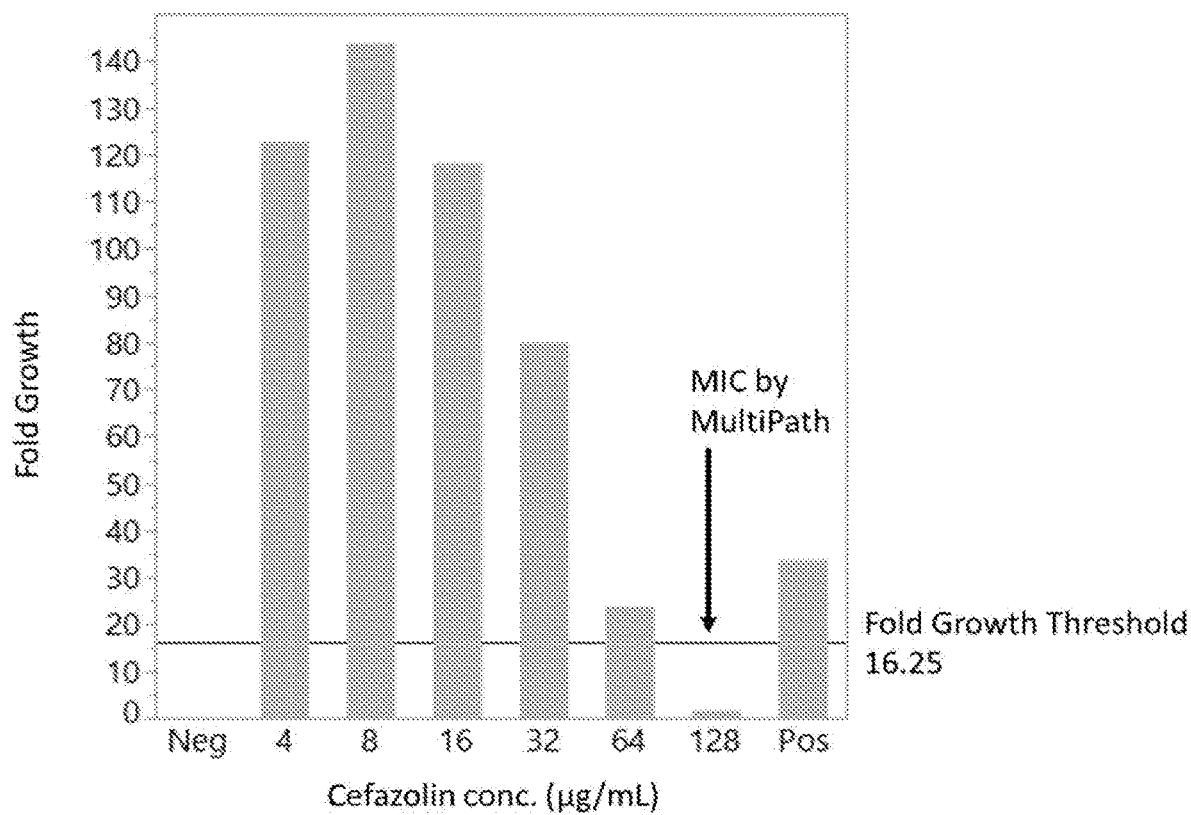
FIG. 26 shows BIUR047 with Cefazolin

FIG. 26 shows BIUR047 with Cefazolin

Figure 27:
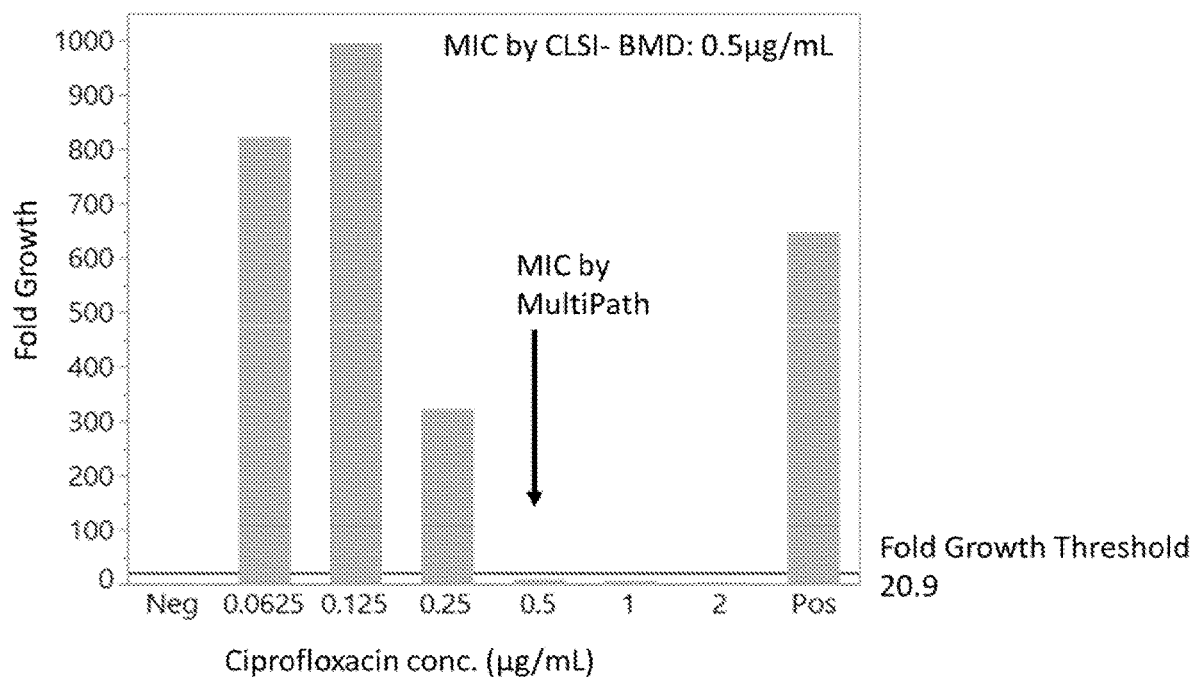
FIG. 27 shows BIUR057 with Ciprofloxacin

FIG. 27 shows BIUR057 with Ciprofloxacin

Figure 28:
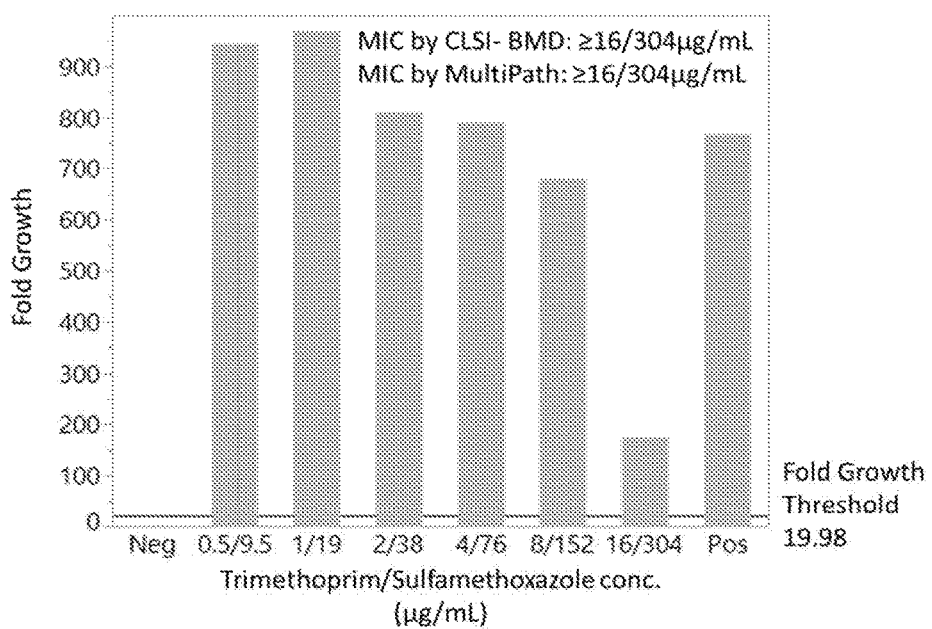
FIG. 28 shows BIUR052 with Trimethoprim/Sulfamethoxazole

FIG. 28 shows BIUR052 with Trimethoprim/Sulfamethoxazole

FIG. 29 is a table of Probe sequences used in this example 6.

Example 7. Rapid and Accurate Antimicrobial Susceptibility Testing for Bacteria in Urine Samples Overview. This example demonstrates the use of the invention to accurately determine the antimicrobial susceptibility of pathogens with known antibiotic susceptibility profiles added into bacteria-free urine. Differential growth in microbiological media containing antimicrobial agents followed by assessment of growth using the inventive concerted FISH method for target specific cell quantification required just 4.5 hours. This new method has comparable performance to the gold standard CLSI broth microdilution (BMD) method.

Experimental Methods.

Bacterial cell preparation: 50 bacterial strains with known resistance profiles were collected from either the ATCC or from the CDC antibiotic resistance bank (AR bank) and are shown in Table A. Bacterial cultures for each of these were obtained by inoculating Trypticase Soy Broth (TSB, Hardy Diagnostics cat. U65) with 3 to 5 colonies from fresh tryptic soy agar plates (TSA, BD cat. 221185) and growing for 1.5 to 3 hours at 35° C. to achieve log-phase growth. Using optical density at 600 nm to estimate cell concentration, each culture was diluted to approximately $5 \times 10^6$ colony-forming units (CFU)/mL in cation-adjusted Mueller Hinton II (MHBII, Teknova cat. M5860).

Urine Processing: Prior to testing, pooled human urine (Innovative Research, cat. IRHUURE500ML) was applied to a pre-washed Zeba™ 7K MWCO spin column in a ratio of 4 mL urine to one pre-washed 10 mL spin column (ThermoFisher, cat. #89893) and centrifuged according to the manufacturer's instructions.

Preparation of Magnetic Particles: Polyaspartic acid-conjugated magnetic particles used to non-specifically capture bacterial cells (Fluidmag-PAA, Chemicell, cat. 4108) were diluted 1:20 into 50 mM EPPS buffer, pH 8.2 to $2.75 \times 10^{12}$ particles/mL. Fluorescent magnetic microspheres containing a green dye (Dragon Green Fluorescent Microspheres, BANGS Laboratories, cat MEDG001) were added to the suspension at a final concentration of $3 \times 10^6$ particles/mL. These particles enable the optical system to focus on the correct plane. The magnetic particle mixture was sonicated for 1 minute immediately prior to use to minimize aggregation. Separate magnetic particle suspensions were prepared for the time zero and time four-hour assays described below.

Bacterial Cell Labeling at AST Time Zero: Assay signal at time zero (T0) prior to the initiation of bacterial growth in the presence or absence of antibiotics was determined for each bacterium. A reaction mixture was prepared consisting of 30 µL processed urine, 10 µL of the $5 \times 10^6$ CFU/mL bacterial dilution, 60 µL MHBII (1× final concentration in 100 µL) and the appropriate species-specific Alexa647N-labeled DNA oligonucleotide FISH probe and its associated unlabeled DNA helper probes for the target bacterial species. Probe sequences used are shown in Table in FIG. 33. The 100 µL mixture was then added to a well of a microtiter plate containing dehydrated hybridization buffer (3×SSC (0.45 M NaCl, 0.045 M Na citrate) buffer (Sigma, cat. # S6639), 0.18% cetrimide (Sigma, cat. # H9151), 0.77% CHAPSO (Sigma cat. # C3649), 0.72% SB3-12 (Sigma cat. # D0431), 0.13M guanidine thiocyanate (Sigma, cat. # G9277)). 10 µL of the prepared magnetic particle mixture was then added to the well. 100 µL of this reaction mixture was transferred to a microtiter plate containing 504, per well (previously dried) of "dye-cushion" (50 mM TRIS pH 7.5 (Sigma cat. T1075), 7.5% v/v Optiprep (Sigma cat. D1556), 50 mg/mL Direct Black 19 (Orient cat. 191L) and incubated at 35° C. for 30 minutes. After incubation, microtiter plates were placed onto a magnetic field (Dexter magnetic technologies, cat. 54170260) for 4 minutes to bring magnetic particles, a fraction containing labeled cells, through the "dye cushion" and into proximity to the imaging surface at the bottom of the wells.

Imaging of labeled cells: The MultiPath laboratory imaging system is a custom-built instrument and software that is capable of automatically capturing image data from selected wells of a microtiter plate. It uses a high precision linear stage from Prior Scientific (Rockland, MA) to position each well over a fluorescence-based image acquisition subsystem. The instrument can image in 4 separate color channels and uses an objective lens, illumination LEDs, fluorescent filter sets, and camera. The objective lens has a field of view designed to capture the image of an entire microtiter plate well. The illumination module light source consists of 2 high power LEDs per color channel. A series of fluorescent image frames are captured with a camera using a 3.1MP Sony IMX265 monochrome sensor with 12-bit per pixel quantization. The final image for each well is then formed by summing multiple frames. 16 frames were captured at a 100 msec exposure using 635/25 nm excitation and 667/30 nm emission filters. The focus particles are imaged at 470/40 nm excitation and 520/40 nm excitation filters and captured 2 frames at a 20 msec exposure.

Preparation of Antibiotic Plates: Microtiter plates containing six concentrations of each antibiotic in a 2-fold serial dilution series were prepared. The 2-fold dilution series was prepared at a 10-fold higher concentration than the desired concentration in the final broth microdilution, such that addition cells/urine/media mixture would yield the correct antibiotic range. 12 uL of each antibiotic dilution was then aliquoted into the appropriate wells of a 96 well plate. Different antibiotics were tested for different bacteria. Antibiotic dilutions were verified to be within the appropriate tolerance by confirming that the MIC for at least two CLSI QC strains fell within the QC range reported in CLSI document M100Ed29E-2019. The concentrations selected for testing of each antibiotic straddled the CLSI-reported breakpoints for the antibiotic for the appropriate bacterial species such that categorical determinations (sensitive/intermediate/resistant) could be made from this data. In addition to the wells containing the antimicrobial dilution series, several wells containing water or other diluent were included for a no antibiotic positive growth and negative growth (no cell) control. Antibiotic plates were frozen at −80° C. and thawed completely before use.

Four Hour Growth: While the time zero cell quantification was occurring, 12 µL of prepared bacterial culture, 36 uL pooled human urine processed as done for the assay time zero, 60 uL of 2×MHB II (Teknova, cat. # M5860) and 2 uL water was added to each well of the prepared antibiotic plate. The samples were allowed to grow in a standard incubator at 35° C. for 4 hours.

Bacterial Cell Labeling at AST time four-hour growth: After samples had incubated in the presence and absence of antibiotics for four hours (T4), cells were labeled and quantified to determine how much growth, if any, occurred. 100 µL of each well of the incubated sample-antibiotic plate was transferred to a corresponding well of a dehydrated buffer plate and combined with FISH probes, helper probes, magnetic particles, and focus particles in the same manner as described above for assay time zero.

Comparison Method: Results for the MulitPath™ Assay were compared to broth microdilutions (BMD) performed according to the CLSI method M07-Ed13E 2018.

Data Analysis and Threshold Generation: Using the image captured by the CCD camera, detected cells were estimated by an algorithm that looked at both number of objects in the field of view and the intensity of the objects. Number of cells based on this detection algorithm were generated at time zero, and at time four hours without antibiotic and with all concentrations of each antibiotic. For each bacteria sample/drug concentration, fold growth was calculated as the signal in the well containing antibiotic after growth (time four) to the signal in the urine sample prior to growth (time zero). Using fold growth and the observation of growth in the corresponding well in the CLSI-compliant broth microdilution, a logistic regression model was used to generate thresholds for determining the fold growth cutoff above which cells are growing in the presence of the antibiotic (and thus, resistant at that concentration) and below which, cells are in the process of dying (and thus, sensitive at that concentration). The point where the fold growth number falls below the determined threshold is the MIC value generated by the assay. Results were correspondingly assigned to categories of susceptible, intermediate, or resistant to each antibiotic. Results were then compared to the MIC values and categorical calls reported by ATCC or the CDC. Four-hour growth in the absence of antibiotic is a control condition to ensure viable bacterium were added to each sample or for use when calculating fold inhibition.

In addition, for the bacteria tested against Ceftazidime (CAZ), the presence of exclusively filamentous bacteria (as can be easily distinguished by eye, FIG. 1, compare left (normal bacteria) to right (filamentous bacteria)) was taken as an indication of impending cell death in that antibiotic concentration and the MIC concentration was adjusted accordingly where appropriate. In the case of bacteria tested for Trimethoprim/Sulfamethoxazole (TMP/SXT), thresholds were generated based on fold inhibition (assay signal in the well containing bacteria but no antibiotic divided by the well containing both antibiotic and bacteria).

TABLE A

Bacteria used in this example and their previously determined antibiotic resistance (shown with "X"; "IR" = Intrinsically resistant)

| Organism | Number | Ceftazidime | Ciprofloxacin | Meropenem | Trimethoprim/Sulfamethoxazole | Nitrofurantoin |
|---|---|---|---|---|---|---|
| E. coli | CDC0001 | | | X | | |
| E. coli | CDC0006 | | | X | | |
| K. pneumoniae | CDC0010 | X | | X | X | |
| K. pneumoniae | CDC0016 | X | X | X | X | |
| E. coli | CDC0017 | | X | | X | |
| E. coli | CDC0019 | | X | | X | |
| E. coli | CDC0020 | X | | X | | |
| K. oxytoca | CDC0028 | X | X | X | X | |
| P. mirabilis | CDC0029 | X | X | X | X | IR |
| K. pneumoniae | CDC0034 | | X | X | | |
| K. pneumoniae | CDC0041 | X | | | | |
| K. pneumoniae | CDC0043 | | | X | | |
| P. mirabilis | CDC0059 | X | X | X | X | IR |
| E. coli | CDC0067 | X | | | | |
| K. oxytoca | CDC0071 | X | X | X | X | |
| K. pneumoniae | CDC0076 | | X | X | | |
| K. pneumoniae | CDC0080 | | | X | | |
| E. coli | CDC0084 | X | | | X | |
| E. coli | CDC0085 | | | X | | |
| E. coli | CDC0086 | X | | | | |
| P. aeruginosa | CDC0105 | X | | X | IR | IR |
| K. pneumoniae | CDC0107 | X | | | X | |
| P. aeruginosa | CDC0111 | X | | X | IR | IR |
| E. coli | CDC0114 | | | X | | |
| K. pneumoniae | CDC0117 | | X | | X | |
| K. pneumoniae | CDC0126 | X | X | | X | |
| K. oxytoca | CDC0147 | X | X | X | X | |
| P. mirabilis | CDC0155 | X | X | X | X | IR |
| P. mirabilis | CDC0156 | X | X | X | X | IR |
| P. mirabilis | CDC0159 | X | X | X | X | IR |
| K. pneumoniae | CDC0160 | X | | | | |
| P. aeruginosa | CDC0232 | | | X | IR | IR |
| P. aeruginosa | CDC0242 | X | | X | IR | IR |
| P. aeruginosa | CDC0247 | | | X | IR | IR |
| P. aeruginosa | CDC0251 | X | X | | IR | IR |
| P. aeruginosa | CDC0253 | X | X | | IR | IR |
| P. aeruginosa | CDC0259 | | X | | IR | IR |
| P. aeruginosa | CDC0261 | | X | | IR | IR |
| P. aeruginosa | CDC0262 | | X | | IR | IR |
| E. coli | CDC0350 | X | | | | |
| P. mirabilis | ATCC 7002 | X | X | X | X | IR |
| K. pneumoniae | ATCC 13883 | X | X | X | X | |
| E. coli | ATCC 25922 | X | X | X | X | X |
| P. aeruginosa | ATCC 27853 | X | X | | IR | X |
| K. pneumoniae | BAA-1904 | | | | | X |
| E. coli | BAA-2340 | | | | | X |
| E. coli | BAA-2452 | | X | | | X |
| E. coli | BAA-2469 | | X | | X | X |

TABLE A-continued

Bacteria used in this example and their previously determined antibiotic resistance (shown with "X"; "IR" = Intrinsically resistant)

| Organism | Number | Ceftazidime | Ciprofloxacin | Meropenem | Trimethoprim/ Sulfamethoxazole | Nitrofurantoin |
|---|---|---|---|---|---|---|
| E. coli | BAA-2471 | | X | | X | X |
| K. pneumoniae | BAA-2472 | | | | | X |

Results. FIG. 2 shows how this method can be used to generate MICs on individual bacteria in the presence of urine matrix that match the CDC or CLSI-published MIC. The example shows the fold growth numbers at different antibiotic concentrations for a single bacterium, (*K. pneumoniae* CDC0126) against a single drug (Ciprofloxacin). The published MIC (≥0.25 µg/mL) matches exactly with the MIC determined by the novel rapid AST method described in this invention. The threshold for fold-growth (20 in this example) is shown by the horizontal grey line.

The table in FIG. 32 shows the overall performance across all strains tested. A tested MIC is within essential agreement if the MIC determined by the novel AST method matches exactly or is within one 2-fold dilution of the published value. Except for two cases, all bacteria/antibiotic combinations had 100% essential agreement.

Conclusions. This novel method shows that MIC determinations that match the published values for highly characterized strains of bacteria with multiple drug resistance mechanism may be made with only 4 hours of growth in the context of sample matrix.

Variations. This example is illustrative of the performance of this novel AST method and is not limited to the specific details included in the description. One skilled in the art will readily understand that many variations are therefore possible, including using different probe sequences and nucleic acid structures (PNA, LNA, etc.), alternative assay chemistries (different detergents, chaotropes, fluorophores, buffers, pH, temperatures, reaction times, component concentrations, etc.), concentration of urine and urine processing procedures. This methodology can also clearly be extended to other antibiotics, biological specimens and to other bacteria for which specific probes can be designed.

Figure 30:
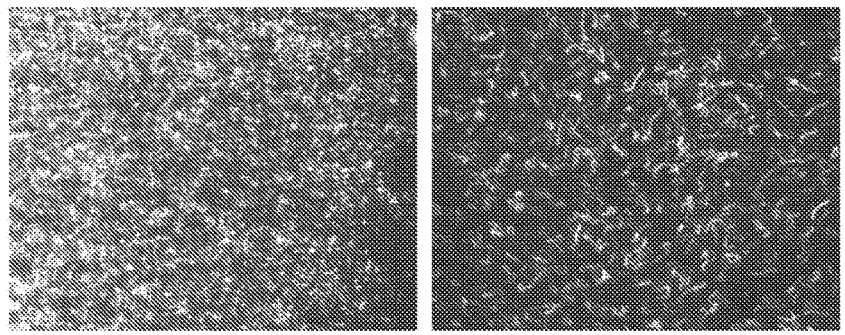
FIG. 30 is a Visual comparison of normal bacteria to filamentous bacteria.

FIG. 30 is a Visual comparison of normal bacteria (left panel) to filamentous bacteria (right panel).

Figure 31:
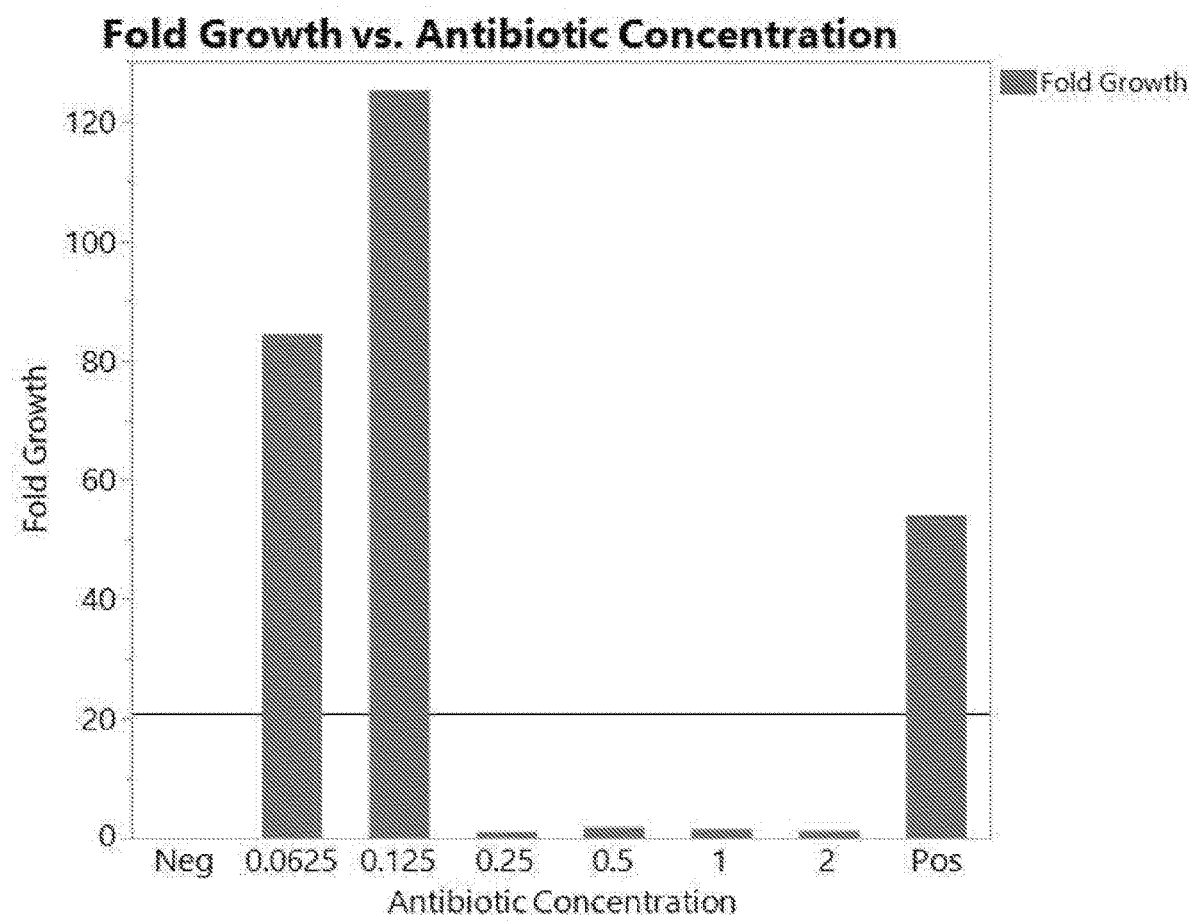
FIG. 31 shows MIC generated by novel rapid AST method described in this invention is called at 0.25 μg/mL

FIG. 31 shows MIC generated by novel rapid AST method described in this invention is called at 0.25 µg/mL FIG. 32 is a table of AST results for all bacteria and antibiotics tested in this example.

FIG. 33 is a table of Probe sequences used in this example 7.

Example 8. Rapid and Accurate Automatic AST Results for Clinical Urine Specimens without Using Cell Purification Overview. This example demonstrates the use of the systems and methods of the invention to automatically determine AST results for a pathogen in a clinical urine sample in 4 hours without requiring lengthy cell purification steps. The automated instrument performs the steps required in the reagent-containing cartridge to determine antimicrobial susceptibility at a constant physiological temperature. The temperature is compatible with both microbial growth and the inventive method for detecting and quantifying target cells. The latter method is performed on the inventive system using FISH-based labeling, magnetic selection, and non-magnified digital imaging.

The instrument's pneumatics subsystem is used to automatically distribute the specimen in the cartridge into portions or aliquots containing various antimicrobial agents in various concentrations plus microbiological medium. One of the portions is used to quantify the pathogen cells before growth incubation. The system incubates the cartridge for 4 hours and then quantifies the number of target cells in the wells containing antimicrobial agents. Comparison of the number of cells in the incubated portions containing antimicrobial agents to the number of cells measured before incubation is used to determine the antimicrobial susceptibility of the pathogen in the various antibiotics.

The example shows the results using the inventive automated systems, devices, and methods for rapid and automated antimicrobial susceptibility testing directly in clinical specimens from hospital patients that had *E. coli* in their urine. The invention delivered in just 4 hours accurate performance compared to the gold standard CLSI broth microdilution (BMD) method.

Experimental methods.

Urine Specimens: Remnant de-identified urine specimens collected from patients with a urinary tract infection (UTI) and known to contain *E. coli* were received from Dr. Kirby's lab at Beth Israel Hospital (Boston, MA). Samples were received 1-5 days post collection and contained a urine preservative to limit loss of cell viability. For each sample, color of urine, pH, and presence of particulates were noted. Upon receipt, conventional urine culture was performed to determine the approximate CFU/mL of bacteria present, and to confirm single or mixed bacterial morphology as reported by Dr. Kirby's lab. Briefly, a calibrated 1 µL loop was placed into a well-mixed urine sample and the 1 µL was evenly spread over a Tryptic soy agar (TSA) plate and incubated in a 35° C. incubator for 18-24 hours. The remainder of the urine samples were processed and assayed as described below.

Preparation of the AST cartridge—Media and Antimicrobials Days prior the cartridge was prepared by distributing 25 uL of 4×MHB II (Teknova, Cat. #101320-356) into each of the 8 individual growth wells (see FIG. 1 for a diagram of the cartridge) Growth wells 1 and 2 are for the time zero measurement (see description below), so only growth media is contained in the growth wells. Growth wells 3 and 4 also only contained media. These wells serve as a positive control to make sure growth is observed over four hours. Into growth wells 5 and 6, and 7 and 8, 2 concentrations antibiotic was added. To do this 4.54 µL of a 22.2-fold more concentrated antibiotic than the target concentration in micrograms per mL was deposited into appropriate growth wells. Cartridges either contained 2 concentrations of both Ciprofloxacin (CIP) and Nitrofurantoin (NIT) or Cefazolin (CFZ) and Trimethoprim/Sulfamethoxazole (TMP/SXT). For final concentrations of each antibiotic in the cartridge, see Table 1. The media and antibiotics were then dried for 16-20 hours in a 40° C. convection oven.

Preparation of the AST Cartridge—Hybridization Reagents.

Hybridization buffer containing 3×SSC (0.45 M NaCl, 0.045 M sodium citrate, pH 7.5) (Sigma, cat. # S6639), 0.18% w/v cetrimide, 0.77% CHAPSO (Sigma cat. # C3649), 0.72% SB3-12 (Sigma cat. # D0431), and 0.13M guanidine thiocyanate (Sigma, cat. # G9277) was prepared. Trehalose (Sigma, cat. # T9449) was dissolved in this mixture to a final concentration of 10% w/v. This hybridization buffer-trehalose mixture was lyophilized in 8.3 µL volume beads. Two 8.3 uL beads were placed into each of 8 reagent wells (see FIG. 1, for location on cartridges)

Preparation of the AST Cartridge—Magnetic Particles

Poly-aspartic acid-conjugated magnetic particles (Fluidmag-PAA, Chemicell, cat. 4108) were diluted 1:20 into 50 mM Epps buffer, pH 8.2 to a concentration of $2.75 \times 10^{14}$ particles/mL with a final concentration of 10% w/v Trehalose (Sigma, cat. # T9449). To this dilution, fluorescent magnetic microspheres containing a green dye (Dragon Green Fluorescent Microspheres, BANGS Laboratories, cat MEDG001) were added were added to the suspension at a final concentration of $3 \times 10^6$ particles/mL. The magnetic particle mixture was sonicated for 1 minute prior to immediately use to minimize aggregation. The mixture was then lyophilized in 10 µL volume beads ($2.64 \times 10^{12}$ particles per reaction). One magnetic particle lyophilized bead was placed in each of the 8 reagent wells along with the 2 hybridization mix beads.

Procedure for Placing Samples into the Cartridge—Urine Processing

Prior to testing, urine preservative and other potentially interfering compounds were removed using size exclusion chromatography. 2.5 mL of each clinically positive urine sample was applied to a pre-washed Zeba™ 7K MWCO spin column (ThermoFisher, cat. #89893) and centrifuged according to the manufacturer's instructions. Urine culture was repeated on this processed sample as described above, to examine bacterial loss following processing.

Procedure for Placing Samples into the Cartridge—Putting Samples on Cartridges

750 µL of each processed urine sample was combine with 1705 µL of water and 45 µL of species-specific DNA oligonucleotide fluorescence in situ hybridization (FISH) probes and unlabeled DNA helper probes to make solution containing 30% urine v/v final concentration. Oligonucleotides used for each bacterium, their concentrations and dye labels can be found in Table 2. 1 mL of the mixture was added to the sample pot of the cartridge and the cartridge placed onto the analyzer.

Running the AST Cartridges on an Automated Analyzer

After the cartridge was then placed on the instrument, all subsequent actions other than data analysis were automatically performed. The Urine/water/FISH probe mixture (sample) was first directed under vacuum into the 8 growth wells at the top of the cartridge. Sample in the first two growth wells was then immediately relocated to reaction wells, rehydrating the hybridization buffer/FISH probe mix and lyophilized magnetic particles. Sample then continued to the imaging windows containing 46 µL of dehydrated "dye-cushion" (50 mM TRIS pH 7.5 (Teknova, cat. T5075), 7.5% v/v Optiprep (Sigma, cat. D1556), 5 mg/mL Direct Black-19 (Orient, cat. #3222), dried for 60° C. for 3 hours in a convection oven) and incubated at 35° C. for 30 minutes on the analyzer. After this incubation, the cartridges were then relocated to the magnet station, and placed atop a strong permanent magnet (Dexter magnetic technologies, cat. 54170260) for 4 minutes to bring the labeled and magnetic-particle-interacting bacterial cells into close proximity to the imaging surface. Finally, the cartridge was moved to the imaging station and imaging taken using non-magnified CCD imager described below.

Sample in the remaining six growth wells were held in that location, and the bacteria allowed to grow for 4 hours at 35° C. in the rehydrated media, either in the presence or absence of antibiotics. Following growth, the cell suspensions were relocated to the reagent wells as was done for the time zero assay, and the exact same hybridization reaction, magnetic pull-down, and imaging was performed as described above.

The Analyzer Imaging System and Imaging Process

The MultiPath Analyzer imaging system is a custom-built instrument and software that is capable of automatically capturing image data from selected wells of a MultiPath Cartridge as part of a fully automated test. It uses a custom designed precision 3 axis positioning system to locate each well over a fluorescence-based image acquisition subsystem. The Analyzer can image in 4 separate color channels and uses an objective lens, illumination LEDs, fluorescent filter sets, and camera. The objective lens has a field of view designed to capture the image of an entire Cartridge Imaging Well. The illumination module light source consists of 2 high power LEDs per color channel. A series of fluorescent image frames are captured with a camera using a 3.1MP Sony IMX265 monochrome sensor with 12-bit per pixel quantization. The final image for each well is then formed by summing multiple frames. 16 frames were captured at a 100 msec exposure using 635/25 nm excitation and 667/30 nm emission filters. The focus particles are imaged at 470/40 nm excitation and 520/40 nm excitation filters and captured 2 frames at a 20 msec exposure.

Data analysis: Using the image captured by the CCD camera, detected cells were estimated by an algorithm that looked at both number of objects in the field of view and the intensity of the objects. Number of cells based on this detection algorithm were generated at time zero, and at time four hours without antibiotic and with both concentrations of each antibiotic. For each urine sample/drug concentration, fold growth was calculated as the signal in the well containing antibiotic after growth (time four) to the signal in the urine sample prior to growth (time zero). Comparison of fold growth and the observation of growth in the corresponding well in the CLSI-compliant broth microdilution, thresholds were selected for the fold growth cutoff to maximize agreement with the broth microdilution results. In conditions where cells are growing in the presence of the antibiotic (and thus, resistant at that concentration), the fold growth will be high and in conditions where cells are in the process of dying (and thus, sensitive at that concentration), the fold growth number will be low. In these cartridges, if both concentrations of antibiotic show no growth based on their fold growth numbers, the bacteria in that urine sample is called sensitive. If there is growth in the lower concentration but not the higher concentration, the bacteria in the urine sample is intermediate in the case of Ciprofloxacin, Nitrofurantoin and Trimethoprim/Sulfamethoxazole and resistant in the case of Cefazolin. If both concentrations of antibiotic show growth based on their fold growth thresholds, the bacteria in that urine sample is called resistant. All sensitive/resistant calls data compared to the sensitive/resistance call made by the MIC determination in a CLSI-compliant standard BMD. Four-hour growth in the absence of antibiotic is a control condition to ensure viable bacterial are present in the processed urine sample.

Results. FIG. 2 shows the average fold growth of four replicates in two cartridges containing clinical urine sample BIUR0067, which contained an *E. coli* strain. The graph shows the mean fold growth in each of the 2 concentrations each of Ciprofloxacin and Nitrofurantoin across 4 replicates in 2 different cartridges. Using a fold-growth value of 2 for both antibiotics, the MulitPath assay calls both Ciprofloxacin (CIP) concentrations as growth and both the Nitrofurantoin (NIT) concentrations as no growth. Therefore, by MulitPath, BIUR0067 is resistant to ciprofloxacin and sensitive to Nitrofurantoin. The *E. coli* strain isolated from this urine and tested in a CLSI-standard broth microdilution matched these sensitive/resistant calls.

FIG. 3 shows the average fold growth of four replicates in two cartridges containing clinical urine sample BIUR0084, which contained a *K. pneumonaie* strain. The graph shows the mean fold growth in each of the 2 concentrations each of Cefazolin and Trimethoprim/Sulfamethoxazole across 4 replicates in 2 different cartridges. Using a fold growth value of 2 for both antibiotics, the MulitPath assay calls all the antibiotic concentrations of both Cefazolin and Trimethoprim/Sulfamethoxazole as growth. Therefore, this strain of *K. pneumoniae* is resistant to both antibiotics. This matches both the CLSI-standard broth microdilution done in house.

Conclusions. The example shows the results using the inventive automated systems, devices, and methods for rapid and automated antimicrobial susceptibility testing directly in clinical specimens from hospital patients that had *E. coli* in their urine. The invention delivered in just 4 hours accurate performance compared to the gold standard CLSI broth microdilution (BMD) method.

Variations. This example is illustrative of the performance of this novel AST method on a cartridge and is not limited to the specific details included in the description. One skilled in the art will readily understand that many variations are therefore possible, including using different probe sequences and nucleic acid structures (PNA, LNA, etc.), alternative assay chemistries (different detergents, chaotropes, fluorophores, buffers, pH, temperatures, reaction times, component concentrations), concentration of urine and urine processing procedures and alterations to reactant and antimicrobial stabilization, different bacterial targets, different antimicrobial agents etc. This methodology can also clearly be extended to other biological specimens and to other bacterial and non-bacterial pathogens.

Figures 34, 35:
FIG. 34 shows the Multipath™ UTI-AST cartridge.
FIG. 35 is a table showing antibiotic concentrations tested.

FIG. 34 shows the Multipath™ UTI-AST cartridge.

FIG. 35 is a table showing antibiotic concentrations tested.

FIG. 36 is a table of Oligonucleotides used in this example 8.

Figure 37:
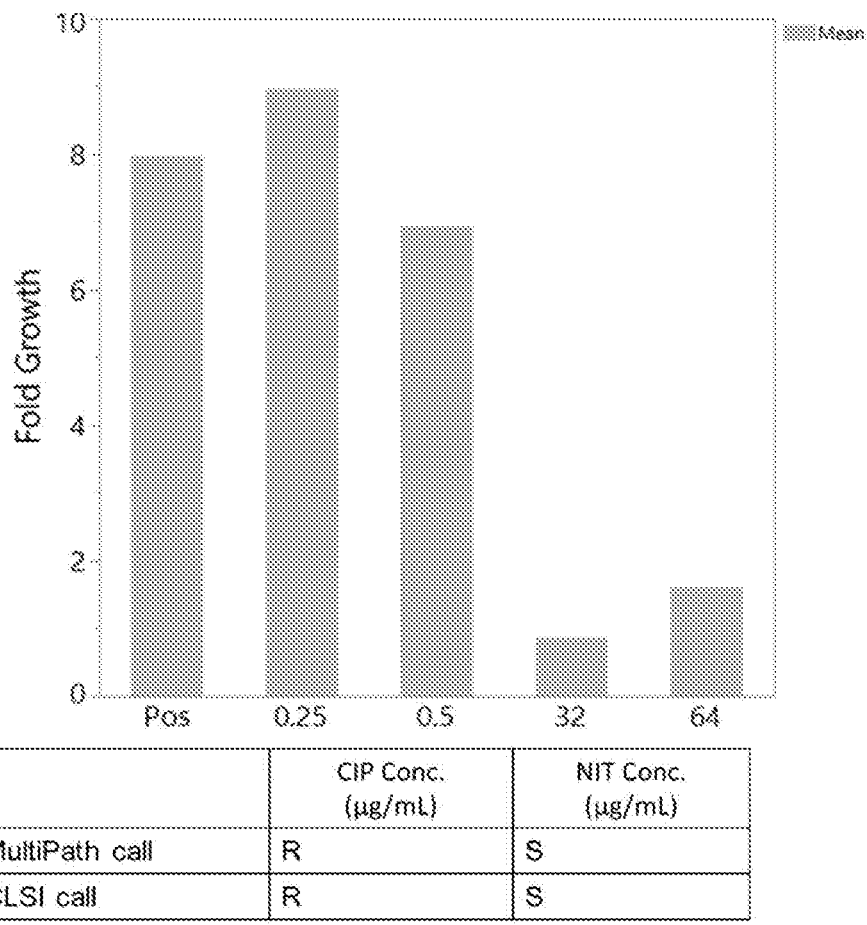
FIG. 37 shows BIUR0067 Results.

FIG. 37 shows BIUR0067 Results.

Figure 38:
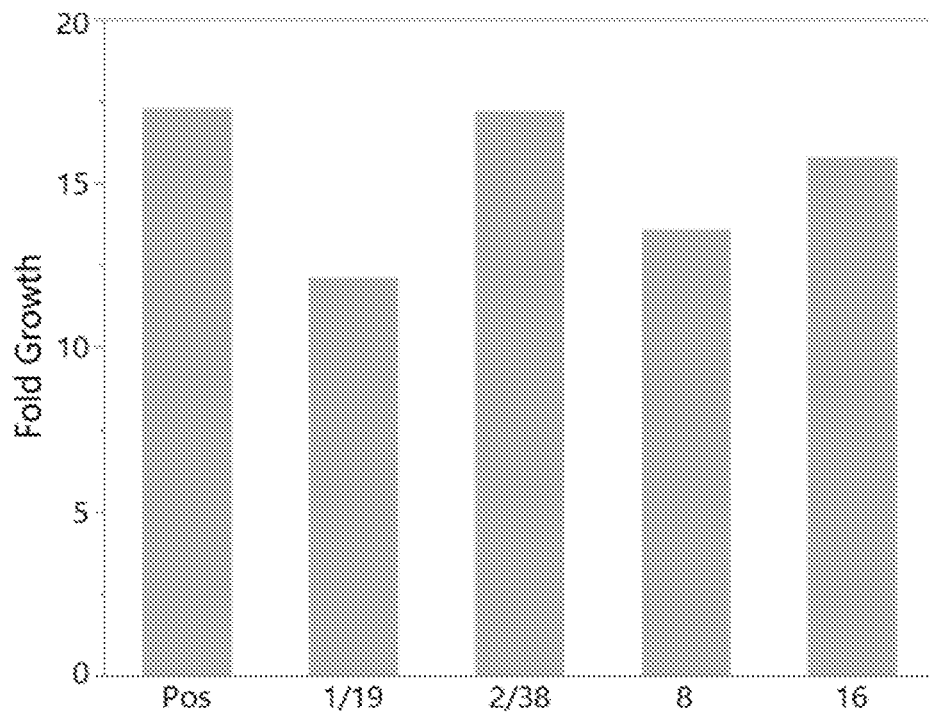
FIG. 38 shows BIUR0084 Results

FIG. 38 shows BIUR0084 Results

Example 9. Rapid AST Method Directly in Urine Specimens is Robust to Variation Pathogen Concentration Overview. Robustness to variable inoculum concentrations is important for the rapid AST method because when testing specimens directly from specimens the target cell concentration is unknown. This example demonstrates the use of the invention to provide accurate and consistent results directly from a urine specimen when for contrived specimens covering a wide range of target cell concentrations. This example demonstrates that variable cell inputs of *E. coli* BAA-2469, *P. aeruginosa* ATCC 27853, *K. pneumoniae* ATCC 700603 and *K. pneumoniae* CDC-0043 in the presence of 10% urine deliver accurate AST results compared to the Broth Microdilution (BMD) gold standard for AST.

Experimental Procedure.

Preparation of Antibiotic Plates: Antibiotic plates containing either concentrations of three to five antibiotics in a 2-fold serial dilution series were prepared by distributing 10 µL of 10-fold higher concentration than the desired final concentration into the wells of a 96 well plate. The concentrations selected for testing of each antibiotic straddled the CLSI-reported MICs for the bacterial strains tested. Plates were prepared with all or a subset of the following antibiotics: Cefazolin, Ciprofloxacin, Levofloxacin, Nitrofurantoin, and Trimethoprim-Sulfamethoxazole. In addition to the wells containing the antimicrobial dilution series, four wells contained water to allow for positive (bacteria growth in the absence of antibiotic) and negative (no bacterial cells) controls.

Preparation of Cultures: Bacterial cultures for *E. coli* BAA-2469, *P. aeruginosa* ATCC 27853, *K. pneumoniae* ATCC 700603, and *K. pneumoniae* CDC-0043 were obtained by inoculating Trypticase Soy Broth (TSB, Hardy Diagnostics cat. U65) with 3 to 5 colonies from fresh tryptic soy agar plates (TSA, BD cat. 221185) and growing for 1.5 to 3 hours at 35° C. to achieve log-phase growth. The cells were diluted in 1× cation-adjusted Mueller-Hinton broth (MHBII, Teknova cat. M5860) to various inoculum ($2 \times 10^3$ CFU/mL-$1 \times 10^7$ CFU/mL). For more accurate cellular concentrations, these estimated bacterial inputs were adjusted using colony counts. Plate counts were determined by diluting the log-phase cultures to about 500 CFU/mL in MHBII, plating 100 µL on TSA plates and counting colonies after growth at 35° C. for 16 to 24 hours. Using the average plate counts, the actual CFU present in each concentration tested was computed.

Preparation of Magnetic Particles: 2 hydroxypropyl trimethylammonium chloride coated silica magnetic particles (SiMag-Q, Chemicell, cat. 1206-5) were diluted 1:20 into 50 mM EPPS buffer, pH 8.2 to $2.75 \times 10^{12}$ particles/mL. Fluorescent magnetic microspheres containing a green dye (Dragon Green Fluorescent Microspheres, BANGS Laboratories, cat. MEDG001) were added to the suspension at a final concentration of $3 \times 10^6$ particles/mL. These particles enable the optical system to focus on the correct plane. The magnetic particle mixture was sonicated for 1 minute immediately prior to use to minimize aggregation. Separate magnetic particle suspensions were prepared for the time zero and time four-hour assays described below.

Bacterial Cell Labeling at AST time zero: Assay signal prior to the initiation of bacterial growth in the presence or absence of antibiotics (time zero or T0) was determined for each organism and inoculum. 10 µL of each sample was added to 80 µL of hybridization buffer to final concentrations of 3×SSC (0.45 M NaCl, 0.045 M Na citrate, Sigma, cat. # S6639), 1% CHAPS (Sigma, cat. # C3023), 1% NOG (Sigma cat. #08001), 1× cation-adjusted Mueller-Hinton Broth (MHBII), species-specific DNA oligonucleotide FISH probes and unlabeled DNA helper probe. The oligonucleotide probes used are shown in Table B. A final concentration of 10% urine was obtained by adding 10 µL of pooled urine (in-house collected and filtered) directly to the mixture. 10 µL of the magnetic particle mixture prepared as described above was then added. 100 µL of this reaction mixture was transferred to a microtiter plate containing 504, per well (previously dried) of "dye cushion" (50 mM TRIS pH 7.5 (Teknova, cat. T5075), 7.5% v/v Optiprep (Sigma, cat. D1556), 5 mg/mL Direct Black-19 (Orient, cat. #3222)

(dry-cushion plate) and incubated at 35° C. for 30 minutes. After incubation, microtiter plates were placed onto a magnetic field (Dexter magnetic technologies, cat. 54170260) for 4 minutes to bring magnetic particles, a fraction containing labeled cells, through the "dye cushion" and into proximity to the imaging surface at the bottom of the wells.

Imaging of labeled cells: The MultiPath™ laboratory imaging system is a custom-built instrument and software that is capable of automatically capturing image data from selected wells of a microtiter plate. It uses a high precision linear stage from Prior Scientific (Rockland, MA) to position each well over a fluorescence-based image acquisition subsystem. The instrument can image in 4 separate color channels and uses an objective lens, illumination LEDs, fluorescent filter sets, and camera. The objective lens has a field of view designed to capture the image of an entire microtiter plate well. The illumination module light source consists of 2 high power LEDs per color channel. A series of fluorescent image frames are captured with a camera using a 3.1MP Sony IMX265 monochrome sensor with 12-bit per pixel quantization. The final image for each well is then formed by summing multiple frames. 16 frames were captured at a 100 msec exposure using 635/25 nm excitation and 667/30 nm emission filters. The focus particles are imaged at 470/40 nm excitation and 520/40 nm excitation filters and captured 2 frames at a 20 msec exposure.

Four-Hour Growth: While the time zero cell quantification was occurring, 10 μL of each organism inoculum, 10 μL of pooled urine, and 70 μL of 1×MHBII was added to the appropriate wells of the antibiotic plate (already containing 10 μL of antibiotic). The samples were allowed to grow in a standard air incubator at 35° C. for 4 hours.

Bacterial Cell Labeling at AST time four-hour growth: After samples had incubated in the presence and absence of antibiotics for four hours (T4), cells were labeled and quantified to determine how much growth, if any, occurred. 10 μL of the incubated sample-antibiotic plate (10%) was transferred to a microtiter plate and combine with 100 μL hybridization buffer, FISH probes, helper probes, magnetic particles, and focus particles in the same manner as described above for assay time zero.

Comparison Method: Results using the novel AST method described here were compared to broth microdilutions (BMD) performed according to CLSI M07-Ed13E 2018.

Data Analysis and Threshold Generation: Using the image captured by the CCD camera, detected cells were estimated by an algorithm that looked at both number of objects in the field of view and the intensity of the objects. The number of cells based on this detection algorithm were generated at time zero, and at time four hours without antibiotic and with all concentrations of each antibiotic. For each sample inoculum/drug concentration, fold growth was calculated as the signal in the well containing antibiotic after growth (time four) to the signal in the urine sample prior to growth (time zero). Using fold growth and the observation of growth in the corresponding well in the CLSI-compliant broth microdilution, a logistic regression model was used to generate thresholds for determining the fold growth cutoff above which cells are growing in the presence of the antibiotic (and thus, resistant at that concentration) and below which, cells are in the process of dying (and thus, sensitive at that concentration). The point where the fold growth number falls below the determined threshold is the MIC value generated by the assay. Results were correspondingly assigned to categories of susceptible, intermediate, or resistant to each antibiotic. All data was then compared to CLSI standard BMD. Four-hour growth in the absence of antibiotic is a control condition to ensure viable bacterial are present in the processed urine sample.

Results.

The figures below show how this method is robust to varying inoculum levels while matching the gold-standard broth microdilution method. FIG. 1 compares the results obtained with the novel AST method to results of a standard BMD performed at a single concentration for all drugs tested. Column 3 compared the MICs obtained via the novel AST method and the gold-standard BMD. All MIC calls were within one 2-fold dilution (Essential Agreement) of the CLSI-compliant BMD. Column 4 compared categorical antibiotic susceptibility results (S=susceptible, I=intermediate, R=resistant) based on the MIC (Categorical agreement). Although a subset of *Klebsiella* concentrations gave different categorical calls from the MIC in broth microdilution, all of these were only classified as minor errors by standard AST methodology. FIG. 2 shows MICs generated with the novel 4-hour method described above for all inoculum levels for *E. coli* BAA-2469 (solid circles) compared to the standard broth microdilution method (24 hr BMD, dashed line). All MICs determined with this novel method are within essential agreement (shaded area). Table A shows the raw data for FIG. 2.

Conclusion. The rapid 4-hour AST method presented here is robust to initial cell concentration over a wide range of target cell concentrations. Robustness to variable inoculum concentrations is important for the rapid AST method because when testing specimens directly from specimens the target cell concentration is unknown.

Variations. This example is illustrative of the performance of this novel AST method and is not limited to the specific details included in the description. One skilled in the art will readily understand that many variations are therefore possible, including using different probe sequences and nucleic acid structures (PNA, LNA, etc.), alternative assay chemistries (different detergents, chaotropes, fluorophores, buffers, pH, temperatures, reaction times, component concentrations), concentration of urine and urine processing procedures. This methodology can also clearly be extended to other biological specimens and to other bacterial and non-bacterial pathogens for which specific probes can be designed, and for other antimicrobial or chemical agents.

FIG. 39 is a Summary of the overall essential and categorical agreement for all organisms, antibiotics and inoculum levels.

Figures 40, 41:
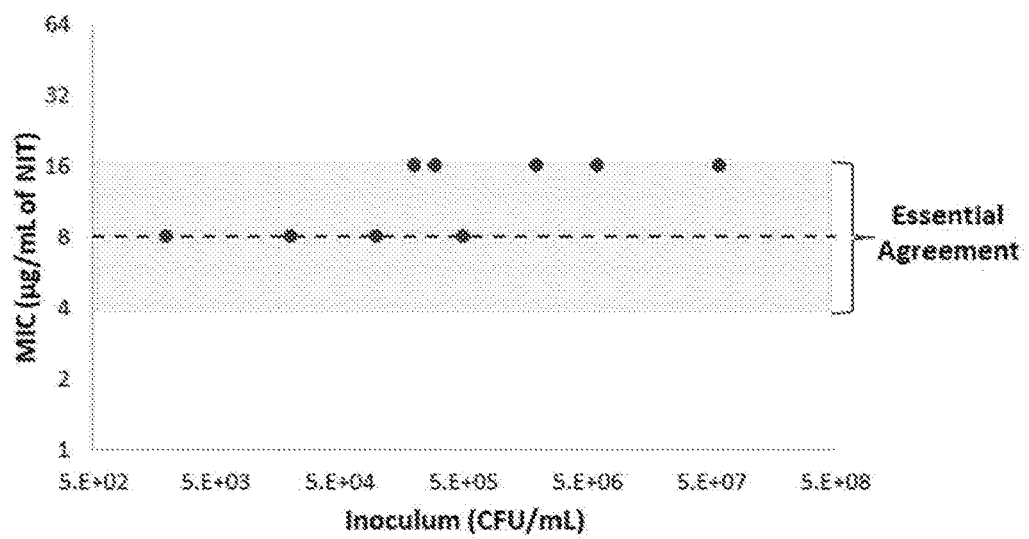
FIG. 40 shows MIC results for various inoculum levels generated using the new methods described here compared to the conventional BMD method.
FIG. 41 is a Summary of MIC results for the various inoculum levels generated.

FIG. 40 shows MIC results for various inoculum levels generated using the new methods described here compared to the conventional BMD method.

FIG. 41 is a Summary of MIC results for the various inoculum levels generated.

FIG. 42 is a table of Probe sequences used in this example 9.

Example 10. Rapid Antimicrobial Susceptibility Testing for Target Pathogens in Urine Clinical Specimen Containing Multiple Bacterial Species without Cell Purification Overview. Current methods for antimicrobial susceptibility testing require lengthy culture-based colony purification to ensure a pure population of the target pathogen cells free of other microbes. The usual method, colony purification requires, 2-5 days to deliver results. In the interim, patients are treated empirically with powerful broad-spectrum antibiotics that may not be optimal for killing the pathogen causing the infection and can even be completely ineffective. Plus, empiric treatment with broad-spectrum antibiotics causes the spread of antibiotic resistance.

Current methods require the lengthy cell purification process because these methods use non-specific detection methods, such as increase in turbidity, to determine which antimicrobial agents inhibit the growth of the target pathogen in microbiological medium. When using non-specific measurement of cellular replication one can only know that the growth seen is due to the target pathogen if the contains only cells of the target pathogen. Cell purification must be undertaken for current antimicrobial susceptibility testing methods because most medical specimens are non-sterile. Specimens generally contain microbes that make up the human microbiome, the benign normal bacterial population that populate our bodies.

In contrast, the inventive method can deliver accurate antimicrobial susceptibility testing results directly from specimens without the colony purification step. The method differs from current methods in that it assesses growth specifically for the target pathogen in microbiological medium containing antimicrobial agents.

This example demonstrates that the rapid antimicrobial susceptibility testing method accurately determines the minimum inhibitory concentration (MIC) for an *E. coli* strain in contrived samples comprising urine matrix (10%) for 15 different culture-negative urine samples. Here we show that using the new method antimicrobial susceptibility testing results are accurate and not significantly impacted by off-target bacteria in urine samples containing high concentrations of other microbial species.

Experimental Procedure.

Preparation of Antibiotic Plates: Prior to initiating experimental procedure, a plate containing five concentrations in a 2-fold serial dilution series were prepared by distributing 10 µL of 10-fold higher concentration than the desired concentration. The concentrations selected for testing of each antibiotic straddled the CLSI-reported breakpoints for the antibiotic for *E. coli*. In addition to the wells containing the antimicrobial dilution series, four wells containing water were included in the plates to allow for a positive and negative control.

Preparation of Cultures: Three to five colonies of *E. coli* BAA-2469 as well as eight other off-target species (*S. aureus* ATCC 25923, *C. freundii* ATCC 43864, *A. baumannii* ATCC 19606, *S. epidermidis* ATCC 12228, *M. luteus* (environmental isolate), *C. minutissmum* ATCC 23348-BAA 949, *K. pneumoniae* CDC 0043, and *K. pneumoniae* CDC 0141) were each inoculated separately into 5 mL of Tryptic Soy Broth (TSB, Hardy Diagnostics cat. U65) and incubated while shaking for 1-2 hours at 35° C. The optical density was measured by a spectrophotometer and the organisms were diluted in 1× cation-adjusted Mueller-Hinton Broth (MHBII, Teknova cat. M5860). *E. coli* was diluted to approximately $5 \times 10^6$ CFU/mL (final assay concentration is $5 \times 10^5$ CFU/m) while the other off-target species were diluted to various inoculum (ranging from $1 \times 10^5$ to $5 \times 10^8$ CFU/mL).

Preparation of Magnetic Particles: 2 hydroxypropyl trimethylammonium chloride-coated silica magnetic particles (SiMag-Q, Chemicell, cat. 1206-5) were diluted 1:20 into 50 mM EPPS buffer, pH 8.2 to $2.75 \times 10^{12}$ particles/mL. Fluorescent magnetic microspheres containing a green dye (Dragon Green Fluorescent Microspheres, BANGS Laboratories, cat. MEDG001) were added to the suspension at a final concentration of $3 \times 10^6$ particles/mL. These particles enable the optical system to focus on the correct plane. The magnetic particle mixture was sonicated for 1 minute immediately prior to use to minimize aggregation. Separate magnetic particle suspensions were prepared for the time zero and time four-hour assays described below.

Bacterial Cell Labeling at AST time zero: Assay signal prior to the initiation of bacterial growth in the presence or absence of antibiotics (time zero or T0) was determined for each species of *E. coli*. 10 µL of each sample was added to 80 µL of hybridization buffer (3×SSC (0.45 M NaCl, 0.045 M sodium citrate) (Sigma, cat. # S6639), 1% CHAPS (Sigma, cat. # C3023), 1% SB3-12 (Sigma cat. #08001), 1× Cation-adjusted Mueller-Hinton Broth (MHBII), *E. coli*-specific DNA oligonucleotide FISH probes and unlabeled DNA helper probe)). Probe sequences are shown in Table in FIG. 48. A final concentration of 9.1% urine was obtained by adding 10 µL of pooled urine (in-house collected and filtered) directly to the mixture. 10 µL of the magnetic particle mixture prepared as described above was added directly to this mixture. 100 µL of the sample, now containing the hybridization mixture, urine, and magnetic particles, was transferred to a microtiter plate containing 504, per well (previously dried) of "dye cushion" (50 mM TRIS pH 7.5 (Teknova, cat. T5075), 7.5% v/v Optiprep (Sigma, cat. D1556), 5 mg/mL Direct Black-19 (Orient, cat. #3222) and incubated at 35° C. for 30 minutes. After incubation, microtiter plates were placed onto a magnetic field (Dexter magnetic technologies, cat. 54170260) for 4 minutes to bring magnetic particles, a fraction containing labeled cells, through the "dye cushion" and into proximity to the imaging surface at the bottom of the wells.

Imaging of labeled cells: The MultiPath™ laboratory imaging system is a custom-built instrument and software that is capable of automatically capturing image data from selected wells of a microtiter plate. It uses a high precision linear stage from Prior Scientific (Rockland, MA) to position each well over a fluorescence-based image acquisition subsystem. The instrument can image in 4 separate color channels and uses an objective lens, illumination LEDs, fluorescent filter sets, and camera. The objective lens has a field of view designed to capture the image of an entire microtiter plate well. The illumination module light source consists of 2 high power LEDs per color channel. A series of fluorescent image frames are captured with a camera using a 3.1MP Sony IMX265 monochrome sensor with 12-bit per pixel quantization. The final image for each well is then formed by summing multiple frames. 16 frames were captured at a 100 msec exposure using 635/25 nm excitation and 667/30 nm emission filters. The focus particles are imaged at 470/40 nm excitation and 520/40 nm excitation filters and captured 2 frames at a 20 msec exposure.

Four-Hour Growth: The *E. coli* BAA 2469, in the presence of *Staphylococcus epidermidis, Micrococcus luteus, Corynebacterium minutissimum, Staphylococcus aureus, Acinetobacter baumannii, Citrobacter freundii*) were tested for their susceptibility against 3 antimicrobial agents: Ciprofloxacin (CIP), Levofloxacin (LVX), and Nitrofurantoin (NIT). *E. coli* BAA 2469, in the presence of *Klebsiella pneumoniae* was tested against 5 antimicrobial agents: Cefazolin (CFZ), Ciprofloxacin (CIP), Levofloxacin (LVX), Nitrofurantoin (NIT), and Trimethoprim-Sulfamethoxazole (TMP/SXT). Antibiotic plates containing these antimicrobial agents were prepared according to the method described above. While the time zero cell quantification was occurring, 10 µL of either *E. coli* species ($5 \times 10^6$ CFU/mL), 10 µL of an off-target species ($1 \times 10^5$ to $5 \times 10^8$ CFU/mL), 10 µL of pooled urine, and 60 µL of MHB II (Teknova, cat. # M5860) was added to each well of the antibiotic plate already containing 10 µL of antibiotics. The samples were allowed to grow in a standing air incubator at 35° C. for 4 hours.

Bacterial Cell Labeling at AST time four-hour growth: After samples had incubated in the presence and absence of antibiotics for four hours (T4), cells were labeled and quantified to determine how much growth, if any, occurred. 10 µL of the incubated sample-antibiotic plate (10%) was transferred to a microtiter plate containing dried "dye cushion" and combined with the 100 µL mixture of hybridization buffer, FISH probes, helper probes, magnetic particles, and focus particles as described above for assay time zero.

Comparison Method: Results for the novel assay method described here were compared to broth microdilutions (BMD) performed according the M07-Ed13E 2018.

Data Analysis and Threshold Generation: Using the image captured by the CCD camera, detected cells were estimated by an algorithm that looked at both number of objects in the field of view and the intensity of the objects. Number of cells based on this detection algorithm were generated at time zero, and at time four hours without antibiotic and with all concentrations of each antibiotic. For each bacteria sample/drug concentration, fold growth was calculated as the signal in the well containing antibiotic after growth (time four) to the signal in the urine sample prior to growth (time zero). Using fold growth and the observation of growth in the corresponding well in the CLSI-compliant broth microdilution, a logistic regression model was used to generate thresholds for determining the fold growth cutoff above which cells are growing in the presence of the antibiotic (and thus, resistant at that concentration) and below which, cells are in the process of dying (and thus, sensitive at that concentration). The point where the fold growth number falls below the determined threshold is the MIC value generated by the assay. Results were correspondingly assigned to categories of susceptible, intermediate, or resistant to each antibiotic.

Results.

The data shown demonstrate the 4-hour AST method described above is robust to non-sterile samples while a CLSI BMD method where extra bacteria is present is not. FIG. 1 shows the data for *E. coli* BAA-2469 in the presence of Nitrofurantoin and with increasing concentrations of *S. aureus* ATCC 25923 up to an excess of 100-fold. The *E. coli* MIC in the CLSI-like broth microdilution method is affected by the addition of the *S. aureus* strain (marked as X in the figure) where the MIC increases from 8 in the absence of *S. aureus* to 32 with a 100-fold excess of *S. aureus*. In contrast, the novel 4-hour AST assay described in this invention (MultiPath, circles) had the same MIC (8) (dashed line) regardless of the amount of *S. aureus* cells.

Figures 43, 44:
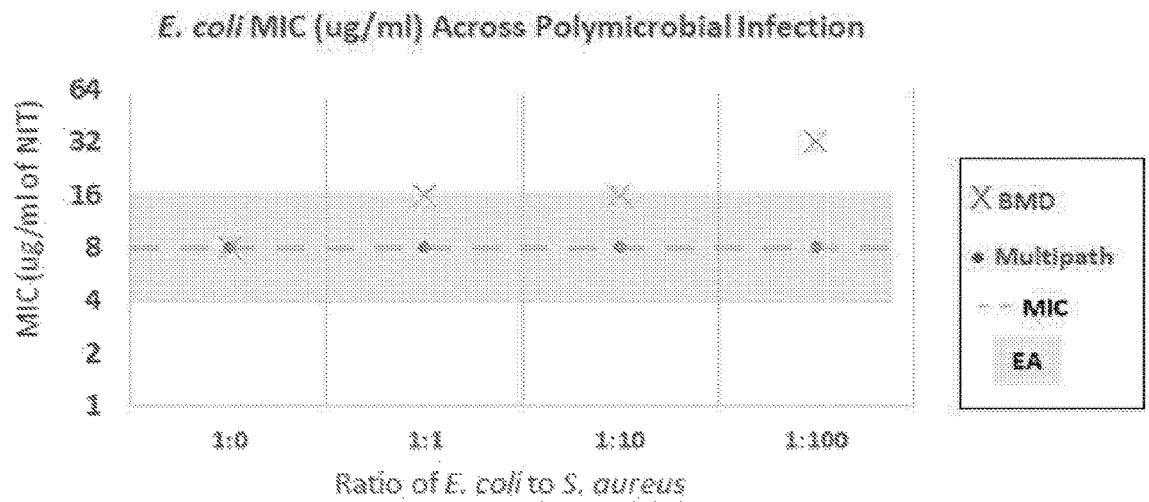
FIG. 43 shows the MIC for *E. coli* stays consistent with the method describe above with varying inoculum of *S. aureus* while the MIC for BMD increases with increasing *S. aureus*.
FIG. 44 shows a summary of agreement for *E. coli* with varying inoculum levels of off-target microbe to standard BMD.

FIG. 45 through FIG. 47 show the raw MIC values determined using this novel method (MultiPath) compared to a CLSI broth microdilution where only the *E. coli* BAA-2469 is present. Table in FIG. 44 shows the overall essential agreement of *E. coli* in the presence of increasing off-target bacteria. Only a single condition—1e7 *Citrobacter freundii* with Nitrofurantoin—resulted in a lack of essential agreement but this did not change the categorical sensitive/intermediate/resistant determination which had 100% agreement across all antibiotics and all off-target bacteria.

Conclusions. The example demonstrates that using the invention for antimicrobial susceptibility testing, cell purification is not required for achieving accurate antimicrobial susceptibility testing results for a target pathogen in samples containing even large numbers of other microbes of other species.

Variations: This example is illustrative of the performance of this novel FISH method and is not limited to the specific details included in the description. One skilled in the art will readily understand that many variations are therefore possible, including using different probe sequences and nucleic acid structures (PNA, LNA, etc.), alternative assay chemistries (different detergents, chaotropes, fluorophores, buffers, pH, temperatures, reaction times, component concentrations), concentration of urine and urine processing procedures. This methodology can also clearly be extended to other biological specimens and to other bacterial and non-bacterial pathogens.

FIG. 43 shows the MIC for *E. coli* stays consistent with the method describe above with varying inoculum of *S. aureus* while the MIC for BMD increases with increasing *S. aureus*.

FIG. 44 shows a summary of agreement for *E. coli* with varying inoculum levels of off-target microbe to standard BMD.

FIG. 45 shows agreement of *E. coli* with varying inoculum levels of off-target microbe (*S. aureus, Staphylococcus epidermidis*, and, *Citrobacter freundii*) standard BMD.

FIG. 46 shows agreement of *E. coli* with varying inoculum levels of off-target microbe (*Micrococcus luteus, Acinetobacter baumannii, Corynebacterium minutissimum*) standard BMD.

FIG. 47 shows agreement of *E. coli* with varying inoculum levels of off-target microbe (*K. pneumoniae*) standard BMD.

FIG. 48 is a table of Probe sequences used in this example 10.

Example 11. Rapid Antimicrobial Susceptibility Testing is Accurate for Lactam Antibiotics in the Presence of Bacteria Expressing Beta-Lactamase Overview. Current methods for antimicrobial susceptibility testing require lengthy culture-based colony purification to ensure a pure population of the target pathogen cells free of other microbes. The usual method, colony purification requires, 2-5 days to deliver results. In the interim, patients are treated empirically with powerful broad-spectrum antibiotics that may not be optimal for killing the pathogen causing the infection and can even be completely ineffective. Plus, empiric treatment with broad-spectrum antibiotics causes the spread of antibiotic resistance.

One reason that current methods require the lengthy cell purification process because these methods use non-specific detection methods, such as increase in turbidity, to determine which antimicrobial agents inhibit the growth of the target pathogen in microbiological medium. When using non-specific measurement of cellular replication one can only know that the growth seen is due to the target pathogen if the contains only cells of the target pathogen.

In contrast, the inventive method can deliver accurate antimicrobial susceptibility testing results directly from specimens without the colony purification step. The method differs from current methods in that it assesses growth specifically for the target pathogen in microbiological medium containing antimicrobial agents. We demonstrate in another example, that the inventive method is accurate in the presence of large numbers of cells from off-target species.

In this example, we address another challenge that could arise by performing antimicrobial susceptibility testing for a target pathogen in the presence of off-target species. Here we demonstrate that the inventive method delivers accurate antimicrobial susceptibility testing results for a target pathogen in contrived urine specimens containing large numbers of an off-target species that makes an enzyme known to break down the antimicrobial agent being tested. Theoretically this could potentially change the concentration of the antimicrobial agent significantly enough to alter the antimicrobial susceptibility testing result.

In this example, we demonstrate that the rapid antimicrobial susceptibility testing achieves accurate antimicrobial susceptibility testing results for two carbapenem antibiotics (Meropenem and Imipenem) in the presence of large numbers of an off-target pathogen that produces a enzyme that breaks down this type of antimicrobial agent.

Experimental procedure. Preparation of Antibiotic Plates: Antibiotic plates prepared as described in Impact of Non-Sterile Sample on Target MIC example.

Preparation of Cultures: Three to five colonies of E. coli ATCC 25922, a strain of bacteria sensitive to most antibiotics and K. pneumoniae CDC 0141, a strain that, among many other resistance genes, expresses the beta-lactase OXA-181, were each inoculated separately into 5 mL of Tryptic Soy Broth (TSB, Hardy Diagnostics cat. U65) and incubated while shaking for 1-2 hours at 35° C. The Optical Density was measured by a spectrometer and the organisms were diluted in 1× cation-adjusted Mueller-Hinton Broth (MHBII, Teknova cat. M5860). E. coli was diluted to $5\times10^5$ CFU/mL (CLSI standard concentration) while K. pneumoniae was diluted to various inoculum (ranging from $1\times10^6$ and $5\times10^8$ CFU/mL).

Preparation of Magnetic Particles: 2 hydroxypropyl trimethylammonium chloride-coated silica magnetic particles (SiMag-Q, Chemicell, cat. 1206-5) were diluted 1:20 into 50 mM EPPS buffer, pH 8.2 to $3.75\times10^6$ particles/mL. Fluorescent magnetic microspheres containing a green dye (Dragon Green Fluorescent Microspheres, BANGS Laboratories, cat. MEDG001) were added to the suspension at a final concentration of $3\times10^6$ particles/mL. These particles enable the optical system to focus on the correct plane. The magnetic particle mixture was sonicated for 1 minute immediately prior to use to minimize aggregation. Separate magnetic particle suspensions were prepared for the time zero and time four-hour assays described below.

Bacterial Cell Labeling at AST time zero: Assay signal at time zero (T0) prior to the initiation of bacterial growth in the presence or absence of antibiotics was determined for each clinical urine specimen. 30 µL of each processed urine was added to 70 µL of 1× cation-adjusted Mueller-Hinton Broth (MHBII) containing species-specific Alexa647N-labeled DNA oligonucleotide FISH probes and unlabeled DNA helper probes. Probe sequences used are shown in Table A. The 100 µL mixture was then added to a well of a microtiter plate containing dehydrated hybridization buffer (3×SSC (0.45 M NaCl, 0.045 M Na citrate) buffer (Sigma, cat. # S6639), 0.18% cetrimide (Sigma, cat. # H9151), 0.77% CHAPSO (Sigma cat. # C3649), 0.72% SB3-12 (Sigma cat. # D0431) 0.13M guanidine thiocyanate (Sigma, cat. # G9277)). 10 µL of the prepared magnetic particle mixture was then added to the well. 100 µL of this reaction mixture was transferred to a microtiter plate containing 50 µL per well (previously dried) of "dye-cushion" (50 mM TRIS pH 7.5 (Sigma cat. T1075), 7.5% v/v Optiprep (Sigma cat. D1556), 50 mg/mL Direct Black 19 (Orient cat. 191L) and incubated at 35° C. for 30 minutes. After incubation, microtiter plates were placed onto a magnetic field (Dexter magnetic technologies, cat. 54170260) for 4 minutes to bring magnetic particles, a fraction containing labeled cells, through the "dye-cushion" and into proximity to the imaging surface at the bottom of the wells.

Imaging of labeled cells: The MultiPath™ laboratory imaging system is a custom-built instrument and software that is capable of automatically capturing image data from selected wells of a microtiter plate. It uses a high precision linear stage from Prior Scientific (Rockland, MA) to position each well over a fluorescence-based image acquisition subsystem. The instrument can image in 4 separate color channels and uses an objective lens, illumination LEDs, fluorescent filter sets, and camera. The objective lens has a field of view designed to capture the image of an entire microtiter plate well. The illumination module light source consists of 2 high power LEDs per color channel. A series of fluorescent image frames are captured with a camera using a 3.1MP Sony IMX265 monochrome sensor with 12-bit per pixel quantization. The final image for each well is then formed by summing multiple frames. 16 frames were captured at a 100 msec exposure using 635/25 nm excitation and 667/30 nm emission filters. The focus particles are imaged at 470/40 nm excitation and 520/40 nm excitation filters and captured 2 frames at a 20 msec exposure.

Four-Hour Growth: The E. coli was tested in the presence of varying inoculum of K. pneumoniae-OXA for susceptibility against 2 antimicrobial agents: Imipenem and Meropenem. While the time zero cell quantification was occurring, 10 µL of the E. coli species ($5\times10^6$ CFU/mL), 10 µL of the K. pneumoniae ($1\times10^6$ to $1\times10^8$ CFU/mL) or 10 uL media (control), 10 µL of pooled urine, and 60 µL of MHB II (Teknova, cat. # M5860) was added to each well of the antibiotic plate already containing 10 µL of antibiotics. The samples were allowed to grow in a standing air incubator at 35° C. for 4 hours.

Bacterial Cell Labeling at AST time four-hour growth: After samples had incubated in the presence and absence of antibiotics for four hours (T4), cells were labeled and quantified to determine how much growth, if any, occurred. 100 µL of each well of the incubated sample-antibiotic plate was transferred to a corresponding well of a dehydrated buffer plate and combined with FISH probes, helper probes, magnetic particles, and focus particles in the same manner as described above for assay time zero.

Comparison Method: Results for the MulitPath™ Assay were compared to broth microdilutions (BMD) performed according to the CLSI method M07-Ed13E 2018.

Data Analysis and Threshold Generation: Using the image captured by the CCD camera, detected cells were estimated by an algorithm that looked at both number of objects in the field of view and the intensity of the objects. Number of cells based on this detection algorithm were generated at time zero, and at time four hours without antibiotic and with all 6 concentrations of each antibiotic. For each urine sample/drug concentration, fold growth was calculated as the signal in the well containing antibiotic after growth (time four) to the signal in the urine sample prior to growth (time zero). Using fold growth and the observation of growth in the corresponding well in the CLSI-compliant broth microdilution, a logistic regression model was used to generate thresholds for determining the fold growth cutoff above which cells are growing in the presence of the antibiotic (and thus, resistant at that concentration) and below which, cells are in the process of dying (and thus, sensitive at that concentration). The point where the fold growth number falls below the determined threshold is the MIC value generated by the assay. Results were correspondingly assigned to categories of susceptible, intermediate, or resistant to each antibiotic. All data was then compared to CLSI standard BMD. Four-hour growth in the absence of antibiotic is a control condition to ensure viable bacterial are present in the processed urine sample.

Results. FIG. 1 shows the MIC of a sensitive E. coli strain to Imipenem in the presence of increasing amounts of a K. pneumonaie strain that is resistant to the Imipenem antibiotic by producing a beta-lactamase that degrades it. The novel rapid AST method of this invention is compared to the BMD method. The novel 4.5-hour AST method is unaffected by the presence of even high concentrations of the beta-lactamase producing K. pneumonaie with MICs consistently less than 1 µg/mL Imipenem. In contrast, the BMD method after 16-24 hours of growth shows increasing MIC for the sensitive E. coli strain with increasing levels of K. pneumonaie, which would be falsely determined to be resistant to this antibiotic. FIG. 2 shows similar results for the lactam antibiotic Meropenem.

Conclusions. The novel 4.5-hour AST method of this invention shows accurate MIC determination of bacteria sensitive to carbapenem antimicrobial agents even in the presence of high concentrations of a resistant bacteria expressing a carbapemase enzyme which degrades the antibiotic.

Variations. This example is illustrative of the performance of this novel AST method and is not limited to the specific details included in the description. One skilled in the art will readily understand that many variations are therefore possible, including using different probe sequences and nucleic acid structures (PNA, LNA, etc.), alternative assay chemistries (different detergents, chaotropes, fluorophores, buffers, pH, temperatures, reaction times, component concentrations, etc.), concentration of urine and urine processing procedures. This methodology can also be extended to additional pairings of lactam sensitive and beta-lactamase expressing bacteria.

Figure 49:
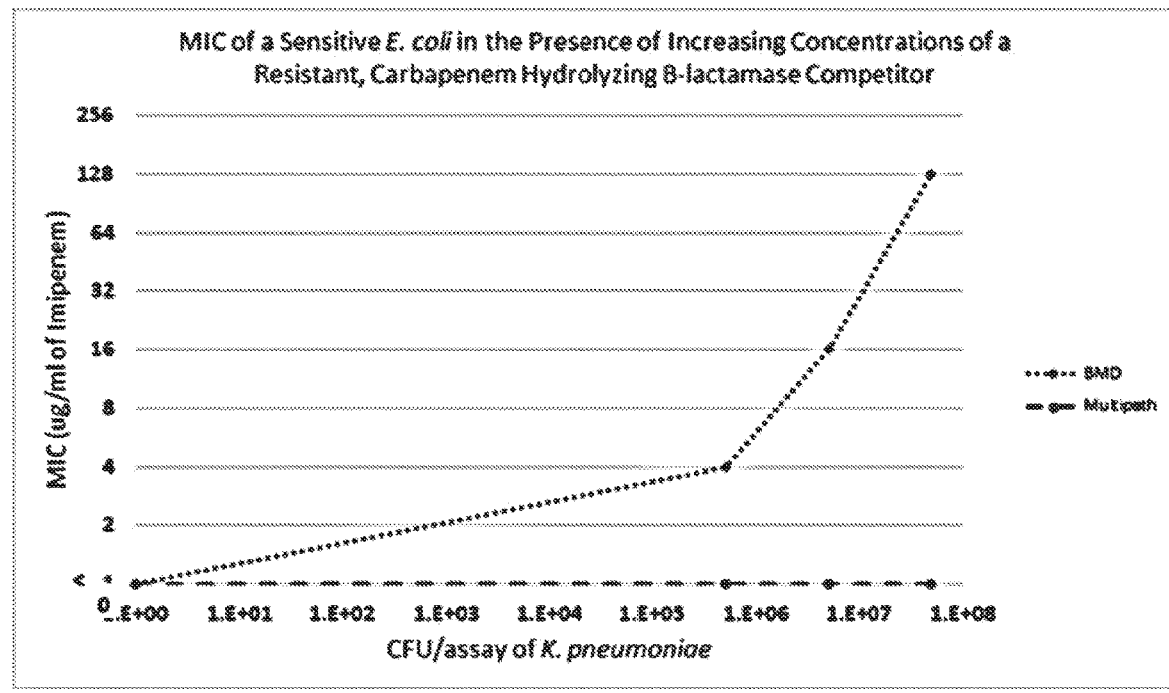
FIG. 49 is a comparison of the novel rapid AST and BMD methods for determining Imipenem MIC for *E. coli* in the presence of a resistant carbapenem hydrolyzing B-lactamase strain of *K. pneumonaie*.

FIG. 49 is a comparison of the novel rapid AST and BMD methods for determining Imipenem MIC for E. coli in the presence of a resistant carbapenem hydrolyzing B-lactamase strain of K. pneumonaie.

Figure 50:
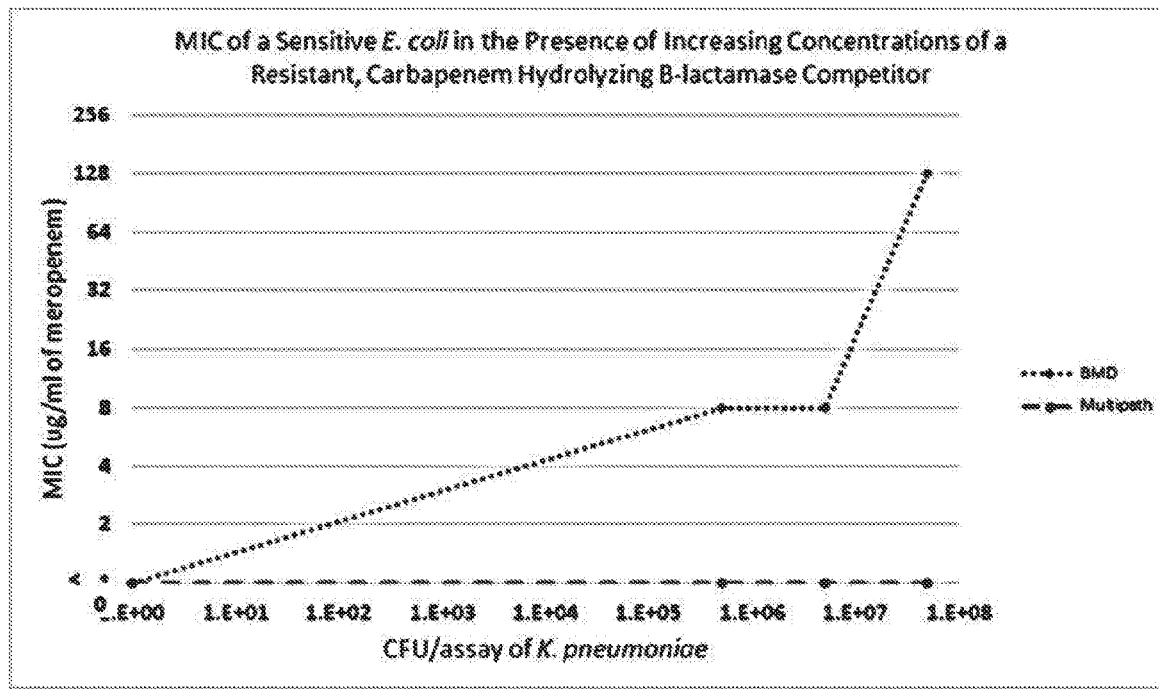
FIG. 50 shows the MIC for *E. coli* stays consistent with the method describe above with varying inoculum of a resistant carbapenem hydrolyzing B-lactamase strain of *K. pneumonaie* while standard BMD does now.

FIG. 50 shows the MIC for E. coli stays consistent with the method describe above with varying inoculum of a resistant carbapenem hydrolyzing B-lactamase strain of K. pneumonaie while standard BMD does now.

FIG. 51 is a table of probe sequences used in this example 11.

Example 12. Accurate Rapid Antimicrobial Susceptibility Testing of Bacteria in Urine without Culture-Based Cell Purification Overview: Current methods for antimicrobial susceptibility testing require lengthy culture-based colony purification to ensure a pure population of just pathogen cells free of the specimen itself. Consequently, antimicrobial susceptibility testing results that indicate which antibiotics are optimal for killing the pathogen causing the infection are not available for 2-5 days. In the interim, patients are treated empirically with powerful broad-spectrum antibiotics that may not be optimal for killing the pathogen causing the infection and can even be completely ineffective. Plus, empiric treatment with broad-spectrum antibiotics causes the spread of antibiotic resistance.

In contrast, the inventive method can deliver accurate antimicrobial susceptibility testing results directly from specimens without the lengthy colony purification step. Here we show that the new antimicrobial susceptibility testing results are not significantly impacted when bacteria in urine samples are tested without colony purification. This example demonstrates that the rapid antimicrobial susceptibility testing method accurately determines the minimum inhibitory concentration (MIC) for an E. coli strain in contrived samples comprising urine matrix (10%) for 15 different culture-negative urine samples.

Experimental procedure. Urine specimens: Fifteen culture negative clinical urine samples (remnants) were purchased from Discovery Life Sciences. Samples were received >7 days post collection and stored at −80° C. until use. For each sample, color of urine, pH, and presence of particulates were noted. Upon receipt, conventional urine culture was performed on the urines to determine samples were culture negative. Briefly, a calibrated 1 uL loop was placed into a well-mixed urine sample and evenly spread over a Tryptic soy agar (TSA) plate and incubated in a 35° C. air incubator for 18-24 hours. The remainder of the urine samples were assayed as described below.

Preparation of Antibiotic Plates: Microtiter plates containing six concentrations of each antibiotic in a 2-fold serial dilution series were prepared, starting at a 10-fold higher concentration than the expected minimum inhibitory concentration (MIC). Antibiotics used were Cefazolin, Ciprofloxacin, Nitrofurantoin, and Trimethoprim-Sulfamethoxazole. Antibiotic dilutions were verified to be within the appropriate tolerance by confirming that the MIC for at least two CLSI QC strains fell within the QC range reported in CLSI document M100Ed29E-2019. The concentrations selected for testing of each antibiotic straddled the CLSI-reported breakpoints for the antibiotic for E. coli. In addition to the wells containing the antimicrobial dilution series, eight wells containing water or diluent were included in the plates to allow for a no antibiotic positive and negative growth control.

Preparation of Cultures: A log culture for E. coli (BAA-2469) was grown using three to five colonies inoculated into 5 mL of Tryptic Soy Broth (TSB, Hardy Diagnostics cat. U65) and incubated while shaking for 1-2 hours at 35° C. The Optical Density was measured by a spectrophotometer and the organisms were diluted to $5\times10^6$ CFU/mL (for a final concentration of $5\times10^5$ CFU/mL in each 1004, reaction) in 1× Cation-adjusted Mueller-Hinton Broth (MHBII, Teknova cat. M5860).

Preparation of Magnetic Particles: 2 hydroxypropyl trimethylammonium chloride-coated silica magnetic particles (SiMag-Q, Chemicell, cat. 1206-5) were diluted 1:20 into 50 mM EPPS buffer, pH 8.2 to $2.75\times10^{12}$ particles/mL. Fluorescent magnetic microspheres containing a green dye (Dragon Green Fluorescent Microspheres, BANGS Laboratories, cat. MEDG001) were added to the suspension at a final concentration of $3\times10^6$ particles/mL. These particles enable the optical system to focus on the correct plane. The magnetic particle mixture was sonicated for 1 minute immediately prior to use to minimize aggregation. Separate magnetic particle suspensions were prepared for the time zero and time four-hour assays described below.

Bacterial Cell Labeling at AST time zero: Assay signal prior to the initiation of bacterial growth in the presence or absence of antibiotics (time zero or T0) was determined for each urine sample. 10 µL of diluted E. coli was added to 70 µL of hybridization buffer: final concentration: 3×SSC (0.45 M NaCl, 0.045 M Na citrate) buffer (Sigma, cat. # S6639), 1% CHAPS (Sigma, cat. # C3023), 1% NOG (Sigma cat. #08001), 1× Cation-adjusted Mueller-Hinton Broth (MHBII) (from a 2× stock) (Teknova, cat. M5866), and non-specific DNA oligonucleotide FISH probes and unlabeled DNA helper probe (see Table A for probe labels, sequences, and concentrations). A final concentration of 10% urine was obtained by adding 10 µL of each individual urine directly to the mixture. 10 µL of the magnetic particle mixture prepared as described above was added directly to this mixture. 100 µL of the sample, now containing the hybridization mixture, urine, and magnetic particles, was transferred to a microtiter plate containing 50 µL per well (previously dried) of "dye cushion" (50 mM TRIS pH 7.5 (Teknova, cat. T5075), 7.5% v/v Optiprep (Sigma, cat. D1556), 5 mg/mL Direct Black-19 (Orient, cat. #3222), dried at 60° C. in a convection oven for 3 hours) and incubated at 35° C. for 30 minutes. After incubation, microtiter plates were placed onto a magnetic field (Dexter magnetic technologies, cat. 54170260) for 4 minutes to bring magnetic particles, a fraction containing labeled cells, through the "dye cushion" and into proximity to the imaging surface at the bottom of the wells.

Imaging of labeled cells: The MultiPath™ laboratory imaging system is a custom-built instrument and software that is capable of automatically capturing image data from selected wells of a microtiter plate. It uses a high precision linear stage from Prior Scientific (Rockland, MA) to position each well over a fluorescence-based image acquisition subsystem. The instrument can image in 4 separate color channels and uses an objective lens, illumination LEDs, fluorescent filter sets, and camera. The objective lens has a field of view designed to capture the image of an entire microtiter plate well. The illumination module light source consists of 2 high power LEDs per color channel. A series of fluorescent image frames are captured with a camera using a 3.1MP Sony IMX265 monochrome sensor with 12-bit per pixel quantization. The final image for each well is then formed by summing multiple frames. 16 frames were captured at a 100 msec exposure using 635/25 nm excitation and 667/30 nm emission filters. The focus particles are imaged at 470/40 nm excitation and 520/40 nm excitation filters and captured 2 frames at a 20 msec exposure.

Four-Hour Growth: Spiked culture negative clinical UTI urine samples were tested for their susceptibility against 5 antimicrobial agents: Cefazolin, Ciprofloxacin, Levofloxacin, Nitrofurantoin, and Trimethoprim-Sulfamethoxazole. Antibiotic plates containing these antimicrobial agents were prepared according to the method described above. At the same time as the time zero cell quantification was occurring, 10 µL of *E. coli,* 10 µL of urine, and 70 µL of 1×MHB II (Teknova, cat. M5860) were added to each well of the antibiotic plate. The samples were allowed to grow in a standing air incubator at 35° C. for 4 hours.

Bacterial Cell Labeling at AST time four-hour growth: After samples had incubated in the presence and absence of antibiotics for four hours (T4), cells were labeled and quantified to determine how much growth, if any, occurred. 100 µL of each well of the incubated sample-antibiotic plate was transferred to a corresponding well of a dehydrated buffer plate and combined with FISH probes, helper probes, magnetic particles, and focus particles in the same manner as described above for assay time zero.

Comparison Method: Results for the MulitPath™ Assay were compared to broth microdilutions (BMD) performed according to the CLSI method M07-Ed13E 2018.

Data Analysis and Threshold Generation: Using the image captured by the CCD camera, detected cells were estimated by an algorithm that looked at both number of objects in the field of view and the intensity of the objects. Number of cells based on this detection algorithm were generated at time zero, and at time four hours without antibiotic and with all 6 concentrations of each antibiotic. For each urine sample/ drug concentration, fold growth was calculated as the signal in the well containing antibiotic after growth (time four) to the signal in the urine sample prior to growth (time zero). Using fold growth and the observation of growth in the corresponding well in the CLSI-compliant broth microdilution, a logistic regression model was used to generate thresholds for determining the fold growth cutoff above which cells are growing in the presence of the antibiotic (and thus, resistant at that concentration) and below which, cells are in the process of dying (and thus, sensitive at that concentration). The point where the fold growth number falls below the determined threshold is the MIC value generated by the assay. Results were correspondingly assigned to categories of susceptible, intermediate, or resistant to each antibiotic. All data was then compared to CLSI standard BMD. Four-hour growth in the absence of antibiotic is a control condition to ensure viable bacterial are present in the processed urine sample.

Results. The figures below show there is little to no matrix effect on AST results. FIG. 1 shows the MIC of *E. coli* BAA-2469 determined via the novel AST method (black circles) as compared to the MIC determined by the gold-standard CLSI BMD method without urine present (dashed line) for Levofloxacin. The shaded area is the essential agreement area, which is generally considered to be within acceptable error for the CLSI-compliant BMD process. Most of the MICs for Levofloxacin determined for *E. coli* BAA-2469 using the novel AST method matched the CLSI method exactly and the remaining two fall within the 2-fold essential agreement zone. FIG. 2 summarizes the results obtained for all 5 antibiotics. 100% essential and 100% categorical agreement to standard BMD was observed across 15 culture negative clinical urine samples using the novel AST method. FIG. 3 shows the MIC determined for the 15 culture negative clinical urine samples spiked with *E. coli* using the novel AST method in comparison to the MIC observed in the CLSI-compliant BMD process across the 5 antibiotics tested.

Figure 52:
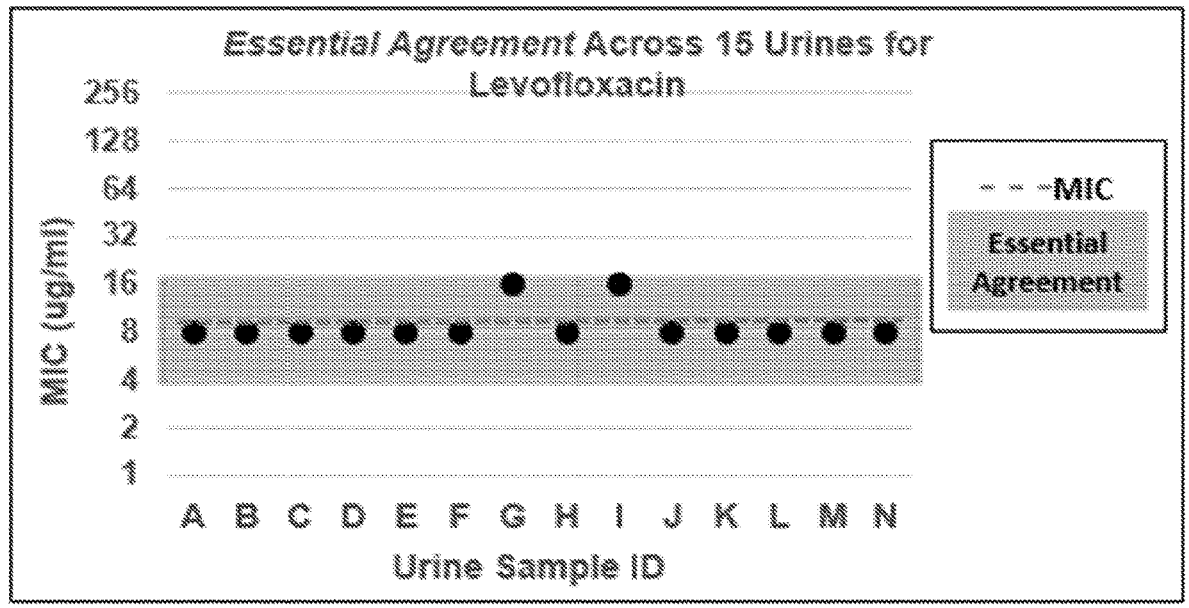
FIG. 52 shows 100% Essential agreement for Levofloxacin with each of the 15 spiked culture negative clinical UTI urine samples to standard BMD.
Figure 56:
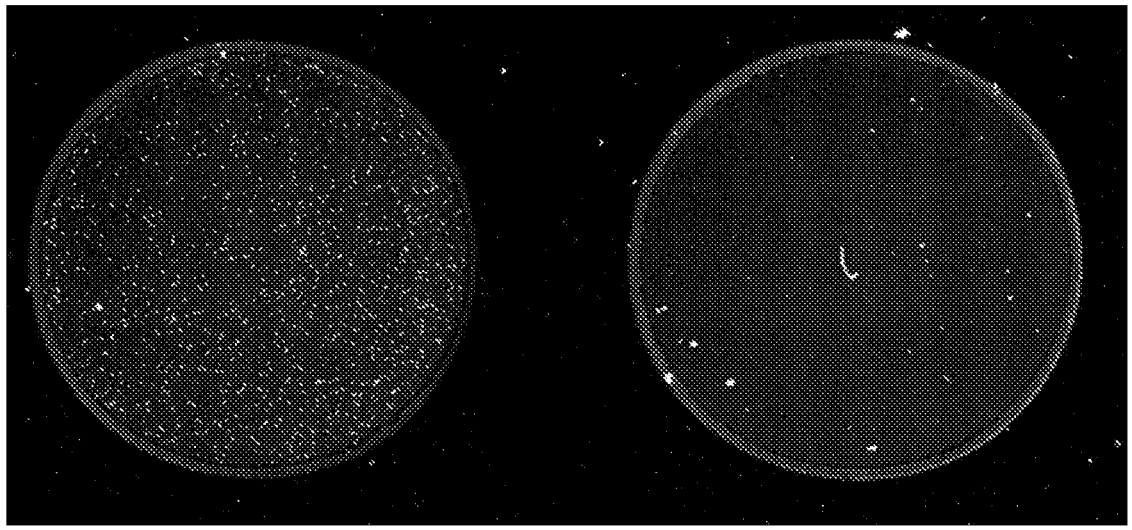
FIG. 56 is a set of results
Figure 57:
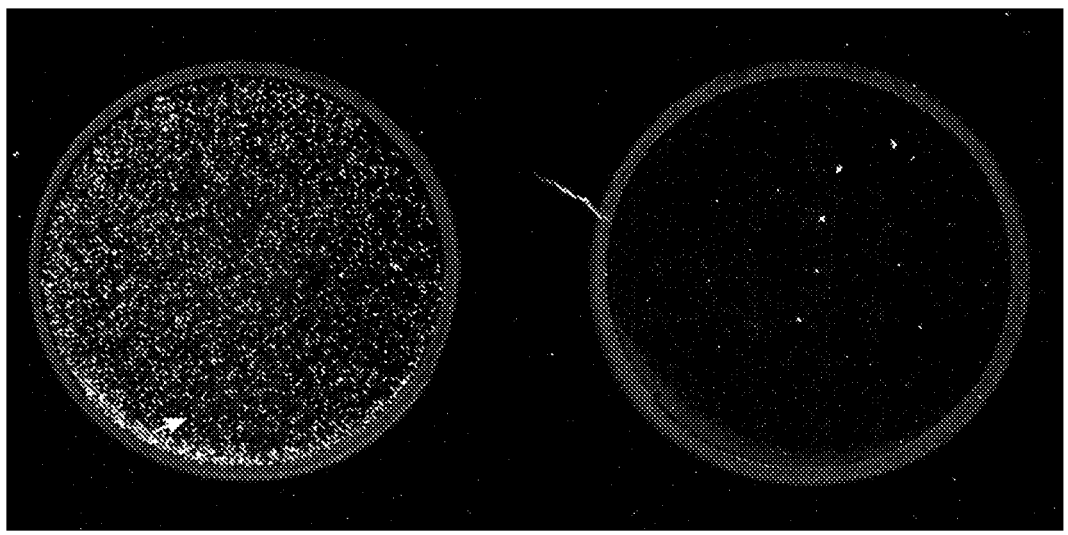
FIG. 57 is plates of *S. aureus*.
Figure 58:
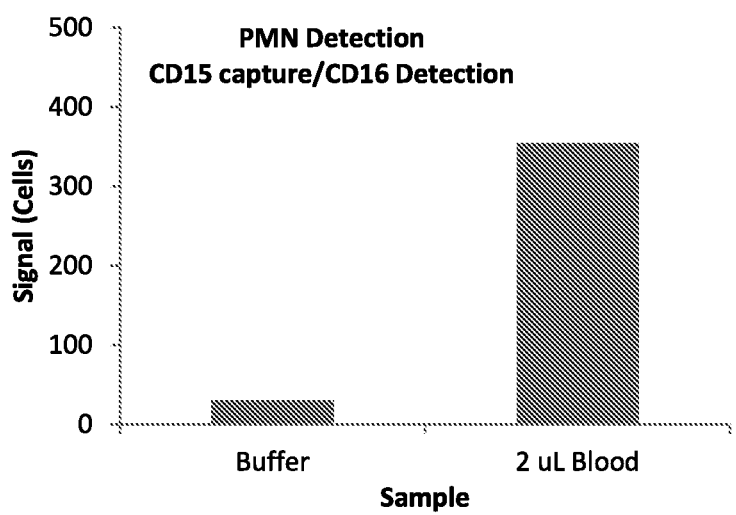
FIG. 58 shows successful detection.

FIG. 52 shows 100% Essential agreement for Levofloxacin with each of the 15 spiked culture negative clinical UTI urine samples to standard BMD.

Conclusion. The inventive method accurately determined the MIC (within the essential agreement zone relative to the gold standard BMD method) for a UTI pathogen (*E. coli*) for all 5 antibiotics tested in all 15 distinct urine matrices. Thus, this novel 4-hour antimicrobial susceptibility test has the capability to provide accurate results directly from urine specimens without the requirement of lengthy growth-based colony purification, saving substantial time. Rapid AST results can improve patient care by allowing the correct, effective antibiotic treatment to be initiated quickly and avoid adding to the spread of antibiotic resistance.

Variations. This example is illustrative of the performance of this novel AST method and is not limited to the specific details included in the description. One skilled in the art will readily understand that many variations are therefore possible, including using different probe sequences and nucleic acid structures (PNA, LNA, etc.), alternative assay chemistries (different detergents, chaotropes, fluorophores, buffers, pH, temperatures, reaction times, component concentrations) and concentration of urine. This methodology can also clearly be applied to other bacterial and non-bacterial pathogens and to minimally processed clinical matrices other than urine.

FIG. 52 shows essential agreement across 15 urines.

FIG. 53 shows 100% essential agreement and 100% categorical agreement for each of the 15 spiked culture negative clinical UTI urine samples to standard BMD.

* Cefazolin, Ciprofloxacin, Levofloxacin, Nitrofurantoin, and Trimethoprim-Sulfamethoxazole.

FIG. 54 shows the MIC for 15 urine samples spiked with E. coli as determined by the novel AST method compared to the standard BMD method ("CLSI Compliant"). Concentrations in µg/ml.

FIG. 55 is a table of probe sequences used in this example 12.

Example 13. Rapid and Accurate AST for Multiple Targets in Polymicrobial

Overview. Polymicrobial infections are common in many types of infections including wounds. For such infections, which can be life-threatening it is critical to determine which antimicrobial agents can be effective for each infectious pathogen. Current antimicrobial susceptibility testing methods require 2-5 days to purify large numbers of each infectious pathogen in a polymicrobial infection before they can be analyzed.

This example demonstrates the potential for the inventive systems and methods to generate rapid AST in results in just 4.5 hours directly from a patient specimen without the need for lengthy colony purification. The method achieves accurate AST results (MIC values) for each target species in contrived 2-target polymicrobial mixtures compared to the broth microdilution reference standard result.

Experimental Procedure.

Preparation of Antibiotic Plates: Microtiter plates containing 6 Ciprofloxacin concentrations 2-fold serial dilution series were prepared. The 2-fold dilution series was prepared at a 10-fold higher concentration the desired concentration in the final broth microdilution, such that addition cells/urine/media mixture would yield the correct antibiotic range. 10 uL of each antibiotic dilution was then aliquoted into the appropriate wells of a 96 well plate. Antibiotic dilutions were verified to be within the appropriate tolerance by confirming that the MIC for at least two CLSI QC strains fell within the QC range reported in CLSI document M100Ed29E-2019. In addition to the wells containing the antimicrobial dilution series, enough wells containing water or other diluent were included for a no antibiotic positive growth control. Antibiotic plates were frozen at −80° C. and thawed completely before use.

Preparation of Cultures: Both a susceptible and resistant strain were chosen for four different organisms (E. coli ATCC 25922, E. coli BAA-2469, K. pneumoniae CDC 0076, K. pneumoniae CDC 0043, P. aeruginosa CDC 0233, P. aeruginosa CDC 0236, E. faecalis ATCC 29212, and E. faecium ATCC 19434). The strains and their resistances to each antibiotic tested are shown in Table A. Each strain was grown separately with three to five colonies inoculated into 5 mL of Tryptic Soy Broth (TSB) and incubated while shaking for 1-2 hours at 35° C. The Optical Density was measured by a spectrometer and the organisms were diluted to $1 \times 10^7$ CFU/mL in 1× Cation-adjusted Mueller-Hinton Broth (MHB II) (Teknova, cat. # M5860).

Preparation of Magnetic Particles: A solution of Polyaspartic acid-conjugated magnetic particles (Fluidmag-PAA, Chemicell, cat. 4108) were diluted 1:20 into 50 mM EPPS buffer, pH 8.2 to $2.75 \times 10^{12}$ particles/mL. Fluorescent magnetic microspheres containing a green dye (Dragon Green Fluorescent Microspheres, BANGS Laboratories, cat MEDG001) were added to the suspension at a final concentration of $3 \times 10^6$ particles/mL. These particles enable the optical system to focus on the correct plane. The magnetic particle mixture was sonicated for 1 minute immediately prior to use to minimize aggregation. Separate magnetic particle suspensions were prepared for the time zero and time four-hour assays described below). An identical procedure was done with the 2 hydroxypropyl trimethylammonium chloride-coated silica magnetic particles (SiMag-Q, Chemicell, cat. 1206-5).

Bacterial Cell Labeling at AST time zero: Assay signal prior to the initiation of bacterial growth in the presence or absence of antibiotics (time zero or T0) was determined for each species and strain. 5 µL of target A was combined with either 5 µL target B or 5 µL of MHB II for a final concentration of $5 \times 10^6$ CFU/mL per organism was added to 80 µL of hybridization buffer (final concentration: 3×SSC (0.45 M NaCl, 0.045 M sodium citrate pH 7) (Sigma, cat. # S6639), 0.25M Guanidine Thiocyanate (Sigma, cat. #503-84-0), 5% PEG MW 3350 (Sigma, cat. # P-3640), 7.5% Igepal CA-630 (Sigma, cat. #13021), 0.2% cetrimide (Sigma, cat. # H9151), 1× Cation-adjusted Mueller-Hinton Broth (MHBII), species-specific DNA oligonucleotide FISH probes and unlabeled DNA helper probe (sequences and concentrations found in Table B)). A final concentration of 10% urine was obtained by adding 10 µL of pooled urine (Innovative Research, cat. IR100007P-24203) directly to the mixture for a 100 µL total reaction. 10 µL of the either the SiMag-Q magnetic particle mixture (for conditions where E. coli, K. pneumoniae and P. aeruginosa strains were being labeled) or the Fluidmag-PAA magnetic particle mixture (for conditions where Enterococcus spp. were labeled), prepared as described above, was added directly to this mixture. 100 µL of the sample, now containing the hybridization mixture, urine, and magnetic particles, was transferred to a microtiter plate containing 50 µL of dye-cushion (50 mM TRIS pH 7.5 (Teknova, cat. T5075), 7.5% v/v Optiprep (Sigma, cat. D1556), 5 mg/mL Direct Black-19 (Orient, cat. #3222), dried down at 60° C.) (dry-cushion plate) and incubated at 35° C. for 30 minutes. After this incubation, the microtiter plates were placed onto a strong permanent magnet (Dexter magnetic technologies, cat. 54170260) for 4 minutes to bring the labeled and magnetic-particle-interacting bacterial cells into close proximity to the imaging surface.

Imaging of labeled cells: The MultiPath™ laboratory imaging system is a custom-built instrument and software that is capable of automatically capturing image data from selected wells of a microtiter plate. It uses a high precision linear stage from Prior Scientific (Rockland, MA) to position each well over a fluorescence-based image acquisition subsystem. The instrument can image in 4 separate color channels and uses an objective lens, illumination LEDs, fluorescent filter sets, and camera. The objective lens has a field of view designed to capture the image of an entire microtiter plate well. The illumination module light source consists of 2 high power LEDs per color channel. A series of fluorescent image frames are captured with a camera using a 3.1MP Sony IMX265 monochrome sensor with 12-bit per pixel quantization. The final image for each well is then formed by summing multiple frames. 16 frames were captured at a 100 msec exposure using 635/25 nm excitation and 667/30 nm emission filters. The focus particles are imaged at 470/40 nm excitation and 520/40 nm excitation filters and captured 2 frames at a 20 msec exposure.

Four-Hour Growth: A polymicrobial sample, containing two species, was tested for susceptibility against 1 antimicrobial agent: Ciprofloxacin. Antibiotic plates containing these antimicrobial agents were prepared according to the method described above. At the same time as the time zero cell quantification was occurring, 5 µL of either the species to be labeled and detected and 5 µL of either a bacterial species the might be present in a polymicrobial UTI infection (but will not label) or MHB II as control, 10 µL of pooled urine, and 70 µL of MHB II were added to each well of the antibiotic plate. The samples were allowed to grow in a standing air incubator at 35° C. for 4 hours. Each strain in this example served in once instance as the labeled target species, and in another instance as the unlabeled member of the polymicrobial pair.

Bacterial Cell Labeling at AST time four-hour growth: After samples had incubated in the presence and absence of antibiotics for four hours (T4), cells were labeled and quantified to determine how much growth, if any, occurred. 10 µL of the incubated sample-antibiotic plate (10%) was transferred to a microtiter plate and combine with 100 µL hybridization buffer, FISH probes, helper probes, magnetic particles, and focus particles in the same manner as described above for assay time zero.

Comparison Method: Results using the novel AST method described here were compared to broth microdilutions (BMD) performed according to CLSI M07-Ed13E 2018.

Data Analysis and Threshold Generation: Using the image captured by the CCD camera, detected cells were estimated by an algorithm that looked at both number of objects in the field of view and the intensity of the objects. The number of cells based on this detection algorithm were generated at time zero, and at time four hours without antibiotic and with all 6 concentrations of Ciprofloxacin. For each sample inoculum/drug concentration, fold growth was calculated as the signal in the well containing antibiotic after growth (time four) to the signal in the urine sample prior to growth (time zero). Using fold growth and the observation of growth in the corresponding well in the CLSI-compliant broth microdilution, a logistic regression model was used to generate thresholds for determining the fold growth cutoff above which cells are growing in the presence of the antibiotic (and thus, resistant at that concentration) and below which, cells are in the process of dying (and thus, sensitive at that concentration). The point where the fold growth number falls below the determined threshold is the MIC value generated by the assay. MIC results were correspondingly assigned to categories of susceptible, intermediate, or resistant based on the CLSI M100Ed28 2018 guidelines. All data was then compared to CLSI standard BMD.

Results. FIGS. 1 and 2 summarize the results of all 48 different pairwise combinations with the antibiotic Ciprofloxacin. FIG. 1 shows all MICs determined for the target bacteria by the novel 4.5 hour AST method—regardless of the presence of a second susceptible or resistant bacteria—were within the 2-fold tolerance range accepted for the gold-standard BMD method (termed essential agreement) for each target bacteria (determined in the absence of a second bacteria). FIG. 2 shows that the sensitive and resistance categorical determinations for each target bacteria by the new AST method were also not impacted by these pair-wise combinations and were 100% consistent with the BMD determinations.

Conclusions. The inventive AST method can accurately determine antibiotic susceptibility for each species in a polymicrobial sample in 4.5 hours without requiring the time consuming colony purification needed by current methods. The results show the potential for the invention to determine the antimicrobial agents that can effectively treat life-threatening polymicrobial infections in just hours rather than the days required by today's methods.

Variations. This example is illustrative of the performance of this novel AST method and is not limited to the specific details included in the description. One skilled in the art will readily understand that many variations are therefore possible, including using different probe sequences and nucleic acid structures (PNA, LNA, etc.) and alternative assay chemistries (different detergents, chaotropes, fluorophores, buffers, pH, temperatures, reaction times, component concentrations). This methodology can also clearly be extended to other biological specimens, to other bacteria and to other antibiotics.

FIG. 59 shows Ciprofloxacin-sensitive and resistant strains used in this example FIG. 60 is a first half of a Table of probe sequences used in this example 13.

FIG. 61 is a second half of a Table of probe sequences used in this example 13.

FIG. 62 shows essential agreement for a polymicrobial infection with 2 target organisms. As seen below, the AST method described above yields 100% essential agreement to standard BMD FIG. 63 shows categorical agreement for a polymicrobial infection with 2 target organisms. As seen below the AST method described above yields 100% categorical agreement to standard BMD.

Example 14. Rapid and Accurate Detection of Multiple Target Pathogens in a Single Specimen in a Cartridge on an Automated Instrument Overview. Polymicrobial infections, that is infections caused by more than one bacterial species, are common. Current, culture-based and MALDI-TOF based methods for identifying pathogens, require lengthy colony purification steps for separately purifying large number of cells each target species. This example demonstrates the use of the inventive FISH method to detect and identify multiple species of target pathogens present in contrived urine samples in 30 minutes on an automated analyzer inside a single-use consumable cartridge containing all assay reagents. The example shows the potential of the systems and methods of the invention to rapidly and specifically identify multiple target pathogens in polymicrobial infections.

Experimental procedure.

Urine specimens: Ten culture negative clinical urine samples (remnant) were purchased from Discovery Life Sciences. Samples were received >7 days post collection and stored at −80° C. until use. For each sample, color of urine, pH, and presence of particulates were noted. Upon receipt, conventional urine culture was performed on the urines to determine samples were culture negative. Briefly, a calibrated 1 uL loop was placed into a well-mixed urine sample and evenly spread over a Tryptic soy agar (TSA, BD cat.221185) plate and incubated in a 35° C. air incubator for 18-24 hours. The remainder of the urine samples were processed and assayed as described below.

Urine processing: Prior to performing identification (ID), urine preservative and other potentially interfering compounds were removed using size exclusion chromatography. 2.5 mL of each clinically negative urine sample was applied to a pre-washed Zeba™ Spin Desalting column, 7K MWCO (ThermoFisher, cat. #89893). The sample was passed through the column via centrifugation as described by the manufacturer.

Preparation of Dehydrated Reagents in Cartridge: Prior to performing identification (ID), 45 µL of 2.2× concentrated hybridization buffer (6.7×SSC (1 M NaCl, 0.1 M sodium citrate, (Sigma, cat. # S6639), 0.4% w/v cetrimide (Sigma, cat. # H9151), 1.71% w/v CHAPSO (Sigma cat. # C3649), 1.6% SB3-12 w/v (Sigma, cat. # D0431), and 0.29M guanidine thiocyanate (Sigma, cat. # G9277)) was distributed into 6 of the reagent wells of the cartridge. Once rehydrated in the final 100 uL volume after processing by the analyzer, the normal 1× hybridization buffer (3×SSC (0.45 M NaCl, 0.045 M Na citrate), 0.18% cetrimide, 0.77% CHAPSO, 0.72% SB3-12, and 0.13M guanidine thiocyanate) will be achieved. 1.8 µL of each target species-specific DNA oligonucleotide FISH probe and unlabeled DNA helper probe mixture was added to 2 out of 8 of the reagent wells (N=2 for each target in 1 cartridge). *E. coli* FISH oligonucleotide probe sets were added to reagents wells corresponding to cartridge location A1 and A2, *K. pneumoniae* probe sets were added to reagents wells corresponding to cartridge location A3 and A4 and *P. aeruginosa* probe sets were added to reagents wells corresponding to cartridge location A5 and A6. These cartridge wells containing hybridization buffer and specific probes were then incubated in a 50° C. convection oven for 16-20 hours to dehydrate the materials.

Preparation of Magnetic Particles: Poly-aspartic acid-conjugated magnetic particles (Fluidmag-PAA, Chemicell, cat. 4108) were diluted 1:20 into 50 mM Epps buffer, pH 8.2 to a concentration of $2.75 \times 10^{12}$ particles/mL with a final concentration of 10% w/v Trehalose (Sigma, cat. # T9449). To this dilution, fluorescent magnetic microspheres containing a green dye (Dragon Green Fluorescent Microspheres, BANGS Laboratories, cat. MEDG001) were added to the suspension at a final concentration of $3 \times 10^6$ particles/mL. The magnetic particle mixture was sonicated for 1 minute prior to immediately use to minimize aggregation. The mixture was then lyophilized in 10 µL volume beads ($2.64 \times 10^{12}$ PAA particles per reaction) and 1 bead was placed in each of the 6 reagent wells.

Preparation of Cultures: Log cultures of three different target pathogens (*E. coli* ATCC 25922, *K. pneumoniae* ATCC 13883, and *P. aeruginosa* ATCC 27853) were grown separately with three to five colonies inoculated into 5 mL of Tryptic Soy Broth (TSB, Hardy Diagnostics cat. U65) and incubated while shaking for 1-2 hours at 35° C. The Optical Density was measured by a spectrometer and the organisms were diluted to about $5 \times 10^6$ CFU/mL in 1× Cation-adjusted Mueller-Hinton Broth (MHBII, Teknova cat. M5860).

Bacterial Cell Labeling and imaging for Identification: Assay signal was determined for each target pathogen in contrived polymicrobial mixture containing two bacteria of interest (3 total 2-bacteria combinations) in a final concentration of 30% processed urine. Each polymicrobial bacterial combination was tested in 10 unique different culture negative clinical samples (30 urines tested in total). 103.5 µL of bacterial target A (~$5 \times 10^5$ CFU/mL per reaction) 103.5 µL of bacterial target B (~$5 \times 10^5$ CFU/mL per reaction), 360 µL urine, and 633 µL were combined for a total volume of 1.2 mL; 1 mL of that mixture was transferred to the cartridge sample addition port. The cartridge was then placed on the instrument and all subsequent actions were automatically performed. The sample was first directed under vacuum into the 6 growth wells at the top of the cartridge. Sample was then immediately moved to reaction wells, rehydrating the hybridization buffer/FISH probe mix and lyophilized magnetic particles. Sample then continued to the optical windows containing 45 µL of dehydrated "dye cushion" (50 mM TRIS pH 7.5 (Teknova, cat. T5075), 7.5% v/v Optiprep (Sigma, cat. D1556), 5 mg/mL Direct Black-19 (Orient, cat. #3222), dried for 60° C. for 3 hours in a convection oven) and incubated at 35° C. for 30 minutes on the analyzer. After this incubation, the cartridges were relocated to the magnet station, and placed atop a strong permanent magnet (Dexter magnetic technologies, cat. 54170260) for 4 minutes to bring the labeled and magnetic-particle-interacting bacterial cells into proximity to the imaging surface at the bottom of the wells. Finally, the cartridge was moved to the imaging station and imaging taken using non-magnified CCD imager as described below. In brief, focusing on each individual well was performed by taking successive images of the fluorescent magnetic microspheres in the green channel, the plane of focus determined, and a corresponding image at that location taken in the red color channel to image labeled bacterial cells.

Imaging of labeled cells: The MultiPath™ Analyzer imaging system is a custom-built instrument and software that is capable of automatically capturing image data from selected wells of a MultiPath Cartridge as part of a fully automated test. It uses a custom designed precision 3 axis positioning system to locate each well over a fluorescence-based image acquisition subsystem. The Analyzer can image in 4 separate color channels and uses an objective lens, illumination LEDs, fluorescent filter sets, and camera. The objective lens has a field of view designed to capture the image of an entire Cartridge Imaging Well. The illumination module light source consists of 2 high power LEDs per color channel. A series of fluorescent image frames are captured with a camera using a 3.1MP Sony IMX265 monochrome sensor with 12-bit per pixel quantization. The final image for each well is then formed by summing multiple frames. 16 frames were captured at a 100 msec exposure using 635/25 nm excitation and 667/30 nm emission filters. The focus particles are imaged at 470/40 nm excitation and 520/40 nm excitation filters and captured 2 frames at a 20 msec exposure.

Data Analysis: Using the image captured by the CCD camera, detected cells was estimated by an algorithm that looked at both number of objects in the field of view and the intensity of the objects. Signal in a channel was considered detected if assay signal was above 130.

Results. The data demonstrate successful identification of 2 target pathogens in a single sample with no detection of the pathogen that is absent (i.e. no cross reactivity of the FISH probes to the non-target bacteria). FIG. 1 shows the cartridges run where the *E. coli/K. pneumoniae*-mixed samples were tested (N=10). FIG. 2 shows the cartridges run where the *E. coli/P. aeruginosa*-mixed samples were tested (N=10). FIG. 3 shows the cartridges where the *K. pneumoniae/P. aeruginosa*-mixed samples were tested (N=10). *K. pneumoniae/P. aeruginosa* cartridge #6 was removed from the analysis due to failure of that cartridge to produce a valid result. In addition, an artifact was observed in A3 of *E. coli/P. aeruginosa* cartridge #9, which caused the signal in the well to appear abnormally high, so this single replicate was eliminated. The replicate of this excluded point (well A4) did not have this artifact, so *K. pneumoniae* was still categorized as not detected. Although assay signal varied across the different cartridges, in all cases other than those already described, the two bacteria added to the culture negative urine was detected while very low signal is observed in the wells containing the probe for the bacteria that was not added.

Conclusions. This example demonstrates the inventive isothermal FISH method performed on an automated analyzer with stabilized reagents inside a consumable cartridge can specifically identify multiple target bacterial species in a contrived urine sample. This shows the potential of the method to identify multiple pathogens in polymicrobial infections. The example also demonstrates the specificity of the method, as no cross-species detection was observed.

Variations. This example is illustrative of the performance of this novel FISH method on a cartridge and is not limited to the specific details included in the description. One skilled in the art will readily understand that many variations are therefore possible, including using different probe sequences and nucleic acid structures (PNA, LNA, etc.), alternative assay chemistries (different detergents, chaotropes, fluorophores, buffers, pH, temperatures, reaction times, component concentrations), concentration of urine and urine processing procedures and alterations to reactant stabilization (lyophilization of components). This methodology can also clearly be extended to other biological specimens and to other bacterial and non-bacterial pathogens.

Figure 64:
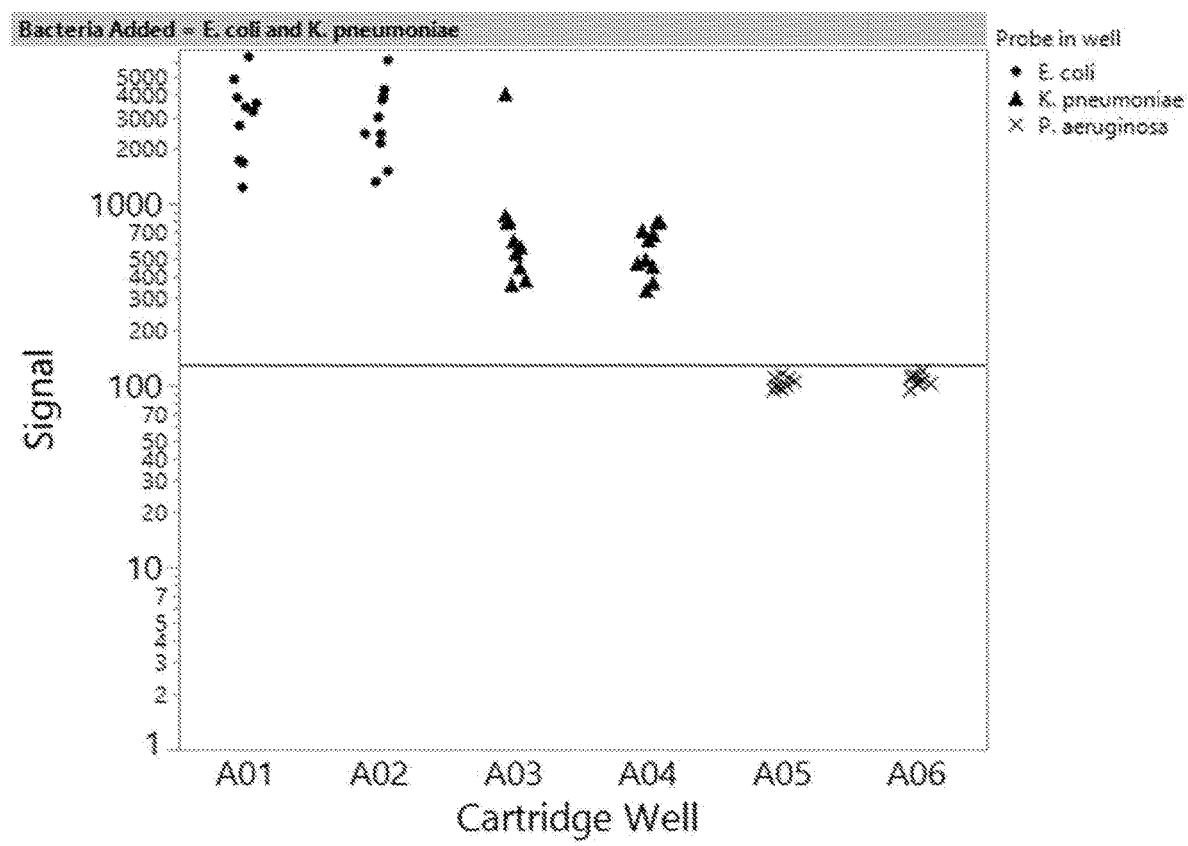
FIG. 64 shows target pathogens are detected only in the wells containing their species-specific DNA oligonucleotide FISH probes.

FIG. 64 shows target pathogens are detected only in the wells containing their species-specific DNA oligonucleotide FISH probes.

Figure 65:
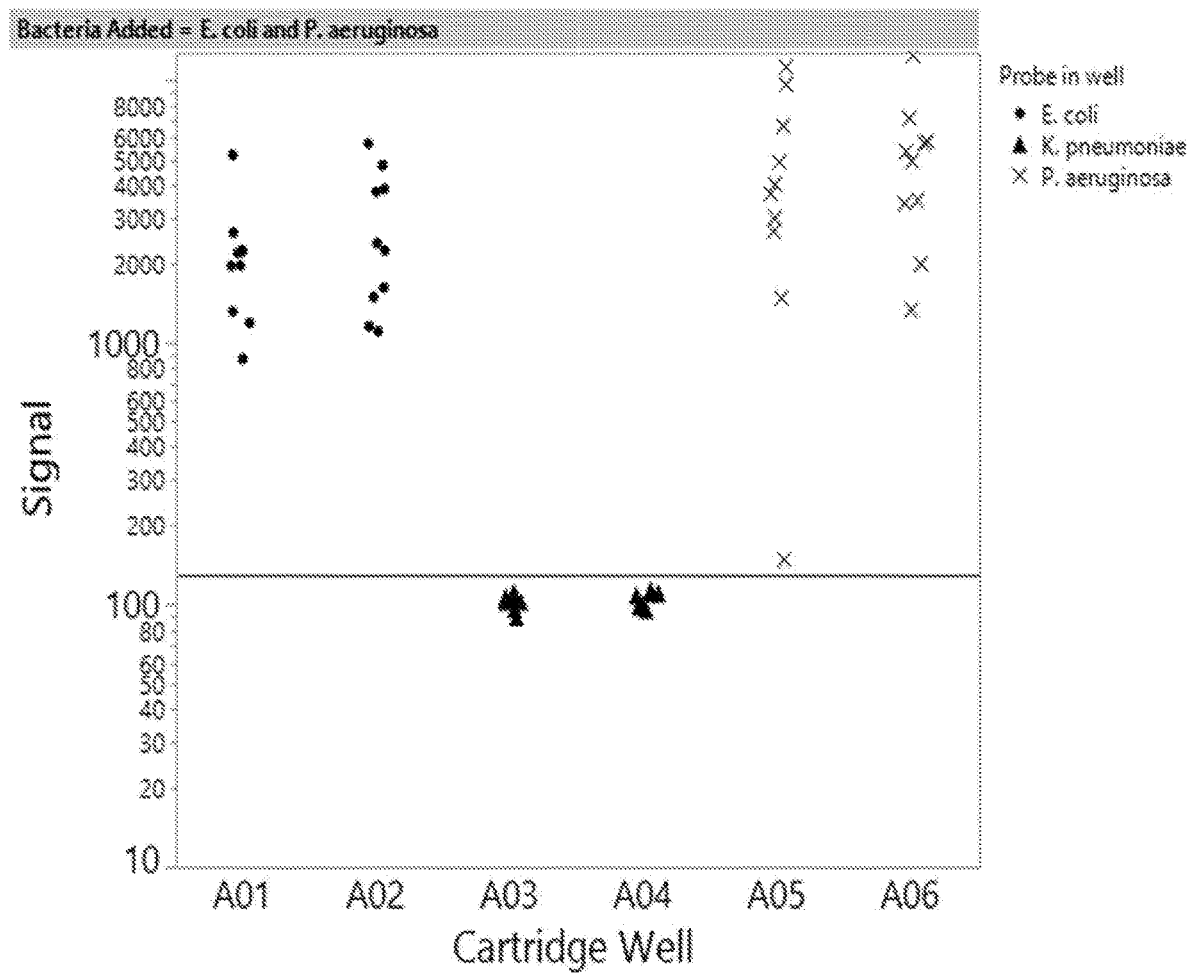
FIG. 65 shows target pathogens are detected only in the wells containing their species-specific DNA oligonucleotide FISH probes.

FIG. 65 shows target pathogens are detected only in the wells containing their species-specific DNA oligonucleotide FISH probes.

Figure 66:
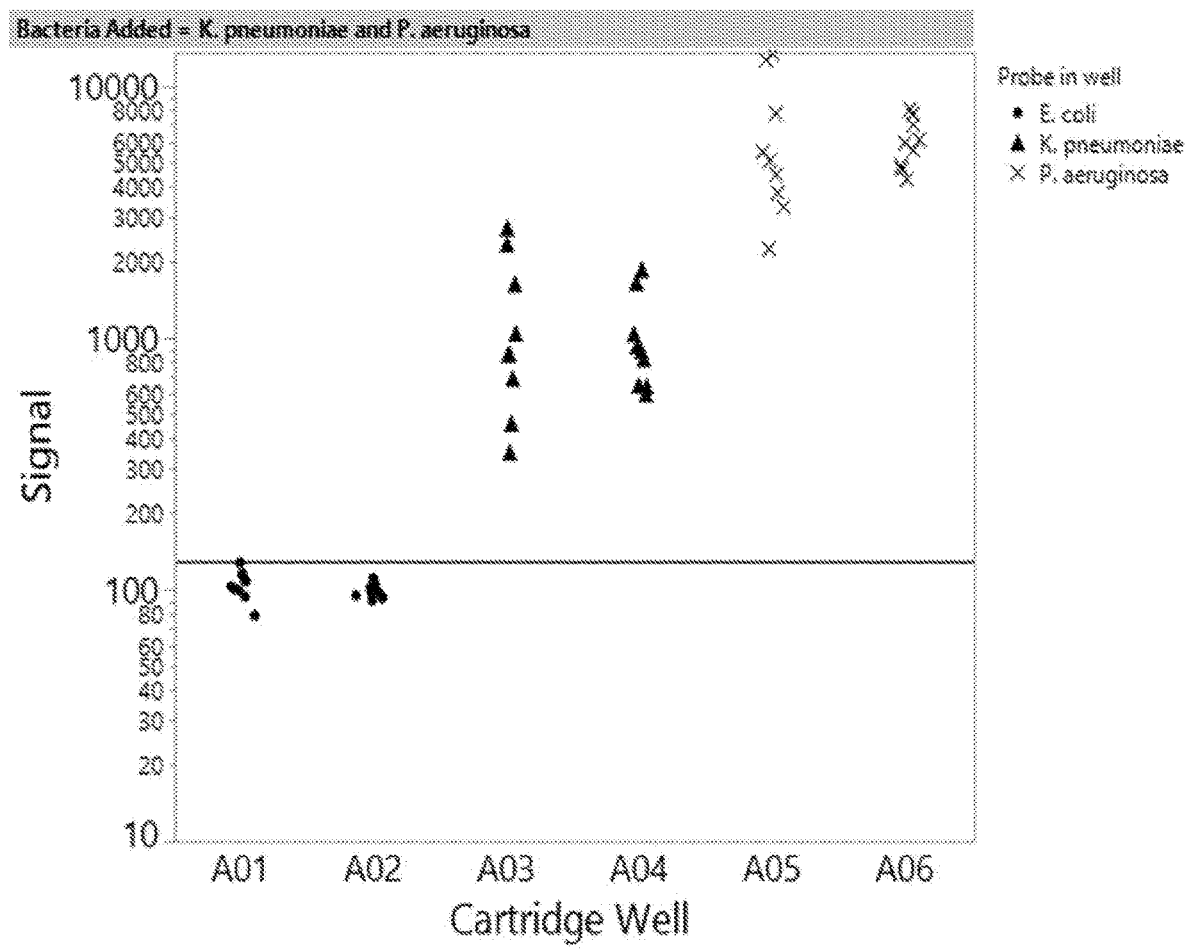
FIG. 66 shows target pathogens are detected only in the wells containing their species-specific DNA oligonucleotide FISH probes.

FIG. 66 shows target pathogens are detected only in the wells containing their species-specific DNA oligonucleotide FISH probes.

FIG. 67 is a table "Table A of Example 14", showing target pathogens were detected while other non-target pathogens were not.

FIG. 68 is a table, "Table B of Example 14", showing probe sequences used in this example 14.

Example 17. Automated Sensitive Detection of *C. difficile* Toxin B in Stool Specimens Using the Inventive System Overview. *C. difficile* causes more hospital acquired infections and patient deaths than any other pathogen and is the top pathogen on CDC's urgent threat list. The two current laboratory methods for diagnosing *C. difficile* infections are inaccurate. Enzyme immunoassay tests for *C. difficile* infection lack clinical sensitivity, that is they can fail to detect patients that have the disease. Nucleic acid amplification tests, lack clinical specificity—these tests misdiagnose patients that do not have the disease as positive for infection. A more sensitive test for the *C. difficile* toxin that causes the infection can be both highly sensitive and highly specific. A more accurate test will lead to better patient outcomes. This example demonstrates the use of the invention to detect very low concentrations of *C. difficile* toxin B in stool specimens.
Experimental Methods.

Materials. 2 monoclonal antibodies that bind complementary epitopes of the *C. difficile* Toxin B protein were attached to nanoparticles. Fluorescent nanoparticles (Thermo Fisher Scientific, Waltham, MA) were conjugated to anti-*C. difficile* Toxin B monoclonal antibodies (BBI Solutions, Cardiff, UK). Polystyrene carboxylate magnetic particles (Ademtech, Pessac, France) were conjugated to anti-*C. difficile* Toxin B monoclonal antibodies (Fitzgerald, Acton, MA). Both fluorescent and magnetic particles were lyophilized after conjugation. Lyophilized particles are placed into the First Light cartridge during assembly. Native Toxin B protein purified from *C. difficile* was purchased from List Laboratories (Campbell, CA). Casein, Casein hydrosylate, Trizma®-HCl were from Sigma-Aldrich (St. Louis, Mo.). Poly-BSA was from Roche. Protease inhibitor cocktail was from Takara Bio (Mountain View, CA). Spin columns were purchased from Pierce/Thermo-Fisher Scientific.

Estimating the limit of detection of the *C. difficile* toxin B test on MultiPath Instrument. The LoD measurement was performed using the pooled negative stool sample. The limit of detection (LoD) was determined in accordance to approved Clinical & Laboratory Standards Institute (CLSI) guidelines by running 24 replicates of sample with no analyte and 12 replicates each with 5 different toxin B concentrations. A pooled negative stool sample was made from 14 individual stool samples that had been scored as *C. difficile* negative by real-time PCR. The pooled stool samples were spiked with *C. difficile* toxin B in a series of two-fold dilutions (0, 31.2, 62.5, 125, 250, 500 pg/mL). 100 µL of each stool sample was added to stool diluent (900 µL) consisting of Tris buffer, Poly-BSA, caseins and protease inhibitor cocktail. 0.95 mL of each diluted sample was transferred to a Pierce spin column and centrifuged at 11,700×g for 5 minutes. After centrifugation, 700 µL of the supernatant was transferred to the sample addition port in the cartridge and the cap was closed. Then cartridge was then placed into the cartridge input rack and inserted into the instrument.

Running cartridges on an automated instrument. After the cartridge was placed into the instrument, all subsequent actions other than data analysis (performed offline using Excel or JMP software) were automatically performed. The diluted stool samples were first directed under vacuum into individual reaction wells within the cartridge and moved to the imaging windows containing 46 uL of dehydrated "dye-cushion" (50 mM TRIS pH 7.5 (Teknova, cat. T5075), 7.5% v/v Optiprep (Sigma, cat. D1556), 5 mg/mL Direct Black-19 (Orient, cat. #3222), dried for 60° C. for 3 hours in a convection oven) and incubated at 35° C. for 30 minutes on the instrument. After this incubation, the cartridges were then relocated to the magnet station, and placed atop a strong permanent magnet (Dexter magnetic technologies, cat. 54170260) for 4 minutes to bring the fluorescent particle: toxin B:magnetic particle complexes through the "dye cushion" and into proximity to the imaging surface at the bottom of the wells. Finally, the cartridge was moved to the imaging station and images taken using the non-magnified CCD imager described as described below.

The instrument imaging system and imaging process. The MultiPath imaging system is a custom-built instrument and software that is capable of automatically capturing image data from selected wells of a MultiPath Cartridge as part of a fully automated test. It uses a custom designed precision 3 axis positioning system to locate each well over a fluorescence-based image acquisition subsystem. The Instrument can image in 4 separate color channels and uses an objective lens, illumination LEDs, fluorescent filter sets, and camera. The objective lens has a field of view designed to capture the image of an entire Cartridge Imaging Well. The illumination module light source consists of 2 high power LEDs per color channel. A series of fluorescent image frames are captured with a camera using a 3.1MP Sony IMX265 monochrome sensor with 12-bit per pixel quantization. The final image for each well is then formed by summing multiple frames. For the *C. difficile* toxin tests, the test channel is 470/40 nm excitation and 520/40 nm emission filters and captured 2 frames at a 20 msec exposure. The focus particles are imaged at 569/25 nm excitation and 609/34 nm excitation filters and captured 2 frames at a 10 msec exposure.
Results.

Figure 69:
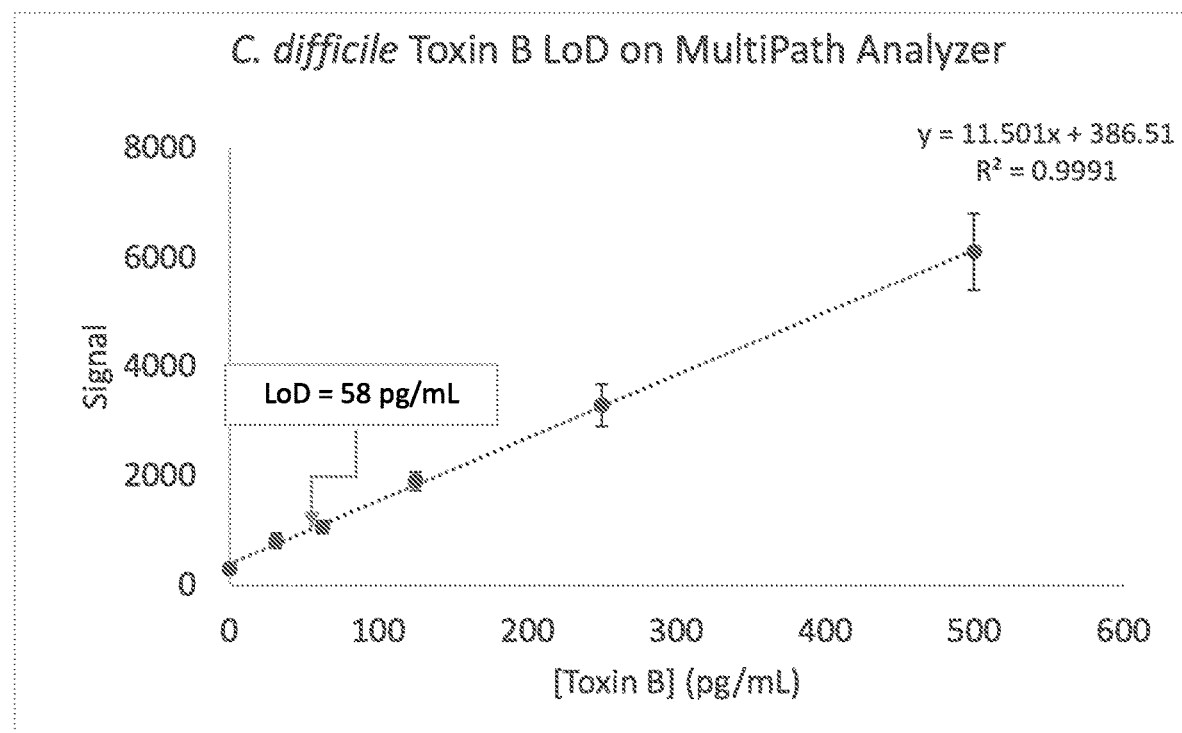
FIG. 69 shows results from *Clostridium difficile*.

FIG. 69 shows that the method returned an estimated limit of detection of 58 pg/mL for *C. difficile* toxin B. Signal variability across biological and technical replicates is indicated by the error bars (+/−1 standard deviation);

Limit of detection of *C. difficile* toxin B in MultiPath analyzer. The LoD is indicated in the inset Conclusions. This method is capable of very sensitive and precise detection of *C. difficile* Toxin B. The LoD was determined to be 58 pg/mL of toxin B. The low signal variability across technical and biological replicates indicates robustness to matrix effects.

Variations. This example is illustrative of the performance of this inventive method and is not limited to the specific details included in the description. One skilled in the art will readily understand that many variations are therefore possible, including using different fluorescent particles, alternative assay chemistries (different buffers, pH, temperatures, reaction times, component concentrations), different amounts of stool and different means of processing stool specimens. In addition, alternative biomarkers specific to *C. difficile* could be used (e.g. Toxin A). This novel technology can also clearly be extended to other target molecules as well as various bacterial and non-bacterial pathogens for which a specific biomarker can be identified.

What is claimed is:

1. A method for detecting a microorganism, the method comprising:
    labeling specific target cells in the specimen with fluorescently labeled nucleic acid probes wherein said fluorescently labeled nucleic acid probes bind to target-specific sequences on ribosomal RNA;
    incubating said target cells with magnetic particles thus forming complexes of fluorescently labeled target cells bound to magnetic particles, wherein the labeling and the incubating said target cells with magnetic particles occurs in a concerted reaction;
    depositing said complexes on a detection surface of an imaging well using magnetic force; and
    counting the individual labeled target cell complexes in the imaging well using non-magnified digital imaging.

2. The method of claim 1, further comprising performing antimicrobial susceptibility testing directly from the sample.

3. The method of claim 2, wherein performing antimicrobial susceptibility testing comprises differential growth, permeabilization, hybridization, and magnetic tagging.

4. The method of claim 2, wherein the antimicrobial susceptibility is performed in a single cartridge.

5. The method of claim 1, wherein the method further comprises using FISH for detecting, quantifying, and identifying target microbes.

6. The method of claim 5, further comprising performing phenotypic antimicrobial susceptibility testing.

7. The method of claim 5, further comprising detecting and quantifying target microbes in less than 90 minutes.

8. The method of claim 7, further comprising detecting and quantifying target microbes in less than 60 minutes.

9. The method of claim 8, further comprising detecting and quantifying target microbes in less than 30 minutes.

10. The method of claim 1, wherein the sample is maintained at or beneath 40 degrees C. throughout all steps.

11. The method of claim 1, wherein depositing step includes using a magnetic force to pull magnetic particle-bound cells through a dye cushion and onto an imaging surface while the dye cushion holds unbound labels away from the imaging surface.

12. The method of claim 11, wherein the labeling step includes exposing the cells to reagents that permeabilize the cells, thus allowing the fluorescently labeled nucleic acid probes to enter the cells and bind to targets therein.

13. The method of claim 12, wherein the fluorescently labeled nucleic acid probes comprise oligonucleotides that are complementary to microbial RNAs.

14. The method of claim 12, wherein the reagents include one or more detergents; the fluorescently labeled nucleic acid probes comprise oligonucleotides; and the target nucleic acids are microbial ribosomal RNAs.

15. The method of claim 14, wherein the detergents include one or more of CHAPSO and SB3-12; and the probes include fluorescently labeled oligonucleotides complementary to portions of the microbial ribosomal RNAs.

16. The method of claim 1, wherein the fluorescently labeled nucleic acid probes include a fluorescently labeled oligonucleotide that is complementary to a segment of ribosomal RNA specific to the species.

17. The method of claim 16, wherein the fluorescently labeled nucleic acid probes further include one or more helper probes that are oligonucleotides that bind to the ribosomal RNA at a location within 1 to 30) bases from the segment where the fluorescently labeled oligonucleotide binds.

18. The method of claim 16, wherein the fluorescently labeled oligonucleotide is between 10 and 18 bases in length and includes at least one conformationally restricted nucleic acid.

19. The method of claim 11, wherein the dye cushion comprises a density gradient medium that further includes a dye that absorbs light from unbound probes.

20. The method of claim 1, wherein the target cells comprise one or more distinct species of microorganisms.

* * * * *